United States Patent
Nonaka et al.

(10) Patent No.: US 8,054,967 B2
(45) Date of Patent: Nov. 8, 2011

(54) COMPUTER SYSTEM AND COMPUTER PROGRAM EXECUTING ENCRYPTION OR DECRYPTION

(75) Inventors: Masao Nonaka, Osaka (JP); Kaoru Yokota, Hyogo (JP); Motoji Ohmori, Osaka (JP)

(73) Assignee: Panasonic Corporation, Osaka (JP)

(*) Notice: Subject to any disclaimer, the term of this patent is extended or adjusted under 35 U.S.C. 154(b) by 967 days.

(21) Appl. No.: 11/578,837

(22) PCT Filed: Apr. 15, 2005

(86) PCT No.: PCT/JP2005/007319
§ 371 (c)(1),
(2), (4) Date: Oct. 19, 2006

(87) PCT Pub. No.: WO2005/103908
PCT Pub. Date: Nov. 3, 2005

(65) Prior Publication Data
US 2007/0237326 A1   Oct. 11, 2007

(30) Foreign Application Priority Data
Apr. 26, 2004   (JP) ................... 2004-129284

(51) Int. Cl.
*H04K 1/00* (2006.01)
*H04L 9/00* (2006.01)
*H04L 9/28* (2006.01)
*G06F 11/30* (2006.01)
*G06F 12/14* (2006.01)

(52) U.S. Cl. ............ 380/28; 380/29; 713/189; 713/193

(58) Field of Classification Search ............ 380/28, 380/29, 36, 37, 255, 42, 252; 713/500, 502, 713/503, 190, 194; 711/118, 121, 125, 128, 711/133, 134
See application file for complete search history.

(56) References Cited

U.S. PATENT DOCUMENTS

| | | | |
|---|---|---|---|
| 6,061,449 A * | 5/2000 | Candelore et al. | 380/28 |
| 6,523,118 B1 * | 2/2003 | Buer | 713/189 |
| 6,539,092 B1 * | 3/2003 | Kocher | 380/252 |
| 7,310,706 B1 * | 12/2007 | Stribaek et al. | 711/128 |
| 7,360,252 B1 * | 4/2008 | Torrubia-Saez | 726/27 |

(Continued)

FOREIGN PATENT DOCUMENTS
JP   2004-120307   4/2004

OTHER PUBLICATIONS

Y. Tsunoo, E. Tsujihara, K. Minematsu, and H. Miyauchi, "Cryptanalysis of Block Ciphers Implemented on Computers with Cache", International Symposium on Information Theory and Its Applications (ISITA), Oct. 2002.

(Continued)

*Primary Examiner* — Eleni Shiferaw
*Assistant Examiner* — Hilary Branske
(74) *Attorney, Agent, or Firm* — Wenderoth Lind & Ponack, L.L.P.

(57) ABSTRACT

A computer system having resistance to timing attacks based on measuring processing times by encrypting or decrypting a plain text or ciphertext by converting the partial data related to the plain text or the encrypted text into conversion data. In the system, a conversion table includes one piece of conversion data corresponding to the partial data at a start position of a line table area and includes data not associated with the conversion in the other position. In the system, a computer program includes an operation instruction for calculating a predetermined position of the conversion data in the conversion table by using acquired partial data and a read instruction for reading out the conversion data from the calculated position.

10 Claims, 50 Drawing Sheets

U.S. PATENT DOCUMENTS

| | | | |
|---|---|---|---|
| 7,599,491 B2 * | 10/2009 | Lambert | 380/30 |
| 2004/0062391 A1 | 4/2004 | Tsunoo | |
| 2005/0084098 A1 * | 4/2005 | Brickell | 380/28 |

OTHER PUBLICATIONS

Toyohiro Tsurumaru et al., "Timing Attacks on 64-bit Block Ciphers", The 2003 Symposium on Cryptography and Information Security (SCIS2003), 2003.

D. Page, "Defending Against Cache-Based Side-Channel Attacks", Information Security Technical Report, Vol. 8, No. 1, pp. 30-44, 2003.

Toyohiro Tsurumaru et al., "Timing Attacks on 64-bit Block Ciphers", The 2003 Symposium on Cryptography and Information Security (SCIS2003), 2003. (English translation).

* cited by examiner

FIG. 6

MODIFIED S BOX 511

| | 441 | 442 | 443 | 444 | 445 | 446 | 447 | |
|---|---|---|---|---|---|---|---|---|
| 431 — S[00] | 0xff | 0xff | 0xff | 0xff | 0xff | 0xff | 0xff | |
| 432 — S[01] | 0xff | 0xff | 0xff | 0xff | 0xff | 0xff | 0xff | |
| 433 — S[02] | 0xff | 0xff | 0xff | 0xff | 0xff | 0xff | 0xff | |
| 434 — S[03] | 0xff | 0xff | 0xff | 0xff | 0xff | 0xff | 0xff | |
| ...... | ...... | ...... | ...... | ...... | ...... | ...... | ...... | |
| 435 — S[fc] | 0xff | 0xff | 0xff | 0xff | 0xff | 0xff | 0xff | |
| 436 — S[fd] | 0xff | 0xff | 0xff | 0xff | 0xff | 0xff | 0xff | |
| 437 — S[fe] | 0xff | 0xff | 0xff | 0xff | 0xff | 0xff | 0xff | |
| 438 — S[ff] | 0xff | 0xff | 0xff | 0xff | 0xff | 0xff | 0xff | |

FIG.12

FIG.17
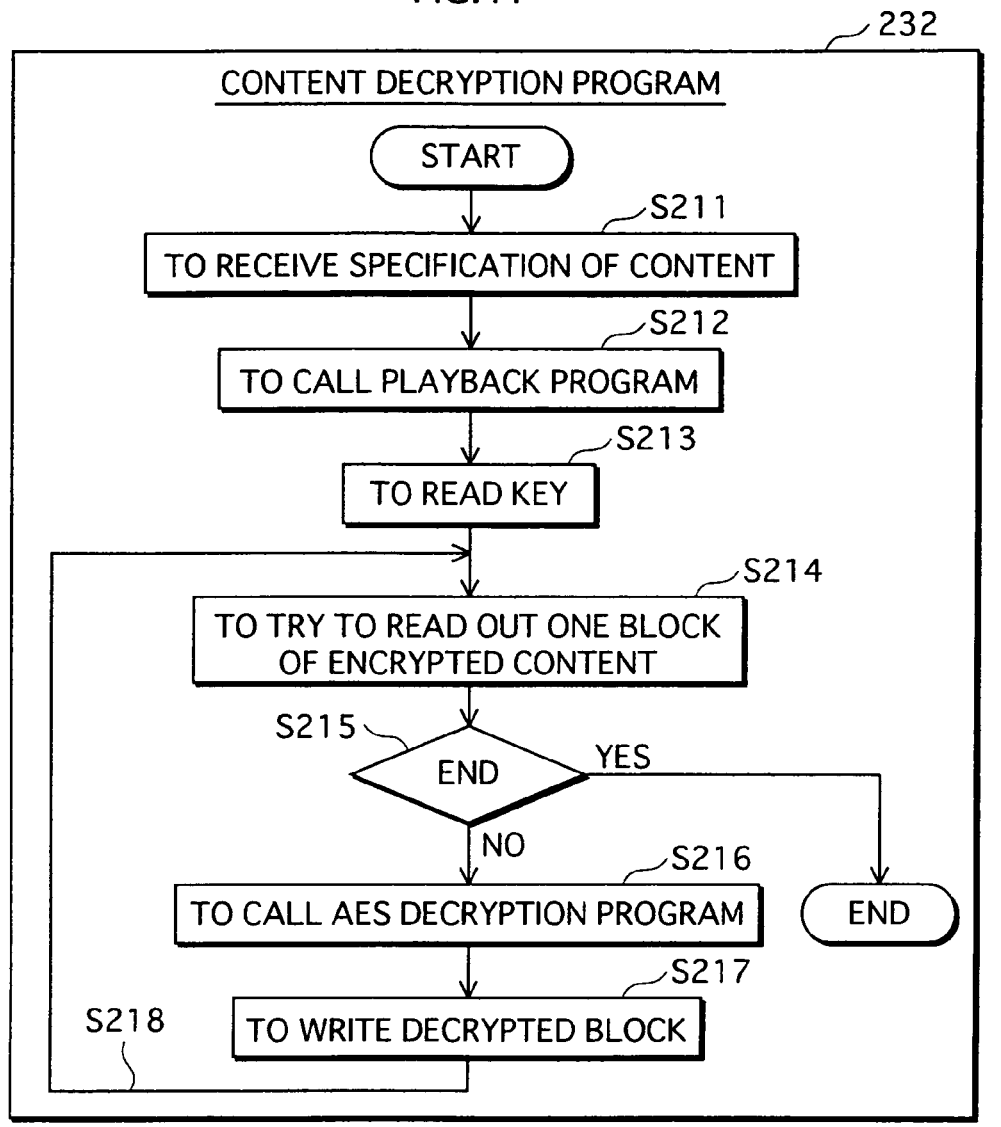
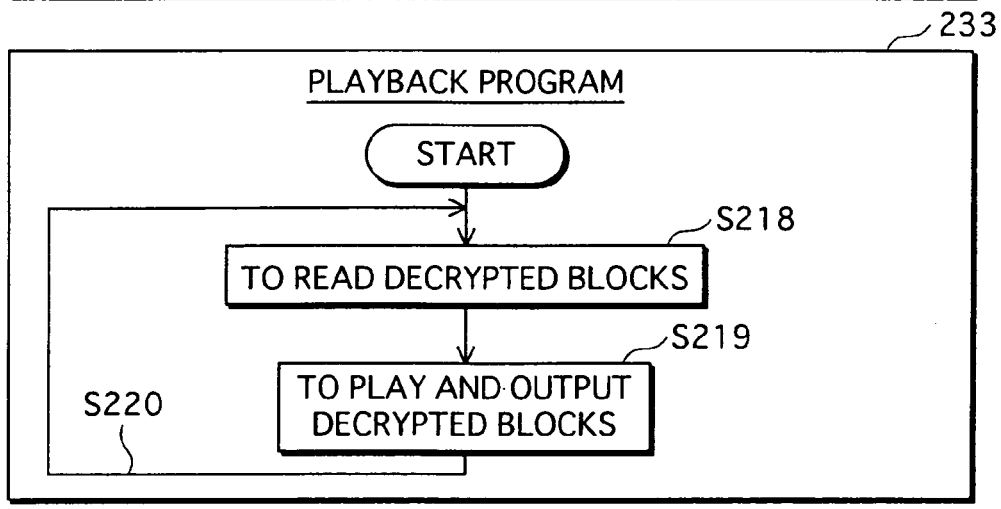

FIG.20

INVERSE TRANSFORM MODIFIED S BOX TABLE ~ 611

| | 841 | 842 | 843 | 844 | 845 | 846 | 847 |
|---|---|---|---|---|---|---|---|
| 831 — InvS[00] | 0xff | 0xff | 0xff | 0xff | 0xff | 0xff | 0xff |
| 832 — InvS[01] | 0xff | 0xff | 0xff | 0xff | 0xff | 0xff | 0xff |
| 833 — InvS[02] | 0xff | 0xff | 0xff | 0xff | 0xff | 0xff | 0xff |
| 834 — InvS[03] | 0xff | 0xff | 0xff | 0xff | 0xff | 0xff | 0xff |
| ....... | ....... | ....... | ....... | ....... | ....... | ....... | ....... |
| 835 — InvS[fc] | 0xff | 0xff | 0xff | 0xff | 0xff | 0xff | 0xff |
| 836 — InvS[fd] | 0xff | 0xff | 0xff | 0xff | 0xff | 0xff | 0xff |
| 837 — InvS[fe] | 0xff | 0xff | 0xff | 0xff | 0xff | 0xff | 0xff |
| 838 — InvS[ff] | 0xff | 0xff | 0xff | 0xff | 0xff | 0xff | 0xff |

FIG.25

DATA UNIT OF CACHE UNIT 175b

| | 861 | 862 | 863 | 864 | 865 | 866 | 867 | |
|---|---|---|---|---|---|---|---|---|
| #0  851 | InvS[00] | 0xff | 0xff | 0xff | 0xff | 0xff | 0xff | ← 181b |
| #1  852 | InvS[01] | 0xff | 0xff | 0xff | 0xff | 0xff | 0xff | ← 182b |
| #2  853 | InvS[02] | 0xff | 0xff | 0xff | 0xff | 0xff | 0xff | ← 183b |
| #3  854 | InvS[03] | 0xff | 0xff | 0xff | 0xff | 0xff | 0xff | ← 184b |
| #4 | ... | ... | ... | ... | ... | ... | ... | |
| ... | | | | | | | | |
| #252 855 | InvS[fc] | 0xff | 0xff | 0xff | 0xff | 0xff | 0xff | |
| #253 856 | InvS[fd] | 0xff | 0xff | 0xff | 0xff | 0xff | 0xff | |
| #254 857 | InvS[fe] | 0xff | 0xff | 0xff | 0xff | 0xff | 0xff | ← 186b |
| #255 858 | InvS[ff] | 0xff | 0xff | 0xff | 0xff | 0xff | 0xff | ← 187b |

FIG.28

MODIFIED S BOX

| 921 | 931 | 932 | 933 | 922 | 934 | 935 | 936 |
|---|---|---|---|---|---|---|---|
| S[00] | 0xff | 0xff | 0xff | S[01] | 0xff | 0xff | 0xff |
| S[02] | 0xff | 0xff | 0xff | S[03] | 0xff | 0xff | 0xff |
| S[04] | 0xff | 0xff | 0xff | S[05] | 0xff | 0xff | 0xff |
| S[06] | 0xff | 0xff | 0xff | S[07] | 0xff | 0xff | 0xff |
| ⋯⋯⋯ | ⋯⋯⋯ | ⋯⋯⋯ | ⋯⋯⋯ | ⋯⋯⋯ | ⋯⋯⋯ | ⋯⋯⋯ | ⋯⋯⋯ |
| S[f8] | 0xff | 0xff | 0xff | S[f9] | 0xff | 0xff | 0xff |
| S[fa] | 0xff | 0xff | 0xff | S[fb] | 0xff | 0xff | 0xff |
| S[fc] | 0xff | 0xff | 0xff | S[fd] | 0xff | 0xff | 0xff |
| S[fe] | 0xff | 0xff | 0xff | S[ff] | 0xff | 0xff | 0xff |

DATA UNIT OF CACHE UNIT 175c

| | 941 | 951 | 952 | 953 | 942 | 954 | 955 | 956 | |
|---|---|---|---|---|---|---|---|---|---|
| #0 | S[00] | 0xff | 0xff | 0xff | S[01] | 0xff | 0xff | 0xff | ← 181c |
| #1 | S[02] | 0xff | 0xff | 0xff | S[03] | 0xff | 0xff | 0xff | ← 182c |
| #2 | S[04] | 0xff | 0xff | 0xff | S[05] | 0xff | 0xff | 0xff | ← 183c |
| #3 | S[06] | 0xff | 0xff | 0xff | S[07] | 0xff | 0xff | 0xff | ← 184c |
| ... | | | | | | | | | |
| #124 | S[f8] | 0xff | 0xff | 0xff | S[f9] | 0xff | 0xff | 0xff | |
| #125 | S[fa] | 0xff | 0xff | 0xff | S[fb] | 0xff | 0xff | 0xff | |
| #126 | S[fc] | 0xff | 0xff | 0xff | S[fd] | 0xff | 0xff | 0xff | |
| #127 | S[fe] | 0xff | 0xff | 0xff | S[ff] | 0xff | 0xff | 0xff | |

FIG.31

MODIFIED S BOX 1011

| 1041 | 1031 | 1042 | 1032 | 1043 | 1033 | 1044 | 1034 |
|---|---|---|---|---|---|---|---|
| 0xff | S[00] | 0xff | S[01] | 0xff | S[02] | 0xff | S[03] |
| 0xff | S[04] | 0xff | S[05] | 0xff | S[06] | 0xff | S[07] |
| 0xff | S[08] | 0xff | S[09] | 0xff | S[10] | 0xff | S[11] |
| 0xff | S[12] | 0xff | S[13] | 0xff | S[14] | 0xff | S[15] |
| ...... | ...... | ...... | ...... | ...... | ...... | ...... | ...... |
| 0xff | S[f0] | 0xff | S[f1] | 0xff | S[f2] | 0xff | S[f3] |
| 0xff | S[f4] | 0xff | S[f5] | 0xff | S[f6] | 0xff | S[f7] |
| 0xff | S[f8] | 0xff | S[f9] | 0xff | S[fa] | 0xff | S[fb] |
| 0xff | S[fc] | 0xff | S[fd] | 0xff | S[fe] | 0xff | S[ff] |
| 1035 | | 1036 | | 1037 | | 1038 | |

FIG.33

| | 1061 | 1051 | 1062 | 1052 | 1063 | 1053 | 1064 | 1054 |
|---|---|---|---|---|---|---|---|---|
| #0 | 0xff | S[00] | 0xff | S[01] | 0xff | S[02] | 0xff | S[03] | ← 181d
| #1 | 0xff | S[04] | 0xff | S[05] | 0xff | S[06] | 0xff | S[07] | ← 182d
| #2 | 0xff | S[08] | 0xff | S[09] | 0xff | S[10] | 0xff | S[11] | ← 183d
| #3 | 0xff | S[12] | 0xff | S[13] | 0xff | S[14] | 0xff | S[15] | ← 184d
| ... | | | | | | | | |
| #60 | 0xff | S[f0] | 0xff | S[f1] | 0xff | S[f2] | 0xff | S[f3] |
| #61 | 0xff | S[f4] | 0xff | S[f5] | 0xff | S[f6] | 0xff | S[f7] |
| #62 | 0xff | S[f8] | 0xff | S[f9] | 0xff | S[fa] | 0xff | S[fb] |
| #63 | 0xff | S[fc] | 0xff | S[fd] | 0xff | S[fe] | 0xff | S[ff] |

DATA UNIT OF CACHE UNIT

MODIFIED S BOX

1121

| 1131 | 1132 | 1133 | 1134 | 1135 | 1136 | 1137 | 1138 |
|---|---|---|---|---|---|---|---|
| S[0] | S[81] | S[162] | S[243] | S[68] | S[149] | S[230] | S[55] |
| S[136] | S[217] | S[42] | S[123] | S[204] | S[29] | S[110] | S[191] |
| 1139 ...... | 1140 ...... | 1141 ...... | 1142 ...... | 1143 ...... | 1144 ...... | 1145 ...... | 1146 ...... |

1122

| A | A×177 mod 256 |
|---|---|
| 0 | 0 |
| 42 | 10 |
| 29 | 13 |
| 55 | 7 |
| 68 | 4 |
| 81 | 1 |
| 110 | 14 |
| 123 | 11 |
| 136 | 8 |
| 149 | 5 |
| 162 | 2 |
| 191 | 15 |
| 204 | 12 |
| 217 | 9 |
| 230 | 6 |
| 243 | 3 |

FIG.38

MODIFIED S BOX 1221

| 1231 | 1241 | 1232 | 1242 | 1233 | 1243 | 1234 | 1244 |
|---|---|---|---|---|---|---|---|
| S[0] | 0xff | S[81] | 0xff | S[162] | 0xff | S[243] | 0xff |
| S[68] | 0xff | S[149] | 0xff | S[230] | 0xff | S[55] | 0xff |
| 1235 | | 1236 | | 1237 | | 1238 | |
| ....... | ....... | ....... | ....... | ....... | ....... | ....... | ....... |
| | | | | | | | |

FIG.41

MODIFIED S BOX 1311

| 1331 | 1321 | 1332 | 1322 | 1333 | 1323 | 1334 | 1324 |
|---|---|---|---|---|---|---|---|
| 0xff | S[0] | 0xff | S[81] | 0xff | S[162] | 0xff | S[243] |
| 0xff | S[68] 1325 | 0xff | S[149] 1326 | 0xff | S[230] 1327 | 0xff | S[55] 1328 |
| ⋯⋯ | ⋯⋯ | ⋯⋯ | ⋯⋯ | ⋯⋯ | ⋯⋯ | ⋯⋯ | ⋯⋯ |
| | | | | | | | |

FIG. 44

MODIFIED S BOX S₁ ~ 1421

| 1431 | 1432 | 1433 | 1434 | 1435 | 1436 | 1437 | 1438 |
|---|---|---|---|---|---|---|---|
| S[0] | S[81] | S[162] | S[243] | S[68] | S[149] | S[230] | S[55] |
| S[136] | S[217] | S[42] | S[123] | S[204] | S[29] | S[110] | S[191] |
| ....... | ....... | ....... | ....... | ....... | ....... | ....... | ....... |
| | | | | | | | |

FIG.45

MODIFIED S BOX S2

1441

| S[0] | S[133] | S[10] | S[143] | S[20] | S[153] | S[30] | S[163] |
|---|---|---|---|---|---|---|---|
| S[40] | S[173] | S[50] | S[183] | S[60] | S[193] | S[70] | S[203] |
| ...... | ...... | ...... | ...... | ...... | ...... | ...... | ...... |

1451  1452  1453  1454  1455  1456  1457  1458

1442

| B | B×77 mod 256 |
|---|---|
| 0 | 0 |
| 10 | 2 |
| 20 | 4 |
| 30 | 6 |
| 40 | 8 |
| 50 | 10 |
| 60 | 12 |
| 70 | 14 |
| 133 | 1 |
| 143 | 3 |
| 153 | 5 |
| 163 | 7 |
| 173 | 9 |
| 183 | 11 |
| 193 | 13 |
| 203 | 15 |

FIG.49

DATA UNIT OF CACHE UNIT

175i

| | | | | | | | |
|---|---|---|---|---|---|---|---|
| #0 | S[0] | S[133] | S[10] | S[143] | S[20] | S[153] | S[30] | S[163] |
| #1 | S[40] | S[173] | S[50] | S[183] | S[60] | S[193] | S[70] | S[203] |

······

255

COMPUTER SYSTEM AND COMPUTER PROGRAM EXECUTING ENCRYPTION OR DECRYPTION

BACKGROUND OF THE INVENTION

1. Field of Invention

The present invention relates to encryption and decryption technologies for handling information in a confidential manner.

2. Description of the Related Art

Along with the dissemination of services that provide contents such as digitized music and videos via high-speed communication channels as represented by ADSL (Asymmetric Digital Subscriber Line) and fiber optics, there is an increasing need for preventing illegal copying and other unauthorized use of such contents.

In general, encryption technologies are applied to copyright protection systems for preventing unauthorized use of contents. For example, digital contents are encrypted with an encryption key, and then the encrypted contents are distributed via communication channels. Only user having provided with a decryption key corresponding to the encryption key are able to decrypt the encrypted contents to thereby play the original digital contents.

On the other hand, digital contents are now increasingly played on computers through the spread of personal computers. It has become progressively more common that an encryption process required for a copyright protection system is provided as an encryption program on a personal computer, and a decryption key used for decrypting encrypted contents is embedded within the encryption program beforehand.

In recent years, side channel attacks are proposed. One of the side channel attacks uses extra information leaked, during the execution of an encryption program on a computer, from the execution environment—i.e. the computer—to obtain secret information stored inside the encryption program in a confidential manner, for example, a decryption key. Processing times and power consumption are examples of such extra information used for side channel attacks.

According to Non-Patent References 1 and 2, there is a type of side channel attack known as a timing attack that focuses attention on a cache memory, which is built in a computer and used for enhancing a processing speed. Here, a cache memory (see Non-Patent Reference 3) is a memory that realizes high-speed processing. Specifically speaking, the high-speed processing is realized by storing data that the computation unit (e.g. the CPU) has obtained from the main memory once in the cache memory offering a high-speed access, and obtaining data from the cache memory thereafter when an access is made to the same data again.

A timing attack successfully determines secret information by focusing on a difference in processing times required for data acquisition from the cache memory and from the main memory.

Timing attacks are effective for encryption programs executed on CPUs having a cache memory, and target especially the AES (Advanced Encryption Standard) (described in Non-Patent Reference 4), which is an iterative block cipher using table reference operations (generally called "SBOX reference"), and the DES (Data Encryption Standard). Commonly used personal computers (e.g. PC/AT compatible machines) and smart cards having a cache memory are examples of such execution environments to which timing attacks are applicable.

The following is an outline of timing attacks.

In the AES, an EXCLUSIVE-OR operation is performed on input data and a private key (extended key), and then using the results of the operation, table reference operations are performed. Here, it is based on the assumption that, prior to the start of the encryption process, a table data array (SBOX) used in the table reference operations of the encryption process is not stored in the cache memory. Under this assumption, whether a table element of the table data array will be obtained from the cache memory or from the main memory in each table reference operation is uniquely determined depending on the input data and private key.

This means that, when values of the input data are varied, a specific table element is obtained from the cache memory in some table reference operations, and also obtained from the main memory in other table reference operations. That is to say, changing the input data results in change in the total encryption processing time.

Given this factor, a timing attack measures the total encryption processing time, and infers, based on the measured processing time, whether a table element was obtained from the cache memory or the main memory in a table reference operation of the process. Then, the timing attack analyzes the private key (extended key) based on the inference and the input data.

Such timing attacks mainly have two approaches: one is to measure the encryption processing time of each block (128 bits in the case of the AES) as described in Non-Patent Reference 1; and the other is to measure the encryption processing time of every two blocks (128 bits×2 in the case of the AES) as described in Non-Patent Reference 2. Timing attacks discussed in Non-Patent References 1 and 2 are outlined next.

The timing attack of Non-Patent Reference 1 exploits the fact that, when the same table element is accessed twice, the second access takes a shorter processing time than the first access since the table element for the second access is obtained from the cache memory. The general flow of the timing attack of Non-Patent Reference 1 is as follows.

First, contents of the cache memory are cleared each time one block is encrypted. Then, two table reference operations are focused, and a given value is assumed as to be key information having an influence on values of the input data for the two table reference operations. Under this assumption, input data whose value becomes the same in these two table reference operations is selected, and then their processing times are measured. These steps are performed on all possible values for the key information. Ultimately, a key with the shortest processing time is output as a correct key. Another two table reference operations are then focused again and the inference of the key is carried out in a similar manner.

On the other hand, the timing attack of Non-Patent Reference 2 exploits the characteristic that, with a single access to a table element in the encryption program on the main memory, actually multiple table elements are copied to the cache memory from the main memory. The general flow of the timing attack of Non-Patent Reference 2 is as follows.

First, contents of the cache memory are cleared each time two blocks are encrypted. Then, one table reference operation is focused, and a given value is assumed as to be key information having an influence on the values of the input data for the table reference operation. In the focused table reference operation for the first block, multiple table elements are copied from the main memory to the cache memory. Then, in the focused table reference operation for the second block, a value of the input data which refers to the same multiple table elements as those referred to by a value of the input data in the first block is selected (n.b. the selected value in the second block should be other than values of the input data in the first block), and the processing times are measured. These steps are performed on all possible values for the key information. Ultimately, a key with the shortest processing time is output as a correct key. Another table reference operation is then focused again and the inference of the key is carried out in a similar manner.

The encryption processing times of one/two blocks depend on input data, and timing attacks which measure processing times take advantage of this, as described above. Given this factor, a known defense against timing attacks is to cause these encryption processing times to become constant with no variation even if the input data is changed. The conventional technology described in Section 4.2 of Non-Patent Reference 5 is one example of such a defense. The outline of the conventional technology is explained next. Here, the AES is adopted as a specific applicable example of the encryption process.

The conventional technology disclosed in Non-Patent Reference 5 is characterized by adding a process independent of the input data before the execution of the AES encryption process. In the process (which is called "Cache Warming" in Non-Patent Reference 5), an access is made to each element in a table data array for table reference operations, which is used in the AES SubBytes operation. Herewith, all table elements used in the table reference operations of the AES SubBytes operation can be stored in the cache memory prior to the start of the AES encryption process, and consequently all the table elements can be obtained from the cache memory in the table reference operations of the AES SubBytes operation. As a result, the total processing time becomes consistently constant, not varying with the input data. That is, it is possible to increase resistance against timing attacks measuring processing times.

Patent Reference 1, which aims at offering an encryption apparatus having a defense function against cache-based attack cryptanalyses, and discloses means for, as to cache misses incurred during accesses to a conversion table in encryption/decryption processing, substantially equalizing the number of cache misses made in encryption/decryption of one plain text/ciphertext with that of any plain text/ciphertext.
<Non-Patent Reference 1>Y. Tsunoo, E. Tsujihara, K. Minematsu, and H. Miyauchi, "Cryptanalysis of Block Ciphers Implemented on Computers with Cache", International Symposium on Information Theory and Its Applications (ISITA), October 2002.
<Non-Patent Reference 2> Toyohiro Tsurumaru et al., "Timing Attacks on 64-bit Block Ciphers", The 2003 Symposium on Cryptography and Information Security (SCIS2003), 2003.
<Non-Patent Reference 3> D. A. Patterson and J. L. Hennesy, "Computer Organization and Design", ISBN4-8222-8056-X, Published by Nikkei BP.
<Non-Patent Reference 4> Federal Information Processing Standard (FIPS) Publication 197, Nov. 26, 2001.
<Non-Patent Reference 5> D. Page, "Defending Against Cache-Based Side-Channel Attacks", Information Security Technical Report, Vol. 8, No. 1, pp. 30-44, 2003.
<Patent Reference 1> Japanese Laid-Open Patent Application Publication No. 2004-120307.

BRIEF SUMMARY OF THE INVENTION

As mentioned above, however, a study of timing attacks that measure processing times has advanced, and there is a demand for development of different defense methods.

In order to meet the demand, the present invention aims at offering a computer system, a method and a computer program which have resistance to timing attacks that measure processing times.

In order to achieve the above object, the present invention is a computer system for encrypting/decrypting a plain text/a ciphertext by undertaking a conversion process for converting partial data related to the plain text/the ciphertext into converted data which corresponds to the partial data. The computer system comprises: a main memory unit storing therein a conversion table including the converted data, and a computer program including a plurality of instructions for obtaining the converted data in the conversion process by using the conversion table; a cache memory unit including a line storage area of a predetermined length; and an execution unit operable to fetch each of the instructions from the computer program, decode the fetched instruction, and operate according to a decoding result. Here, in order to obtain the converted data included in the conversion table, the execution unit (i) first tries to obtain the converted data from the line storage area, (ii) obtains the converted data from the main memory unit when the converted data is not present in the line storage area, and (iii) writes inclusion data of the predetermined length to the line storage area, the inclusion data including the obtained converted data. The conversion table (inclusion data) has a line table area of the predetermined length, and includes (i) the converted data at a predetermined position in the line table area and (ii) data irrelevant to the conversion at another position in the line table area. The computer program includes: an obtaining instruction group for obtaining the partial data; an operation instruction group for calculating the predetermined position of the converted data in the conversion table using the obtained partial data; and a reading instruction group for reading, from the conversion table, the converted data present at the calculated position.

According to the above configuration, one piece of converted data is included in the line storage area of the cache memory unit, and therefore the encryption/decryption processing times become constant even if the input data is changed. This leads to an enhancement of the resistance against timing attacks that measure the processing times.

Here, in the computer system, the conversion table (inclusion data) may include therein the converted data at a position depending on a value that the partial data has, and the operation instruction group may perform an operation on the obtained partial data to calculate the position of the converted data in the conversion table. In addition, the predetermined length may be w times the length of the converted data, w being an integer. Here, the line table area includes therein the converted data at the predetermined position, and includes therein the irrelevant data at all remaining positions therein. The operation instruction group uses multiplication by the integer w to calculate the position of the converted data in the conversion table. Furthermore, the predetermined position may be the start of the line table area, and the operation instruction group may multiply the obtained partial data by the integer w to calculate the position of the converted data in the conversion table.

According to these configurations, the position of the converted data corresponding to the partial data can be determined by a simple operation.

Here, in the computer system, the line table area may further include therein (i) different converted data corresponding to different partial data at a different predetermined position and (ii) the irrelevant data at all remaining positions. In addition, the predetermined length may be w times the length of the converted data, w being an integer, and the predetermined position may be the start of the line table area, and the different predetermined position may be the start of the second half of the line table area. The operation instruction group multiplies the obtained partial data by the integer w divided by 2 to calculate the position of the converted data in the conversion table. Alternatively, the predetermined length may be w times the length of the converted data, w being an integer, and the predetermined position may be an $x^{th}$ position from the start of the line table area, x being an integer. Here, the different predetermined position is an $x^{th}$ position from the start of the second half of the line table area. The operation instruction group multiplies the obtained partial data by the integer w divided by 2 and then adds the integer x to calculate the position of the converted data in the conversion table.

According to these configurations, one or more pieces of conversion data are included in the line storage area of the cache memory unit, and therefore the capacity of the cache memory unit can be set smaller while the resistance against the timing attacks measuring the processing times is kept constant.

Here, the present invention may be a computer system for encrypting/decrypting a plain text/a ciphertext by undertaking a conversion process for converting partial data related to the plain text/the ciphertext into converted data which corresponds to the partial data. The computer system comprises: a main memory unit storing therein a conversion table including the converted data, and a computer program including a plurality of instructions for obtaining the converted data in the conversion process by using the conversion table; a cache memory unit including a line storage area of a predetermined length; and an execution unit operable to fetch each of the instructions from the computer program, decode the fetched instruction, and operate according to a decoding result. Here, in order to obtain the converted data included in the conversion table, the execution unit (i) first tries to obtain the converted data from the line storage area, (ii) obtains the converted data from the main memory unit when the converted data is not present in the line storage area, and (iii) writes inclusion data of the predetermined length to the line storage area, the inclusion data including the obtained converted data. The conversion table has a line table area of the predetermined length, and includes the converted data at a predetermined position in the line table area. The computer program includes: an obtaining instruction group for obtaining the partial data; an operation instruction group for calculating the predetermined position of the converted data in the conversion table using the obtained partial data; and a reading instruction group for reading, from the conversion table, the converted data present at the calculated position. The predetermined position is obtained by performing a predetermined operation on the partial data, and the operation instruction group performs the predetermined operation on the partial data to calculate the position of the converted data in the conversion table. Here, the predetermined operation may be multiplication of the partial data by an odd number under mod z. z is the largest count of different values that the partial data can possibly take.

According to these configurations, pieces of converted data are randomly arranged in the conversion table. As a result, the resistance against the attacks can be maintained as long as the predetermined operation is not revealed.

Here, the present invention may be a computer system for encrypting/decrypting a plain text/a ciphertext by undertaking a conversion process for converting partial data related to the plain text/the ciphertext into converted data which corresponds to the partial data. The computer system comprises: a main memory unit storing therein a $1^{st}$ conversion table including the converted data, a $2^{nd}$ conversion table including the converted data, and a computer program including a plurality of instructions for obtaining the converted data in the conversion process by using the $1^{st}$ and $2^{nd}$ conversion tables; a cache memory unit including a line storage area of a predetermined length; and an execution unit operable to fetch each of the instructions from the computer program, decode the fetched instruction, and operate according to a decoding result. Here, in order to obtain the converted data included in the $1^{st}$ and $2^{nd}$ conversion tables, the execution unit (i) first tries to obtain the converted data from the line storage area, (ii) obtains the converted data from the main memory unit when the converted data is not present in the line storage area, and (iii) writes inclusion data of the predetermined length to the line storage area, the inclusion data including the obtained converted data. Here, each of the $1^{st}$ and $2^{nd}$ conversion tables has a line table area of the predetermined length, and includes the converted data at a predetermined position in the line table area. The computer program includes: an obtaining instruction group for obtaining the partial data; an operation instruction group for calculating the predetermined position of the converted data in the conversion table using the obtained partial data; and a reading instruction group for reading, from the conversion table, the converted data present at the calculated position. The predetermined position in the $1^{st}$ conversion table is obtained by performing a $1^{st}$ operation on the partial data, and the predetermined position in the $2^{nd}$ conversion table is obtained by performing a $2^{nd}$ operation on the partial data. The operation instruction group includes: a determination instruction for determining, for each conversion, which one of the $1^{st}$ and $2^{nd}$ conversion tables to be used; and a calculation instruction for calculating the predetermined position of the converted data in the determined conversion table by performing, on the partial data, one of the $1^{st}$ and $2^{nd}$ operations corresponding to the determined conversion table. In addition, the $1^{st}$ operation may be multiplication of the partial data by a $1^{st}$ odd number under mod z. Here, the $2^{nd}$ operation is multiplication of the partial data by a $2^{nd}$ odd number under mod z. z being the largest count of different values that the partial data can possibly take. The determination instruction generates a random number and determines which one of the $1^{st}$ and $2^{nd}$ conversion tables to be used according to the generated random number.

According to these configurations, a different conversion table is used for each conversion, and the resistance against the attacks can therefore be maintained.

BRIEF DESCRIPTION OF THE DRAWINGS

FIG. 6 shows a data structure of a modified S box 511;

FIG. 12 shows an example where the contents of the modified S box 511 are stored in cache line units 181 to 187 of a data unit 175;

FIG. 17 is a flowchart illustrating details of a content decryption program 232 and a playback program 233;

FIG. 20 shows a data structure of an inverse transform modified S box 611;

FIG. 25 shows an example where contents of the inverse transform modified S box 611 are stored in each cache line unit of the data unit;

FIG. 28 shows a data structure of a modified S box 911;

FIG. 29 is a data process chart showing one left-shifting process 902 and one reference process 903 in the SubBytes process of the SubBytes processing module 505a;

FIG. 30 shows an example where contents of a modified S box 911 are stored in the cache line units 181, 182, and ... of the data unit 175;

FIG. 31 shows a data structure of a modified S box 1011;

FIG. 33 shows an example where contents of a modified S box 1011 are stored in the cache line units 181, 182, and ... of the data unit 175;

FIG. 34 shows a data structure of a modified S box 1121;

FIG. 38 shows a data structure of a modified S box 1221;

FIG. 41 shows a data structure of a modified S box 1311;

FIG. 44 shows a data structure of a modified S box 1421;

FIG. 45 shows a data structure of a modified S box 1441;

FIG. 49 shows an example where contents of a modified S box 1441 are stored in the cache line units 181, 182, and ... of the data unit 175.

DETAILED DESCRIPTION OF THE INVENTION

1. Content Distribution System 10

A content distribution system 10 is explained next as an embodiment of the present invention.

1.1 Configuration of Content Distribution System 10

Figure 1:
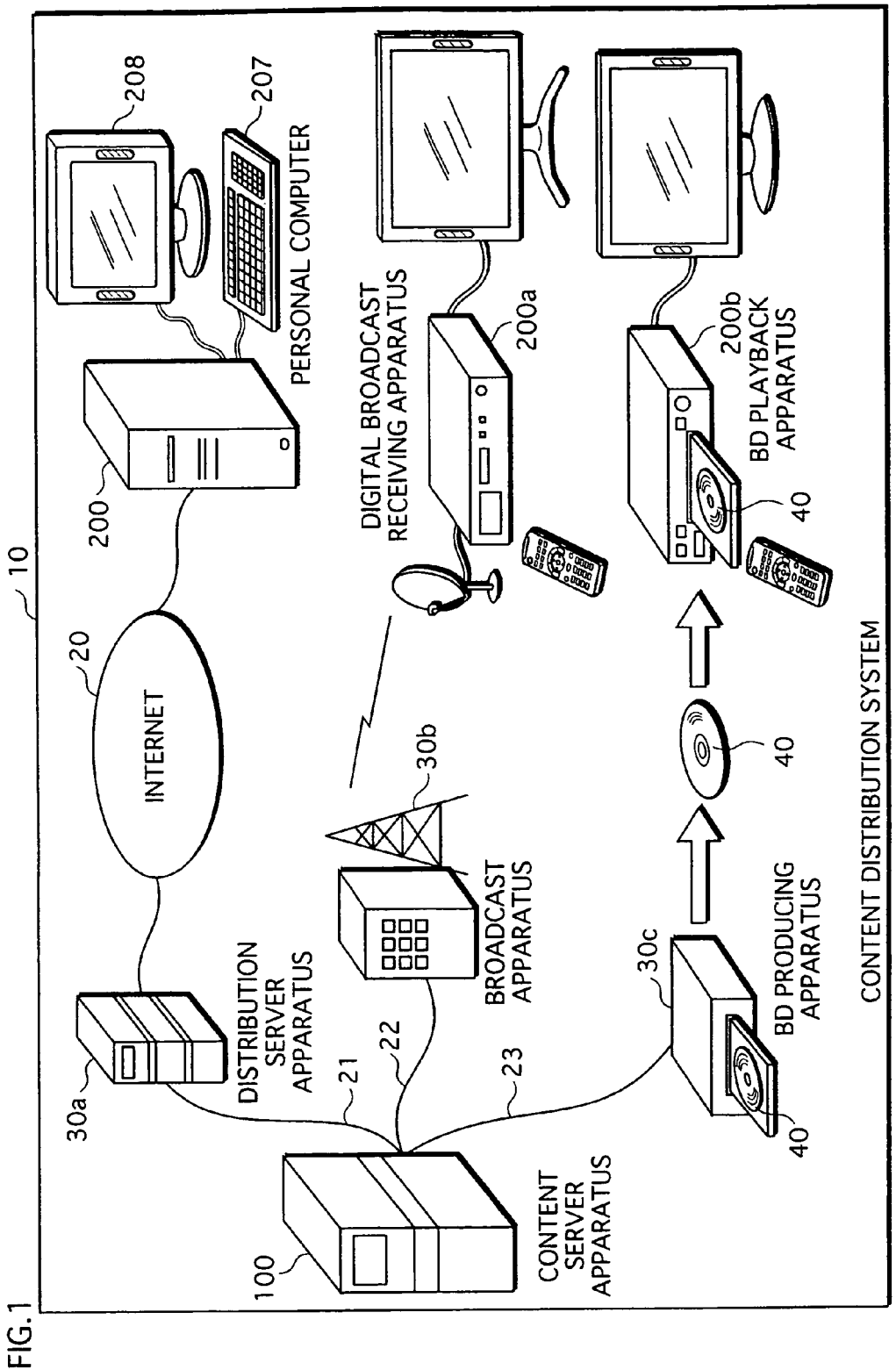
FIG. 1 shows a configuration of a content distribution system 10 according to Embodiment 1 of the present invention.

The content distribution system 10, as shown in FIG. 1, comprises: a content server apparatus 100; a distribution server apparatus 30a; a broadcast apparatus 30b; a BD producing apparatus 30c; a personal computer 200; a digital broadcast receiving apparatus 200a; and a BD playback apparatus 200b.

The content server apparatus 100 stores therein movie contents including video data and audio data, encrypts the stored contents in response to a request of the distribution server apparatus 30a to thereby generate encrypted contents, and transmits the encrypted contents to the distribution server apparatus 30a which is connected to the contents server apparatus 100 via a dedicated line 21. The distribution server apparatus 30a receives the encrypted contents and transmits the encrypted contents to the personal computer 200, which is connected to the distribution server apparatus 30a via the Internet 20. The personal computer 200 receives the encrypted contents, decrypts the encrypted contents to generate decrypted content, and plays the decrypted contents to output videos and audio.

The contents server apparatus 100 also, in a similar fashion as described above, generates encrypted contents in response to a request of the broadcast apparatus 30b and transmits the encrypted contents to the broadcast apparatus 30b which is connected to the content server apparatus 100 via a dedicated line 22. The broadcast apparatus 30b receives the encrypted contents and broadcasts the encrypted contents by broadcast waves, and then the digital broadcast receiving apparatus 200a receives the broadcast waves, extracts the encrypted contents from the broadcast waves, decrypts the encrypted contents to generate decrypted contents, and plays the decrypted contents to output videos and audio.

Furthermore, the content server apparatus 100 also, in a similar fashion described above, generates encrypted contents in response to a request of the BD producing apparatus 30c and transmits the encrypted contents to the BD producing apparatus 30c which is connected to the content server apparatus 100 via a dedicated line 23. The BD producing apparatus 30c receives the encrypted contents and writes the encrypted contents to a recording medium 40. The recording medium 40 on which the encrypted contents are written is sold, and then purchased by a user. The BD playback apparatus 200b on which the recording medium 40 is loaded by the user reads the encrypted contents from the recording medium 40, decrypt the encrypted contents to generate decrypted contents, and plays the decrypted contents to output videos and audio.

1.2 Configuration of Content Server Apparatus 100

Figure 2:
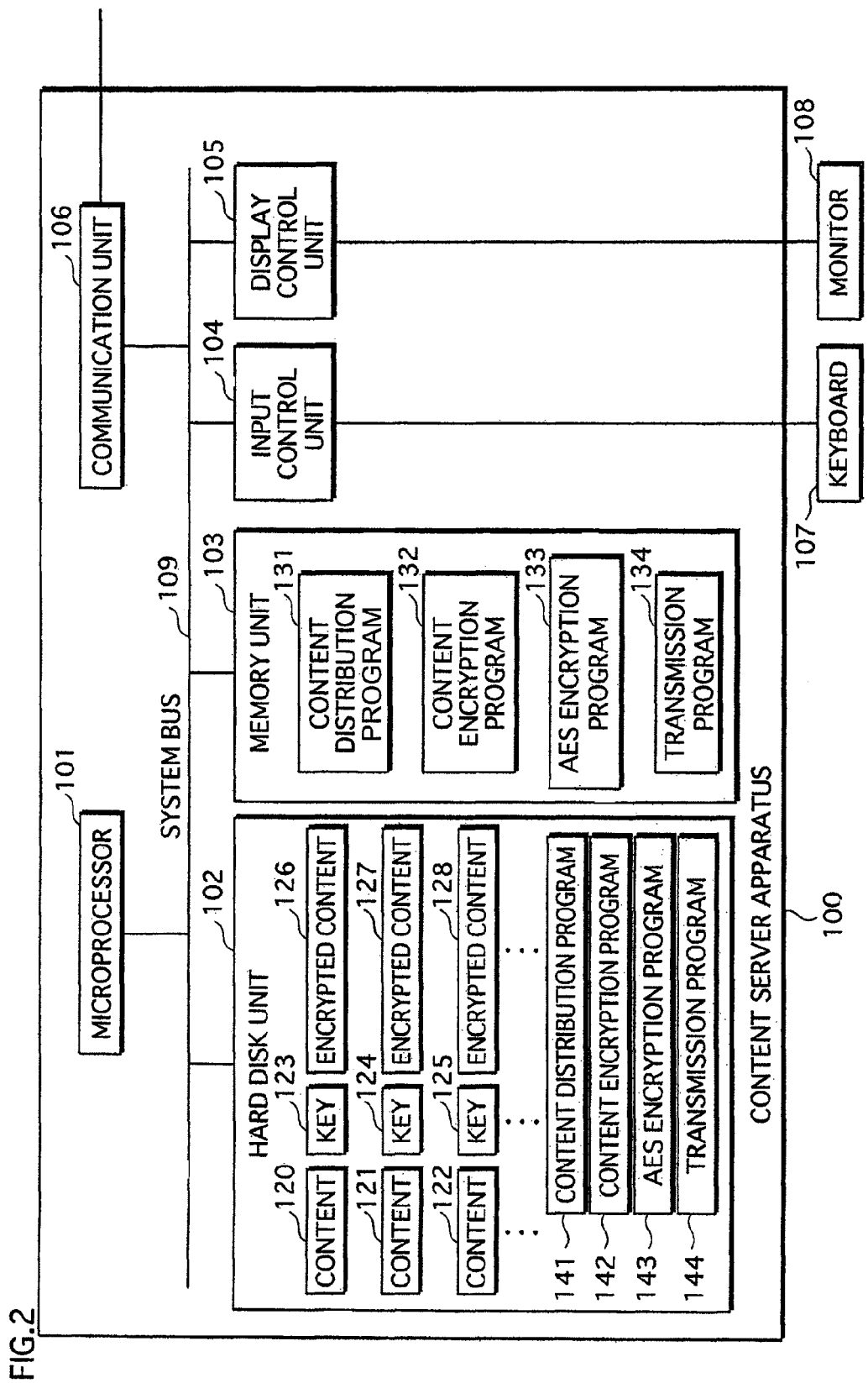
FIG. 2 is a block diagram showing a configuration of a content server apparatus 100.

The content server apparatus 100 is a computer system comprising a microprocessor 101, a hard disk unit 102, a memory unit 103, an input control unit 104, a display control unit 105, a communication unit 106, a system bus 109 and the like, as shown in FIG. 2. The microprocessor 101, hard disk unit 102, memory unit 103, input control unit 104, display control unit 105 and communication unit 106 are connected to one another via the system bus 109. In addition, the input control unit 104 and display control unit 105 are connected to the keyboard 107 and monitor 108, respectively. Additionally, the communication unit 106 is connected to the distribution server apparatus 30a, broadcast apparatus 30b and BD producing apparatus 30c via the dedicated lines 21, 22 and 23, respectively.

Stored in the hard disk unit 102 and memory unit 103 are various computer programs and other data, and the content server apparatus 100 realizes part of its functions when the microprocessor 101 operates according to each computer program.

(1) Hard Disk Unit 102

The hard disk unit 102 is a memory unit for storing therein computer programs and data for a long term. The hard disk unit 102 stores, as shown in the FIG. 2, therein contents 120, 121, 122, and . . . , keys 123, 124, 125, and . . . , a content distribution program 141, a content encryption program 142, an AES encryption program 143, a transmission program 144, and other computer programs and data which are not shown in the figure. In addition, the hard disk unit 102 also has areas for storing encrypted contents 126, 127, 128, and . . . .

The contents 120, 121, 122, and . . . correspond to the keys 123, 124, 125, and . . . , respectively, as well as correspond to the encrypted contents 126, 127, 128, and . . . , respectively.

Each of the contents 120, 121, 122, and . . . is compressed data which is generated by compression coding video data and audio data highly efficiently.

The keys 123, 124, 125, and . . . are encryption keys used when an encryption algorithm is applied to the contents 120, 121, 122, and . . . , respectively, to generate the encrypted contents 126, 127, 128, and . . . , and each of the keys 123, 124, 125, and . . . is data of 128-bit length. Here, the encryption algorithm is based on the AES (Advanced Encryption Standard).

The encrypted contents 126, 127, 128, and . . . are encrypted data generated by applying the encryption algorithm AES to the contents 120, 121, 122, and . . . .

The content distribution program 141, content encryption program 142, AES encryption program 143 and transmission program 144 are loaded, on the memory unit 103 by an instruction of the microprocessor 101, as a content distribution program 131, a content encryption program 132, an AES encryption program 133 and a transmission program 134, respectively. These computer programs are described hereinafter.

(2) Memory Unit 103

The memory unit 103 is a memory unit for temporarily storing there computer programs and data which are implementation targets, and has, as shown in FIG. 2, areas for storing the content distribution program 131, content encryption program 132, AES encryption program 133, transmission program 134, and other programs and data not shown in the figure.

Each of the above programs is a computer program composed by combining multiple instruction codes in a machine-language format. The machine-language format is a format decoded and executed by the microprocessor 101.

Contents of each computer program are explained next. Here, in order to facilitate understanding, the contents of the respective computer programs are expressed not using instruction codes in the machine-language format, but in usual colloquial and written languages and/or using flowcharts.

(a) Content Distribution Program 131

The content distribution program 131 is formed with multiple instruction codes included therein.

These instruction code groups indicate to (1) receive, from a content distribution destination apparatus—e.g. the distribution server apparatus 30a, a specification of a content—e.g. the content 120—and a specification of a content distribution destination apparatus, (2) specify the contents indicated by the received specification, (3) call the content encryption program 132, then (4) write, into the hard disk unit 102, an encrypted content generated by the content encryption program 132 as, for example, the encrypted content 126, (5) specify the distribution destination apparatus according to the received specification and the encrypted content generated and written into the hard disk unit 102, and (6) call the transmission program 134.

Thus, the microprocessor 101 operates according to the content distribution program 131, and whereby the generated encrypted content is transmitted to the distribution destination apparatus indicated by the received specification.

(b) Content Encryption Program 132

Figure 3:
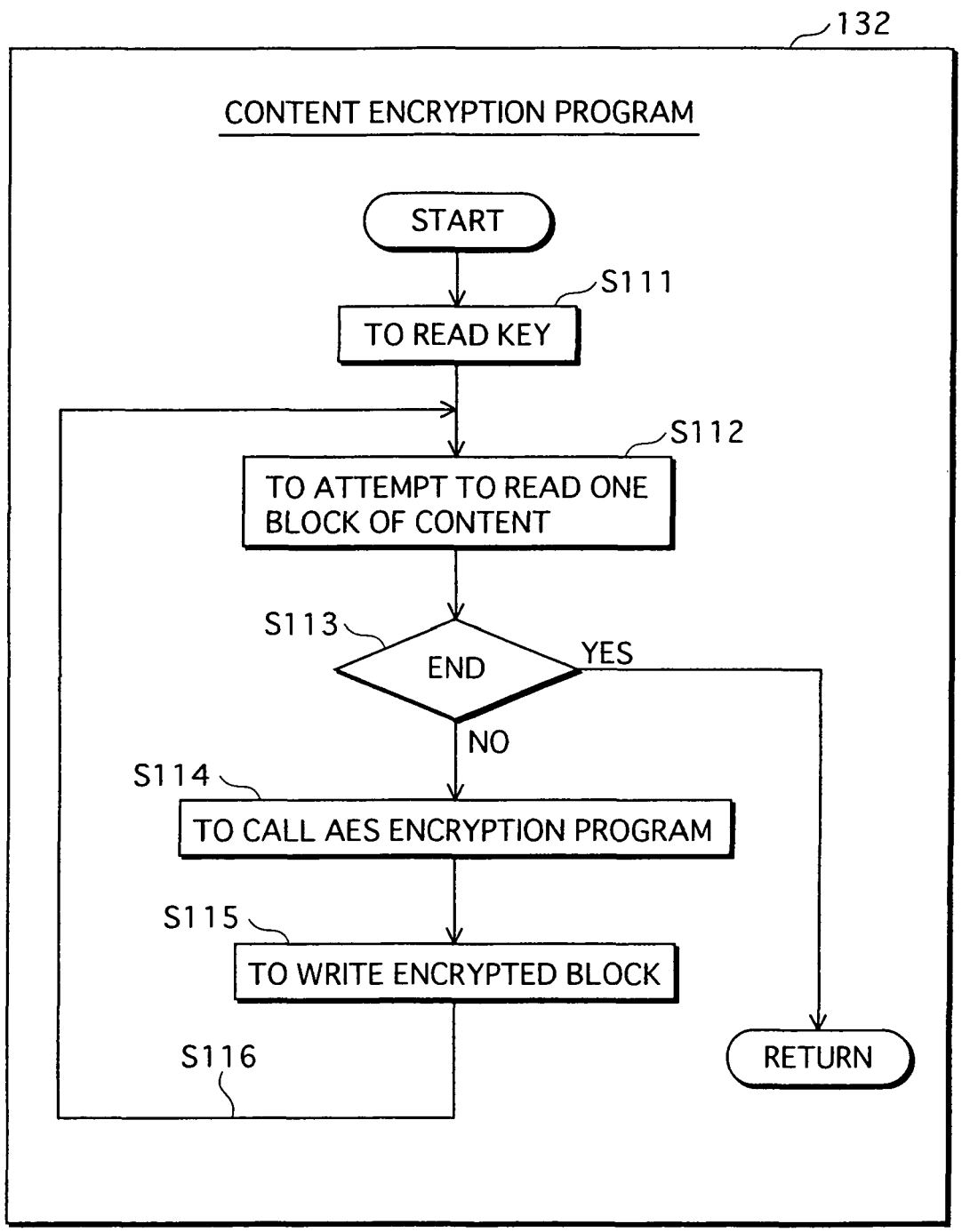
FIG. 3 is a flowchart illustrating details of a content encryption program 132.

The content encryption program 132 is, as shown in FIG. 3, formed with groups of instruction codes S111, S112, S113, S114, S115 and S116 included therein, and the instruction code groups are arranged in the stated order in the content encryption program 132. Each instruction code group includes one or more instruction codes.

The instruction code group S111 includes multiple instruction codes which indicate to assign a value of "−128" as an initial value to a readout point that shows a data position within the specified content in bit values and read out a key corresponding to the specified content from the hard disk unit 102. Here, the readout point, to which the value "−128" is assigned, shows a position outside of the content, and the reason why assigning the value "−128" as an initial value to the readout point is to cause the readout point to indicate the starting position of the content at the beginning of the execution of the instruction code group S112 to be hereinafter described. At the beginning of the execution of the instruction code group S112, 128 bits are added to the readout point to thereby change the value to "0". As a result, the readout point indicates the start of the content.

The instruction code group S112 includes (i) multiple instruction codes which indicate to add 128 bits to the readout point and then try to read out one block of data starting, within the content, from the position indicated by the added readout point, and (ii) multiple instruction codes which indicate to, (1) if the position indicated by the readout point is within the content, read out one block of data from this position, and (2) if the position indicated by the readout point is outside of the content, output an end code indicating that the readout of blocks is finished. Here, one block is data of 128 bits in length.

The instruction code group S113 includes multiple instruction codes which indicate to, when an end code is output from the instruction code group S112, end the processing of the content encryption program 132, and when the end code is not yet output, move the control to the next instruction code group S114.

The instruction code group S114 includes multiple instruction codes which indicate to call the AES encryption program 133 while holding the read key and one block of data. That the AES encryption program 133 is called while the one block is held causes encryption of the block by the AES to thereby generate an encrypted block.

In the AES, both an input message (plain text) and an output message (ciphertext) are 128 bits, and an encryption key and a decryption key to be input can be selected from 128 bits, 192 bits and 256 bits. In the present embodiment, the encryption key and decryption key are 128 bits.

The instruction code group S115 includes multiple instruction codes which indicate to write the one encrypted block generated by the AES encryption program 133 to the hard disk unit 102 as, for example, a part of the encrypted content 126.

The instruction code group S116 includes instruction codes which indicate to move the control to the instruction code group S112.

(c) AES Encryption Program 133

Figure 4:
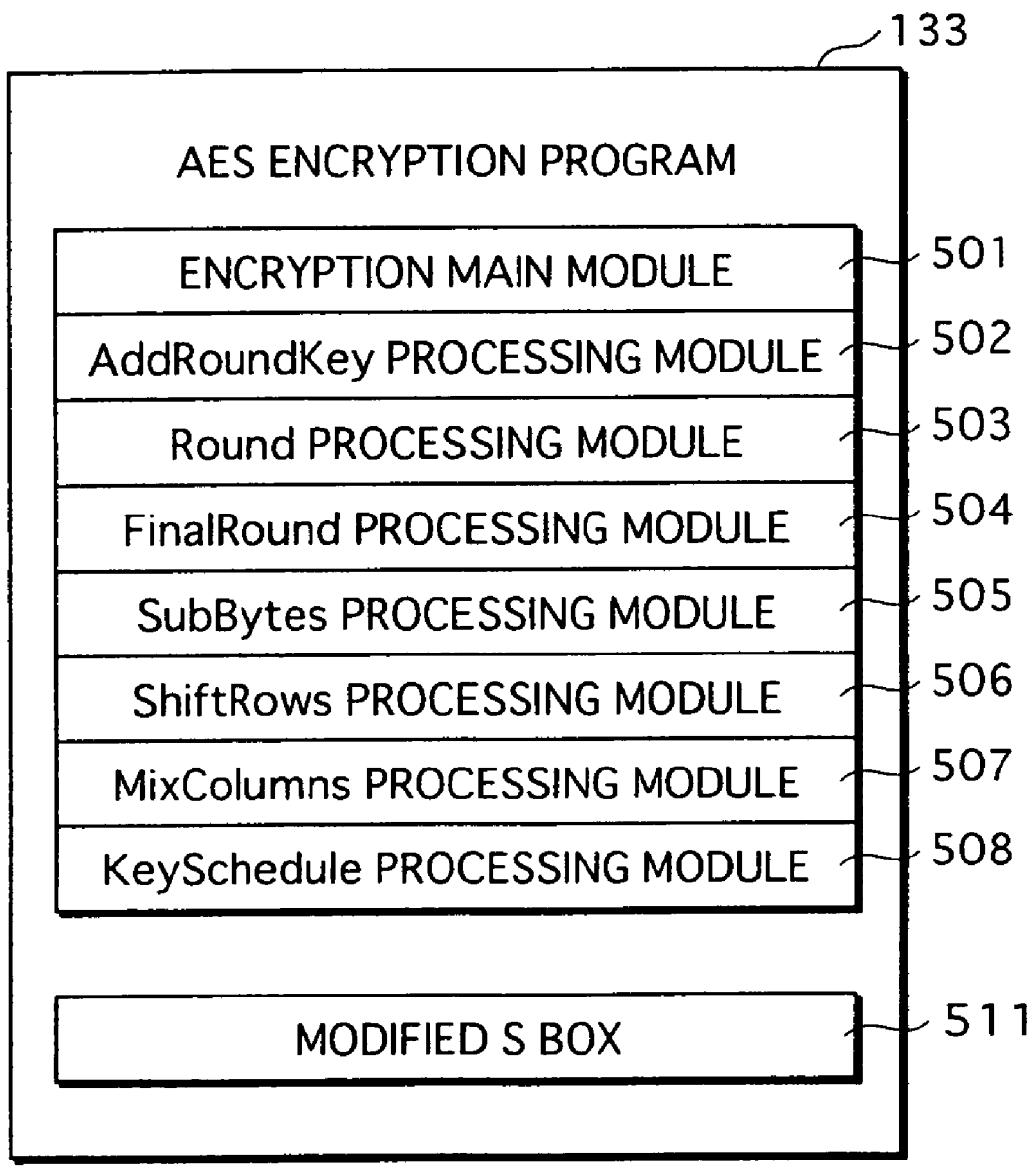
FIG. 4 shows a configuration of an AES encryption program 133.

The AES encryption program 133 is an encryption algorithm for generating a ciphertext block of 128 bits in length by encrypting a plain text of 128 bits in length. The AES encryption program 133, as shown in FIG. 4, comprises: an encryption main module 501; an AddRound Key processing module 502; a Round processing module 503; a FinalRound processing module 504; a SubBytes processing module 505; a ShiftRows processing module 506; a MixColumns processing module 507; a KeySchedule processing module 508; and an modified S box 511 (e.g., a conversion table).

Each module is a computer program composed by combining multiple instruction codes in a machine-language format. The machine-language format is a format decoded and executed by the microprocessor 101.

(c-1) Standard S Box 380

Figure 5:
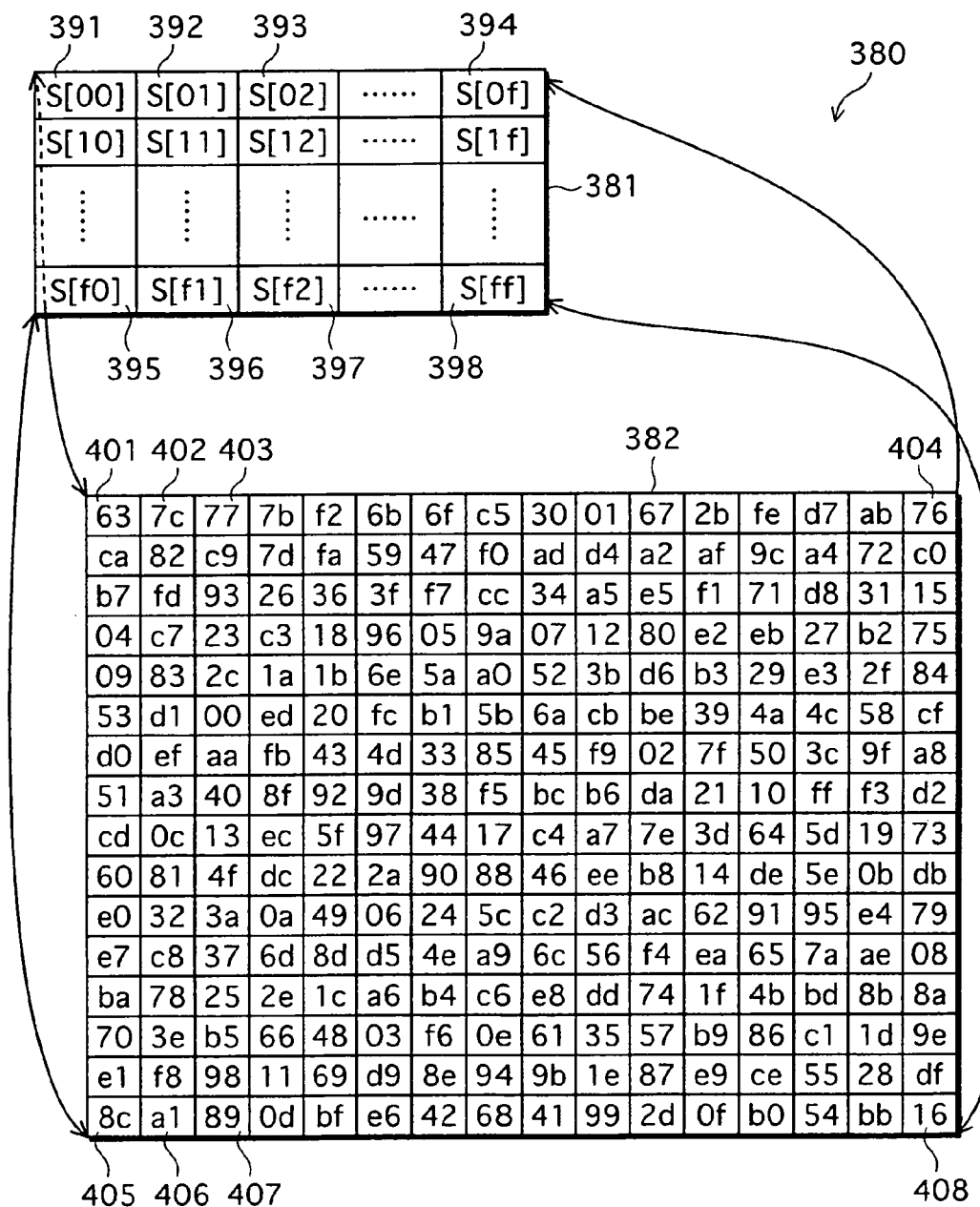
FIG. 5 shows a data structure of a standard S box 380.

Here is explained a standard S box 380 which is a table data array generally used in an S box reference process that performs 8-bit input and output defined in the AES encryption, with the aid of array representations 381 and 382 shown in FIG. 5.

Note that, although the term "standard S box" is not generally used in the AES, it is adopted here in order to distinguish it from the modified S box 511 used in the present embodiment.

The array representations 381 and 382 shown in FIG. 5 represent the standard S box 380. The array representation 381 shows multiple array elements included in the standard S box 380 by distinguishing each element by an array number (suffix), and the array representation 382 shows specific values of the multiple array elements of the standard S box 380.

For representation convenience, the array representation 381 here includes multiple array elements arranged in a matrix of 16 rows by 16 columns, and the array representation 382 includes specific values of the multiple array elements arranged in the matrix of 16 rows by 16 column. An array element positioned at one position in the matrix of the array representation 381 corresponds to a specific value positioned at the same position in the matrix of the array representation 382.

The standard S box 380 includes 256 pieces of array elements 391, 392, 393, ..., 394, ..., 395, 396, 397, ..., and 398. Each array element is data of 8 bits, and represented as "S[xx]". Here, "S" is an array element name showing an array element, and a value "xx" following "S" and placed in the parentheses "[ ]" is an array number for identifying the array element. Each array number for the array elements of the array representation 381 of FIG. 5 is given in hexadecimal.

To be more specific, the 256 array elements 391 "S[00]", 392 "S[01]", 393 "S[02]", ..., 394 "S[0f]", ..., 395 "S[f0]", 396 "S[f1]", 397 "S[f2]", ..., and 398 "S[ff]" are specific values 401 "63", 402 "7c", 403 "77", ..., 404 "76", ..., 405 "8c", 406 "a1", 407 "89", ..., and 408 "16", respectively. These specific values are represented in hexadecimal.

(c-2) Modified S Box 511

The modified S box 511 is described next.

As shown in FIG. 6, the modified S box 511 comprises 2048 pieces of array elements 431, 441, 442, 443, 444, 445, 446, 447, 432, ..., 433, ..., 434, ..., 435, ..., 436, ..., 437, ..., 438, and ....

For representation convenience, the array elements making up the modified S box 511 in FIG. 6 are arranged in a matrix of 256 rows by 8 columns.

Each array element is data of 8 bits. Accordingly, array elements of 1 row by 8 columns are 64 bits in length.

The 256 array elements 431, 432, 433, 434, ..., 435, 436, 437, and 438 in the first column have values S[00], S[01], S[02], S[03], S[fc], S[fd], S[fe], and S[ff], respectively. Here, the values S[00], S[01], ..., S[fe] and S[ff] are the same as those in the standard S box 380 above.

Each of the 256 array elements in the second column has a value of "0xff". Here, "0x" indicates that the subsequent numeric value is represented in hexadecimal.

Each array element included in the third to eighth columns has a value of "0xff".

Thus, when the multiple array elements included in the modified S box 511 are assumed to be arranged in a matrix of 256 rows by 8 columns, the array elements included in the standard S box 380 are placed in the 256 array elements of the first column in the modified S box 511, and a value "0xff" is placed in each array element of the second to eighth columns.

Hence, when focused on eight array elements continuously positioned in one row of the modified S box 511, the start array element has the same value as an array element included in the standard S box 380, and the remaining array elements each have a meaningless value "0xff".

(c-3) Encryption Main Module 501

Figure 7:
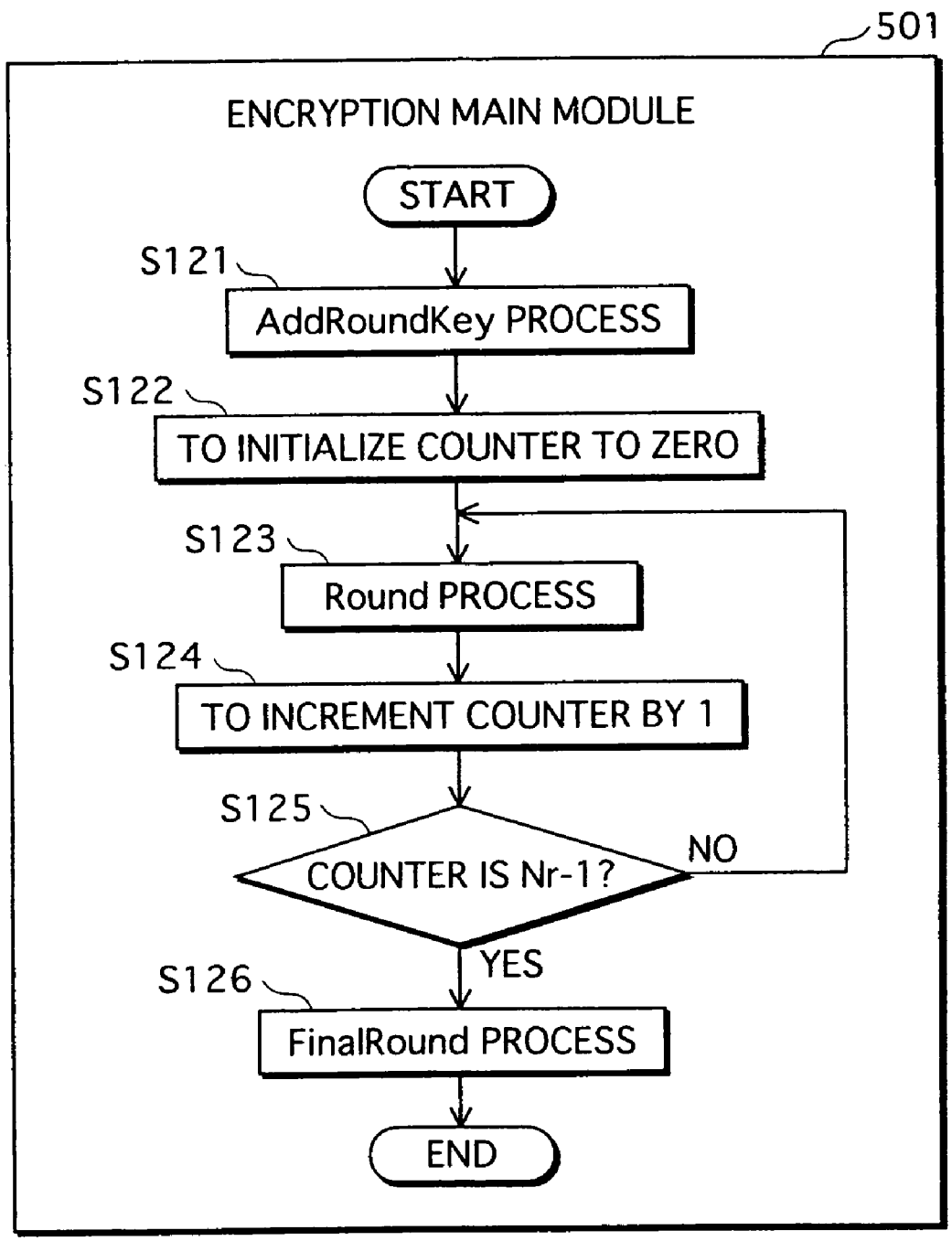
FIG. 7 is a flowchart illustrating details of an encryption main module 501.

The encryption main module 501 is formed with instruction code groups S121, S122, S123, S124, S125 and S126, as shown in FIG. 7. These instruction code groups are arranged in the encryption main module 501 in the stated order. Each instruction code group includes one or more instruction codes.

The instruction code group S121 includes multiple instruction codes that indicate to call an AddRoundKey processing module 502 for performing an AddRoundKey process which is an operation using an input plain text block and an extended key generated from an encryption key.

The instruction code group S122 includes multiple instruction codes that indicate to initialize a counter to zero. The counter is used for controlling repetition in the encryption main module 501.

The instruction code group S123 includes multiple instruction codes that indicate to call the Round processing module 503 for performing a Round process to be hereinafter described.

The instruction code group S124 includes multiple instruction codes that indicate to add "1" to the counter.

The instruction code group S125 includes multiple instruction codes that indicate to judge whether the counter is a predetermined number of repetition "Nr−1", move to the instruction code group S123 when it is not the number of repetition "Nr−1", and move to the next instruction code group S126 when it is the number of repetition "Nr−1".

Here, a number of repetition "Nr" depends on bit lengths of the encryption key and decryption key. In the case where the encryption and decryption keys each have 128 bits in length, Nr=10. Nr=12 when the length is 192 bits, and Nr=14 when the length is 256 bits.

The instruction code group S126 includes multiple instruction codes that indicate to call the FinalRound processing module 504 for performing a FinalRound process to be hereinafter described.

(c-4) Round Processing Module 503

Figure 8:
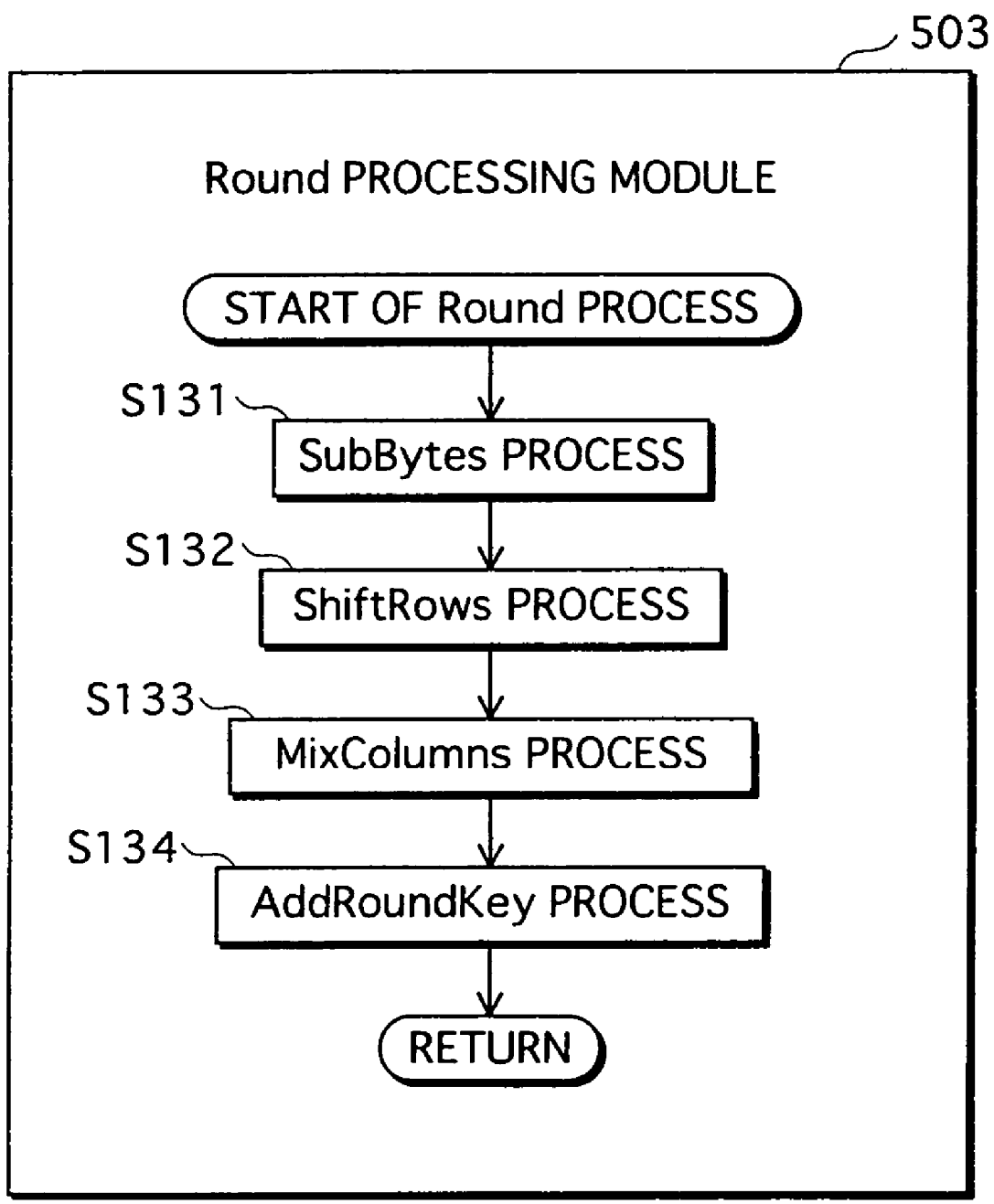
FIG. 8 is a flowchart illustrating details of a Round processing module 503.

The Round processing module 503 is, as shown in FIG. 8, formed with instruction codes groups S131, S132, S133 and S134 included therein. These instruction code groups are arranged in the Round processing module 503 in the stated order. Each instruction code group includes one or more instruction codes.

The instruction code group S131 includes multiple instruction codes that indicate to call the SubBytes processing module 505 for performing a SubBytes process composed of sixteen table reference operations.

The instruction code group S132 includes multiple instruction codes that indicate to call the ShiftRows processing module 506 for performing a ShiftRows process.

The instruction code group S133 includes multiple instruction codes that indicate to call the MixColumns processing module 507 for performing a MixColumns process.

The instruction code group S134 includes multiple instruction codes that indicate to call the AddRoundKey processing module 502 for performing the above-mentioned AddRoundKey process.

(c-5) SubBytes Processing Module 505

In the SubBytes process of the present embodiment, block data of 128 bits is received, the received 128-bit block data is divided into 16 pieces of partial block data of 8 bits (8 bits× 16=128 bits), and each partial block data is shifted to the left by three bits. Thus, data of 11 bits is generated for each of the sixteen pieces of partial block data. Then, a process of referring to the modified S box is carried out on each data of 11 bits to output 8-bit data.

Thus, with respect to sixteen pieces of partial block data, the left shifting and the process of referring to the modified S box are performed. As a result, sixteen pieces of 8-bit data are generated. The generated sixteen pieces of 8-bit data are joined to form block data of 128 bits, which is then output.

The following is the reason why each partial block data is shifted to the left by three bits as described above.

By shifting to the left by three bits, each partial block becomes eight times larger. Among eight array elements continuously positioned in one row of the modified S box 511, the one array element at the start has a valid value S[xx]. Accordingly, by referring to the modified S box 511 using, as an address, the data obtained by multiplying each partial block data by eight, only the valid value S[xx] is attained.

Note that the SubBytes processing module 505 may include a multiplication process performing multiplication by eight, in place of the process of 3-bit left shifting, on the account described above.

Similarly, in another modified S box, if the valid value S[xx] is placed in the first array element of sixteen array elements positioned continuously, the valid value S[xx] only can be attained by referring to this modified S box using data obtained by multiplying each partial block data by 16 as an address.

Furthermore, in a different modified S box, if the valid value S[xx] is placed in the first array element of four continuously positioned array elements, the valid value S[xx] only can be attained by referring to this modified S box using data obtained by multiplying each partial block data by 4 as an address.

Figure 9:
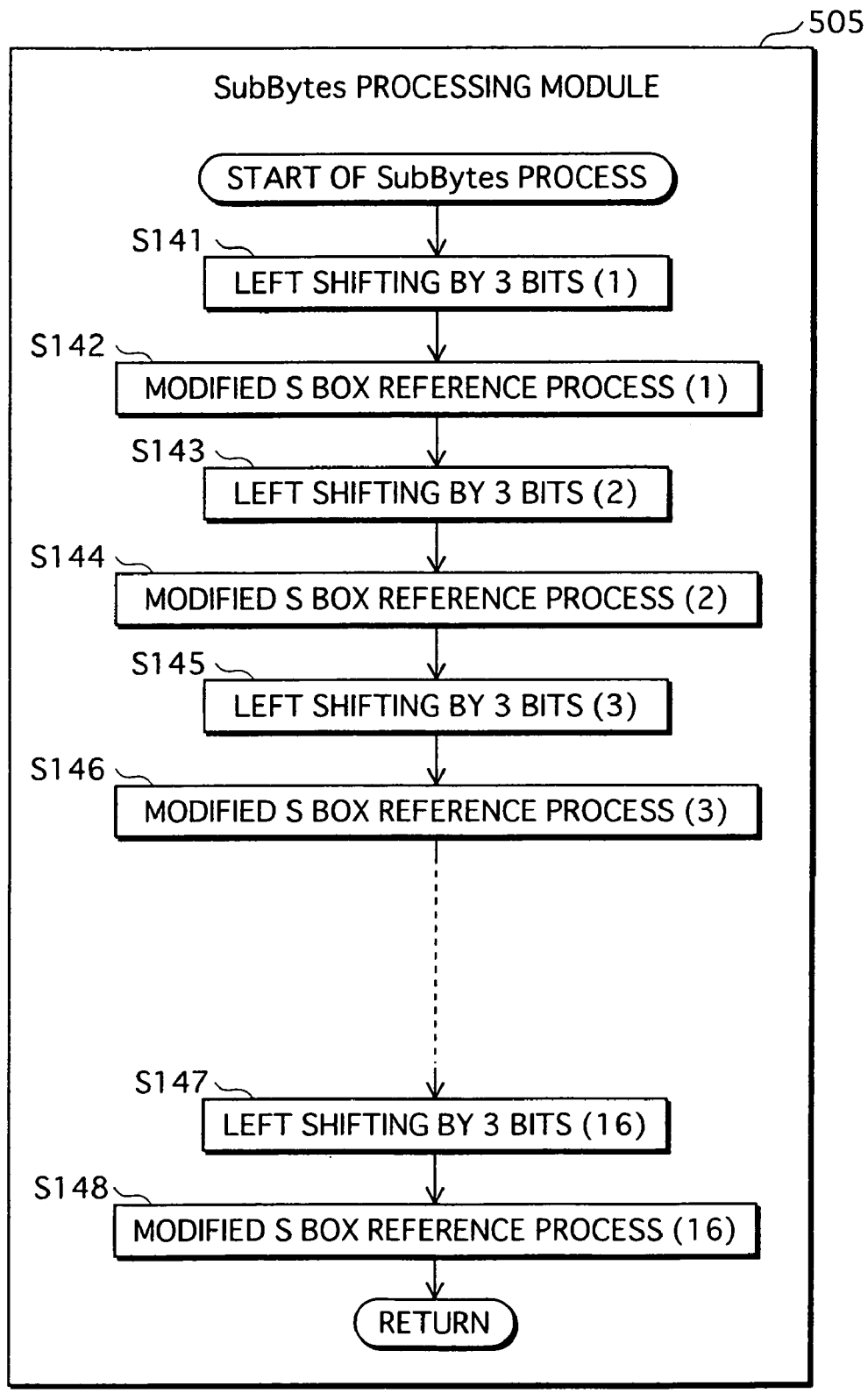
FIG. 9 is a flowchart illustrating details of a SubBytes processing module 505.

The SubBytes processing module 505 is, as shown in FIG. 9, formed with instruction code groups S141, S142, S143, S144, S145, S146, . . . , S147 and S148. These instruction code groups are arranged in the SubBytes processing module 505 in the stated order. Each instruction code group includes one or more instruction codes.

The instruction code group S141 includes multiple instruction codes that indicate to shift, among the 16 pieces of partial block data, the first partial block data to the left by three bits to thereby generate 11-bit data.

The instruction code group S142 includes multiple instruction codes that indicate to refer to the modified S box 511 using the 11-bit data generated by the instruction code group S141 as an address, read, from the modified S box 511, 8-bit data stored in a position having the address of the 11-bit data, and output the read 8-bit data.

The instruction code groups S143, S145, . . . , S147 each include multiple instruction codes similar to those of the instruction code group S141. The instruction code groups S143, S145, . . . , S147 differ from the instruction code group S141 in using, among the sixteen pieces of partial block data, the second, the third, . . . , and the sixteenth partial block data, respectively, as a shifting target.

The instruction code groups S144, S146, . . . , and S148 each include multiple instruction codes similar to those of the instruction code group S142. The instruction code group S144, S146, . . . , and S148 differ from the instruction code group S142 in using a result output from the instruction code groups S143, S145, . . . , and S147, respectively.

(c-6) FinalRound Processing Module 504

Figure 10:
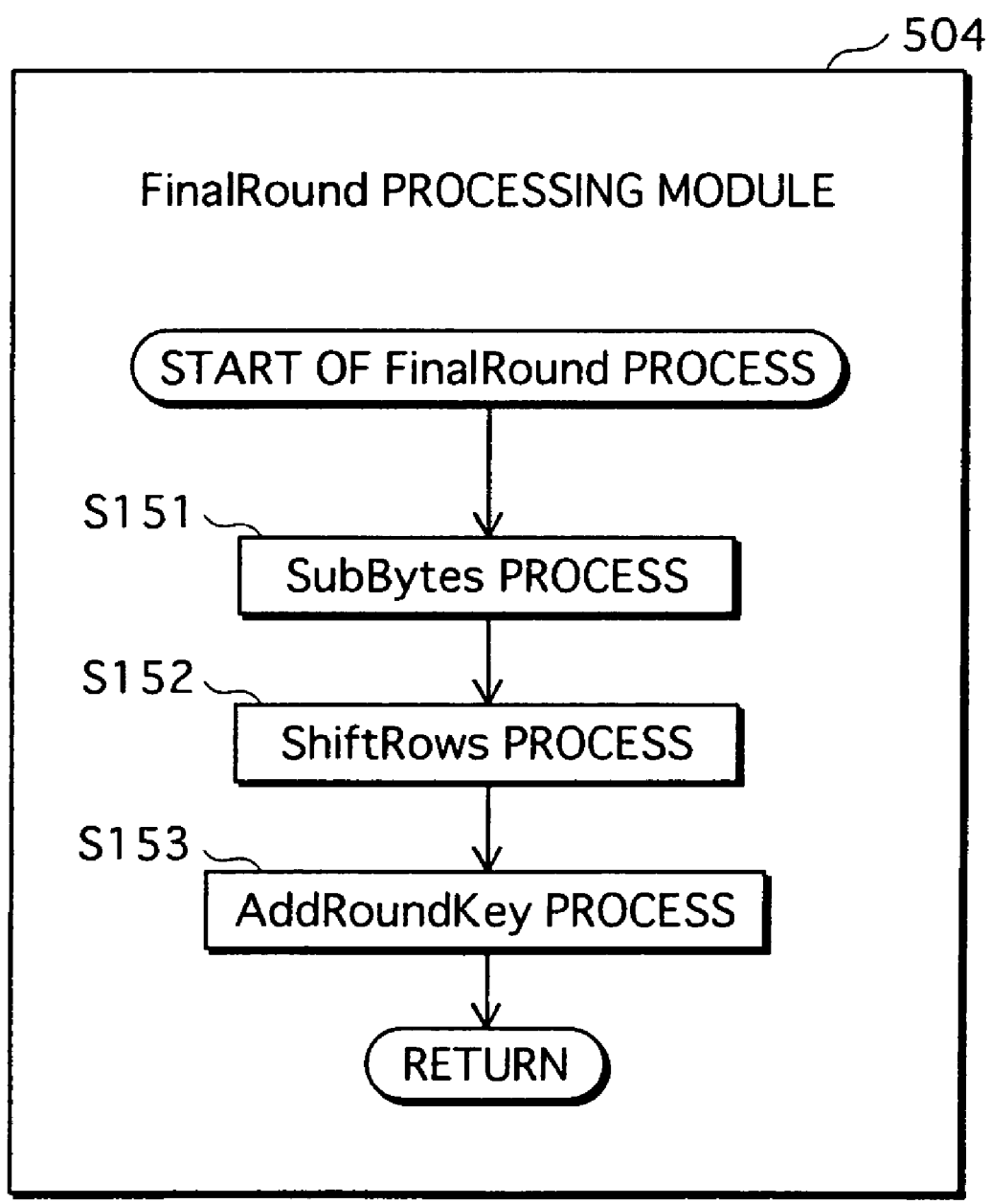
FIG. 10 is a flowchart illustrating details of a FinalRound processing module 504.

The FinalRound processing module 504 is, as shown in FIG. 10, formed with instruction code groups S151, S152 and S153 included therein. These instruction code groups are arranged in the FinalRound processing module 504 in the stated order. Each instruction code group includes one or more instruction codes.

The instruction code group S151 includes multiple instruction codes that indicate to call the SubBytes processing module 505.

The instruction code group S152 includes multiple instruction codes that indicate to call the ShiftRows processing module 506 for performing a ShiftRows process.

The instruction code group S153 includes multiple instruction codes that indicate to call the AddRoundKey processing module 502 for performing an AddRoundKey process.

(c-7) Others

The AddRoundKey processing module 502, ShiftRows processing module 506, MixColumns processing module 507, and KeySchedule processing module 508 perform an AddRoundKey process, a ShiftRows process, a MixColumns process and a Keyschedule process, respectively, which are specified in the AES. The explanation of these processes is left out since they are as specified in the AES.

(d) Transmission Program 134

The transmission program 134 is configured by arranging multiple instruction codes, which (i) indicate to receive a specification of data and a specification of a distribution destination apparatus from a caller program, (ii) control the communication unit 106, and (iii) transmit the specified data to the specified distribution destination apparatus.

(3) Microprocessor 101

The microprocessor 101 is a central unit for controlling the content server apparatus 100 and performing data calculation and processing, and conducts operations, control and the like according to computer programs stored in the memory unit 103.

Figure 11:
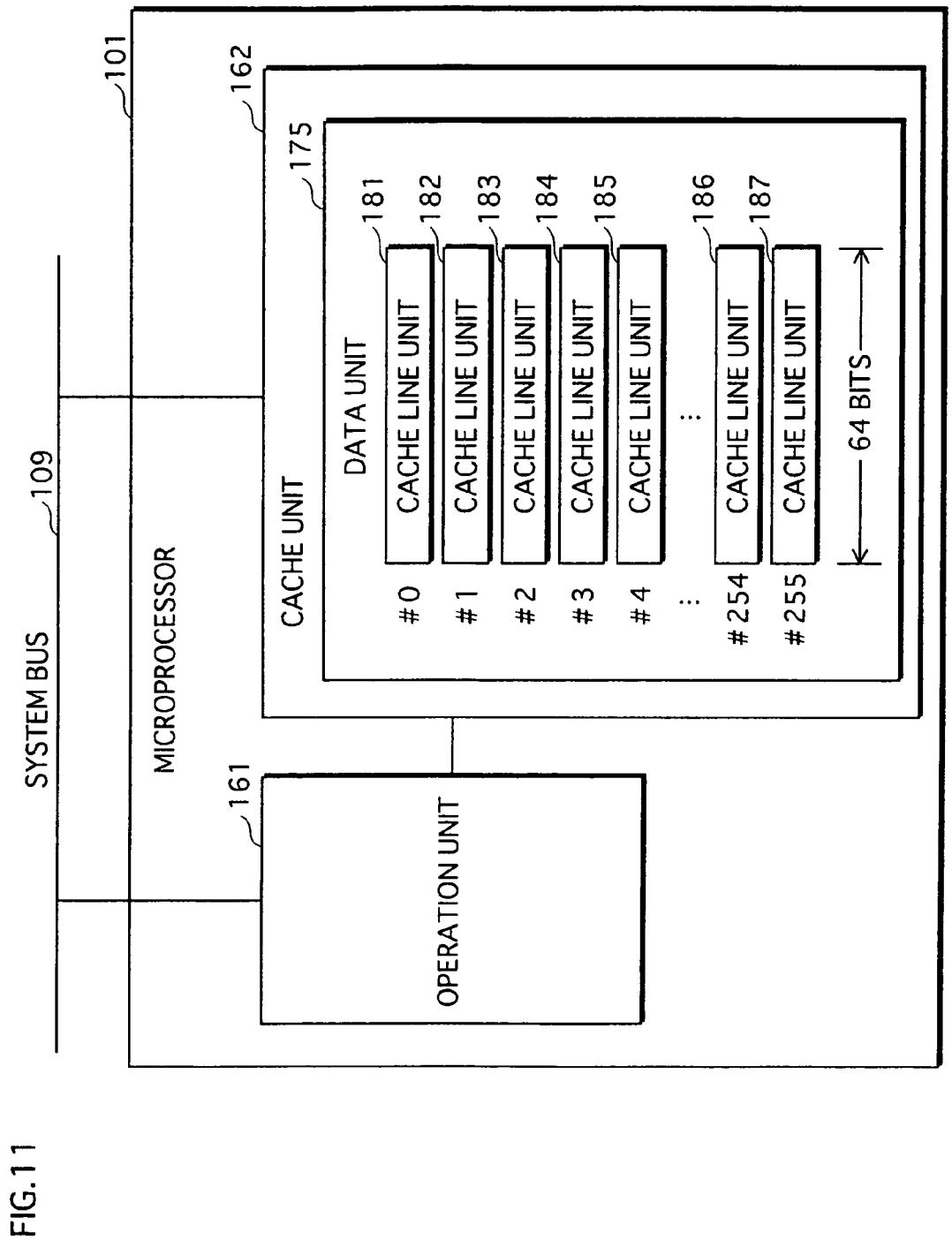
FIG. 11 is a block diagram showing a configuration of a microprocessor 101.

The microprocessor 101 is, as shown in FIG. 11, composed of an operation unit 161, a cache unit 162 and other units that are not shown in the figure.

(Cache Unit 162)

The cache unit 162 is provided to prevent, when the operation unit 161 accesses to the memory unit 103 at the execution of a program, the access time from having an influence on the execution performance of the program.

The cache unit 162 is, as shown in FIG. 11, composed of a data unit 175 and other units that are not shown in the figure. The data unit 175 is further composed of 256 cache line units 181, 182, 183, 184, 185, . . . , 186 and 187. Each cache line unit includes a memory area of 64 bits.

A part of the content stored in the memory unit 103 is copied to one of the cache line units of the data unit 175.

Similarly to the memory unit 103, the cache unit 162 outputs, when receiving an address, data stored in a cache line unit corresponding to the address.

(Operation Unit 161)

The operation unit 161 decodes each instruction code of a computer program stored in the memory unit 103, and performs an operation or control based on the result of the decoding.

The operation unit 161 holds a program counter PC for storing therein address information that has an instruction to be taken out next.

When executing a computer program, the operation unit 161 first copies (loads) the computer program stored in the hard disk unit 102 into the memory unit 103. Next, the operation unit 161 initializes the program counter PC, and obtains one instruction in the computer program based on the value of the program counter PC. Then, the operation unit 161 performs the obtained instruction. In the case of referring to fixed-value data defined in the computer program loaded on the memory unit 103 during the performance of the instruction, the operation unit 161, while obtaining the fixed-value data by accessing the memory unit 103, stores the same fixed-value data in the cache unit 162. When referring to the same fixed-value data the next time, the operation unit 161 accesses not the memory unit 103 but the cache unit 162 to obtain the fixed-value data. After finishing performing the instruction, the operation unit 161 increments the program counter PC by one, obtains one instruction in the computer program again, and performs the instruction in the same manner described above. When the program counter PC ultimately reaches a value indicating the end of the execution, the operation unit 161 finishes the computer program execution.

Thus, when the operation unit 161 accesses the cache unit 162 and desired data is not present in the cache unit 162, the operation unit 161 reads the desired data from the memory unit 103 and writes the read data to one of the cache line units of the data unit 175 in the cache unit 162. At this time, some time is required for copying data from the memory unit 103 to the cache unit 162, however, the data access is performed at high speed from the second time onward since the operation unit 161 makes an access to the cache unit 162.

(Example of Data Unit 175)

Figure 12:
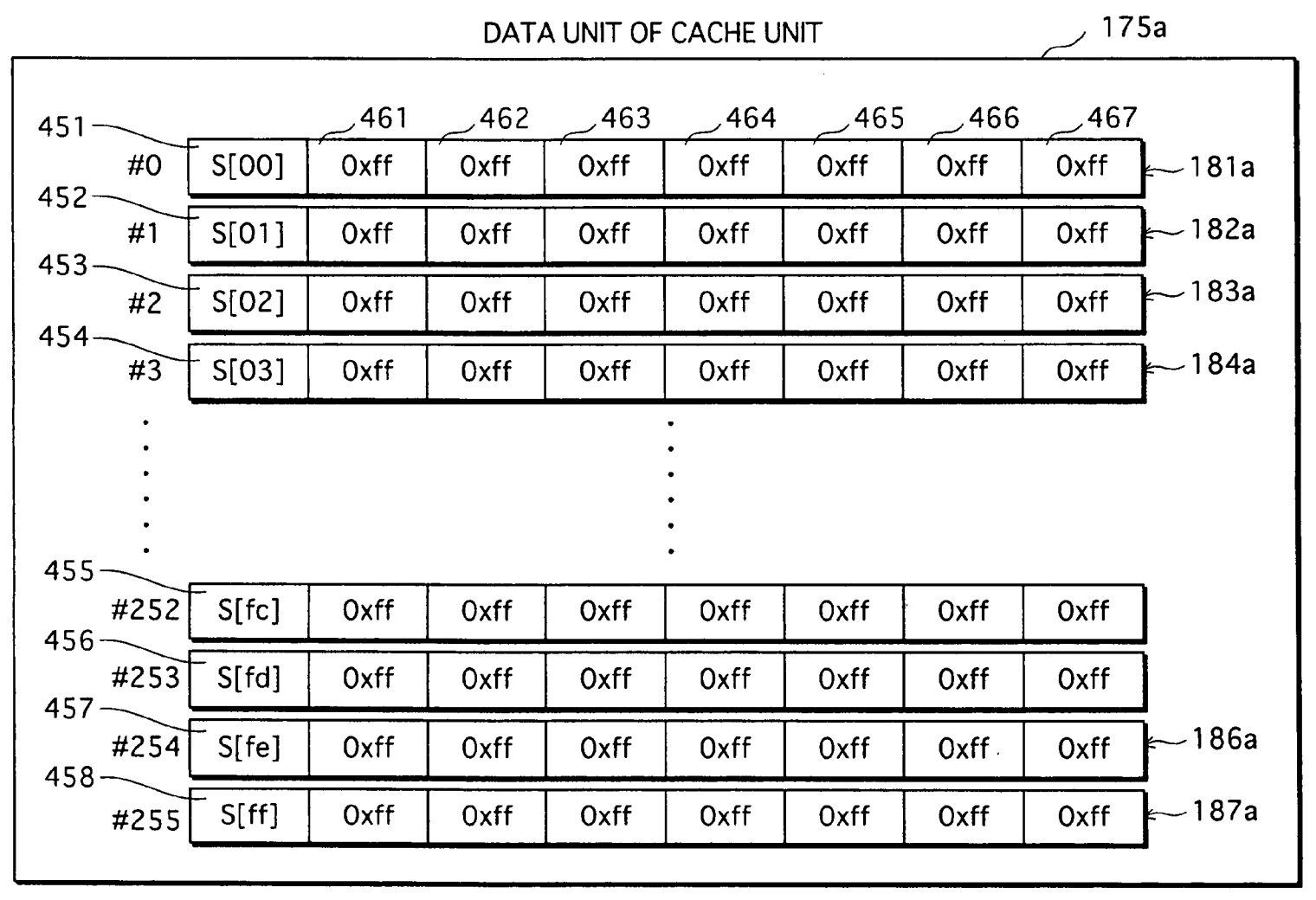

One example in which the contents of the modified S box 511 are stored in the cache line units 181 to 187 of the data unit 175 by the above-mentioned SubBytes process is shown in FIG. 12 as a data unit 175a.

In cache line units 181a, 182a, 183a, 184a, . . . , 186a and 187a of the data unit 175a, the contents of the modified S box 511 are stored without change.

That is, stored in the cache line unit 181a are array elements 451 "S[00]", 461 "0xff", 462 "0xff", 463 "0xff", 464 "0xff", 465 "0xff", 466 "0xff" and 467 "0xff". Also in each of the other cache line units, the start array element stores therein the same value as an array element of the standard S box 380, and the rest of the array elements each have "0xff".

For example, start array elements of the cache line units 182a, 183a, 184a, . . . , 186a and 187a store therein the same values as array elements 452 "S[01]", 453 "S[02]", 454 "S[03]", . . . , 455 "S[fc]", 456 "S[fd]", 457 "S[fe]" and 458 "S[ff]" of the standard S box 380, respectively.

Thus, only one array element of the standard S box 380 is stored in each cache line unit of the data unit 175a.

1.3 Operations of Content Server Apparatus 100

The operations of the content server apparatus 100 are explained next.

(1) Operations of Microprocessor 101

Figure 13:
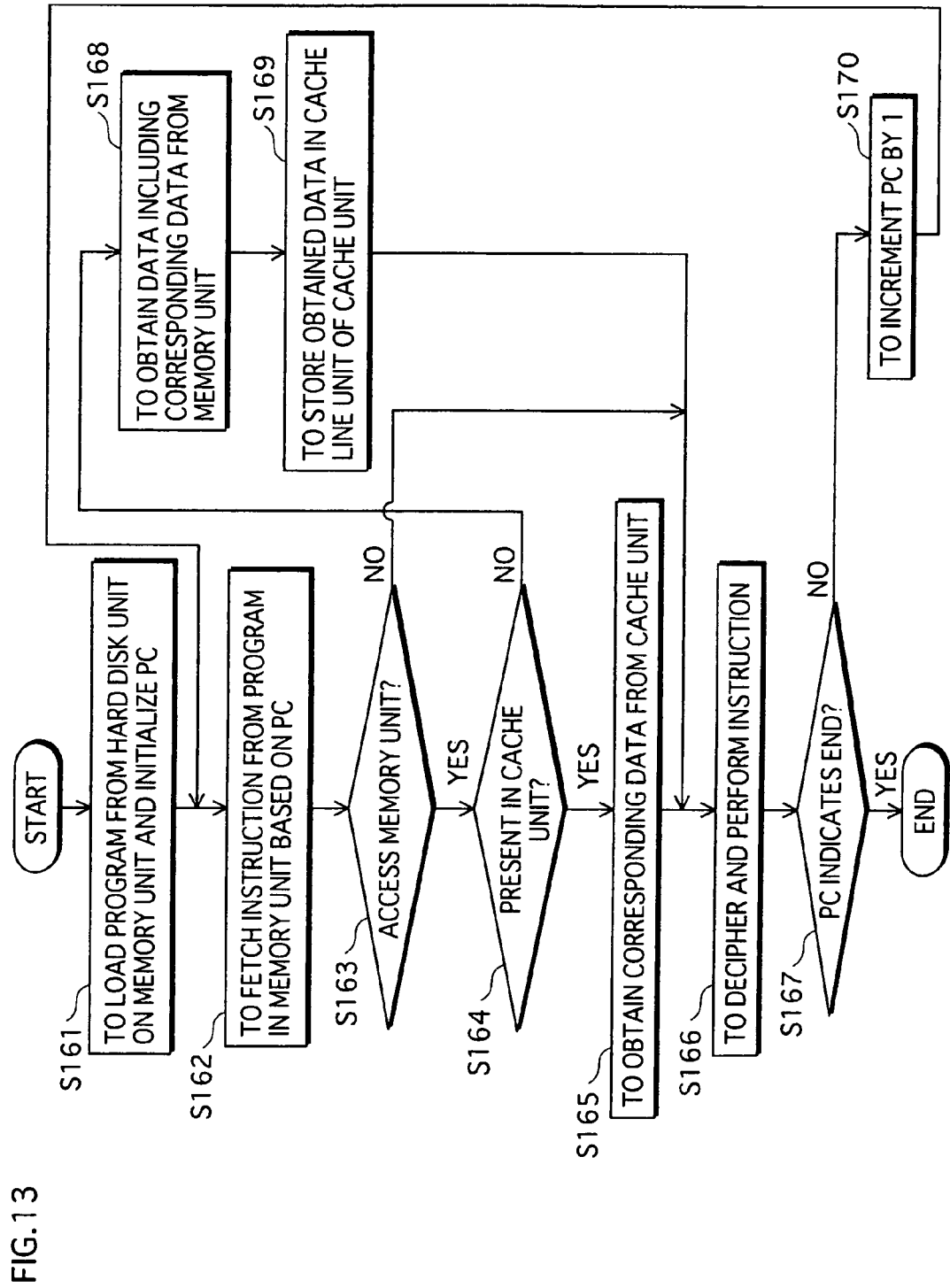
FIG. 13 is a flowchart showing operations of the microprocessor 101.

The operations of the microprocessor 101 are described with the aid of the flowchart of FIG. 13.

The operation unit 161 copies a computer program stored in the hard disk unit 102 into the memory unit 103, and initializes the program counter PC used for storing therein address information that has an instruction to be taken out next (Step S161).

Next, the operation unit 161 fetches one instruction from the computer program loaded on the memory unit 103 based on the value of the program counter PC (Step S162).

At the time, the operation unit 161 judges whether fixed data defined in the computer program is used in the instruction (Step S163). When the fixed data is used (Yes in Step S163) and the fixed data desired to be used is present in the cache unit 162 (Yes in Step S164), the operation unit 161 accesses the cache unit 162 and obtains corresponding fixed data (Step S165). Subsequently, the operation unit 161 decodes the instruction taken out, and performs the decoded result using the obtained fixed data (Step S166). Then, if the program counter PC indicates the end of the processing (Yes in Step S167), the operation unit 161 finishes the processing. If the program counter PC does not indicate the end of the processing (No in Step S167), the operation unit 161 increments the program counter PC by one (Step S170) and moves the control to Step S162 to repeat the processing.

When fixed data is not used (No in Step S163), the operation unit 161 decodes an instruction taken out next and perform the decoded results (Step S166), and then moves the control to Step S167 to repeat the processing.

In the case where the fixed data desired to be used is not present in the cache unit 162 (No in Step S164), the operation unit 161 accesses to the memory unit 103 to obtain corresponding fixed data (Step S168), and copies the obtained fixed data in a cache line unit of the cache unit 162 (Step S169). Next, the operation unit 161 decodes the instruction taken out, and performs the decoded result using the obtained fixed data (Step S166), and then moves the control to Step S167 to repeat the processing.

(2) Encryption Operations by AES Encryption Program 133

Figure 14:
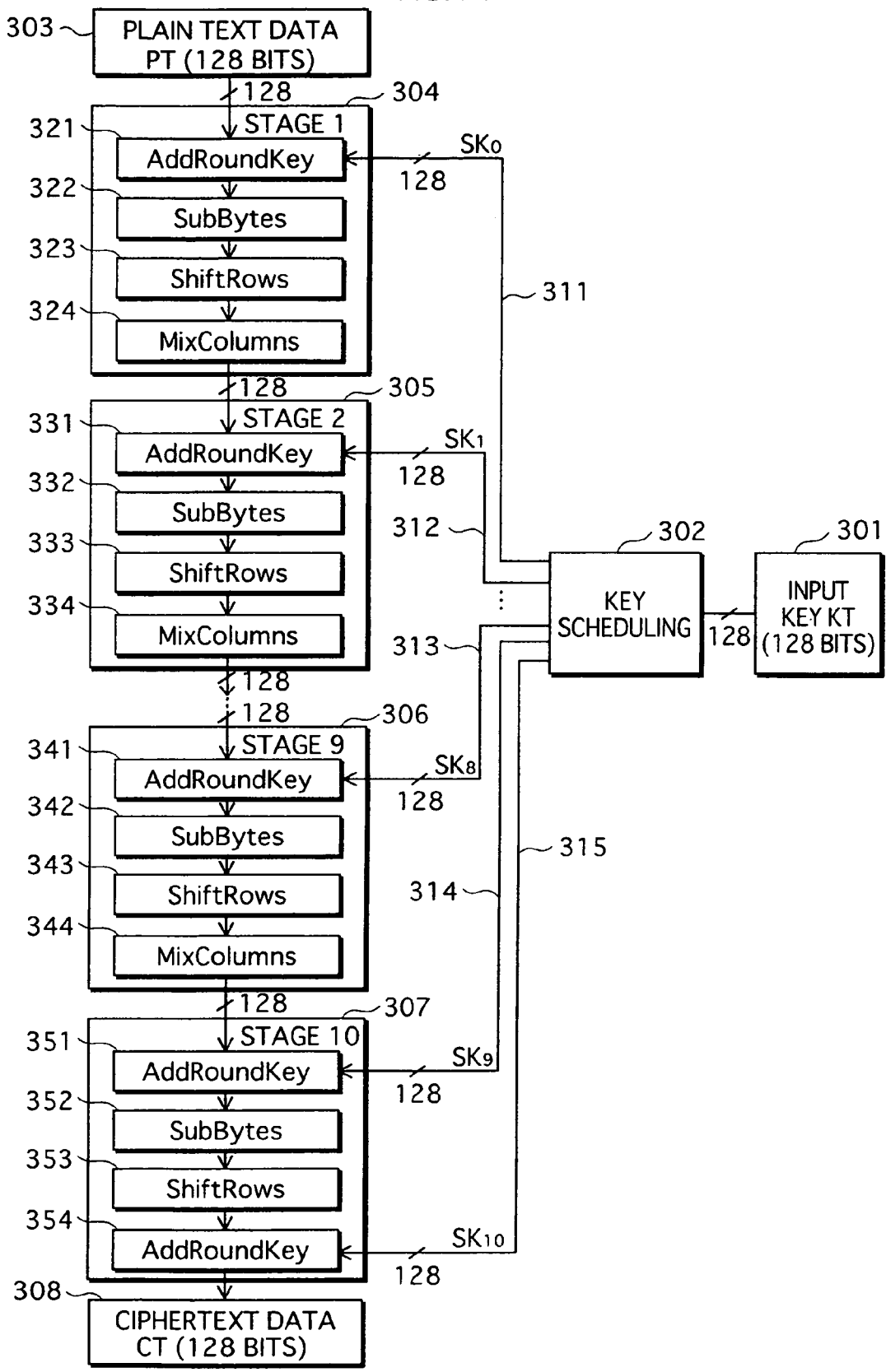
FIG. 14 is a data process chart showing encryption operations performed by an AES encryption program 133.

Encryption Operations by the AES encryption program 133 are described next with the aid of the data process chart of FIG. 14. Here, 128-bit ciphertext data CT 308 shall be generated from 128-bit plain text data PT 303 using a 128-bit input key KT 301, as shown in the figure.

The encryption operations by the AES encryption program 133 comprises a step 302 of key scheduling and ten stages of processes 304, 305, ..., 306 and 307, as shown in the figure.

Based on an input key KT 301, eleven extended keys $SK_0$, $SK_1$, ..., $SK_8$, $SK_9$, and $SK_{10}$ are generated by the KeySchedule processing module 508 (Step S302), and the generated extended keys $SK_0$, $SK_1$, ..., $SK_8$, $SK_9$, and $SK_{10}$ each are distributed to the AddRoundKey process of each stage (Steps 311, 312, ..., 313, 314 and 315).

Next, in the process of the stage 1 (Process 304), the AddRoundKey process is performed by the AddRoundKey processing module 502 using the extended key $SK_0$ (Step 321), the SubBytes process is performed by the SubBytes processing module 505 (Step 322), the ShiftRows process is performed by the ShiftRows processing module 506 (Step 323), and then the MixColumns process is performed by the MixColumns processing module 507 (Step 324).

Next, in the process of the stage 2 (Process 305), the AddRoundKey process is performed by the AddRoundKey processing module 502 using the extended key $SK_1$ (Step 331), the SubBytes process is performed by the SubBytes processing module 505 (Step 332), the ShiftRows process is performed by the ShiftRows processing module 506 (Step 333), and then the MixColumns process is performed by the MixColumns processing module 507 (Step 334).

In a similar manner, the AddRoundKey process, SubBytes process, ShiftRows process and MixColumns process are performed in each stage from the stages 3 to 8.

Next, in the process of the stage 9 (Process 306), the AddRoundKey process is performed by the AddRoundKey processing module 502 using the extended key $SK_8$ (Step 341), the SubBytes process is performed by the SubBytes processing module 505 (Step 342), the ShiftRows process is performed by the ShiftRows processing module 506 (Step 343), and then the MixColumns process is performed by the MixColumns processing module 507 (Step 344).

Finally, in the process of the stage 10 (Process 307), the AddRoundKey process is performed by the AddRoundKey processing module 502 using the extended key $SK_9$ (Step 351), the SubBytes process is performed by the SubBytes processing module 505 (Step 352), the ShiftRows process is performed by the ShiftRows processing module 506 (Step 353), and then the AddRoundKey process is performed by the AddRoundKey processing module 502 using the extended key $SK_{10}$ (Step 354).

Thus, the 128-bit ciphertext data CT 308 is generated.

(3) Operations in Each Round Process or FinalRound Process

Figure 15:
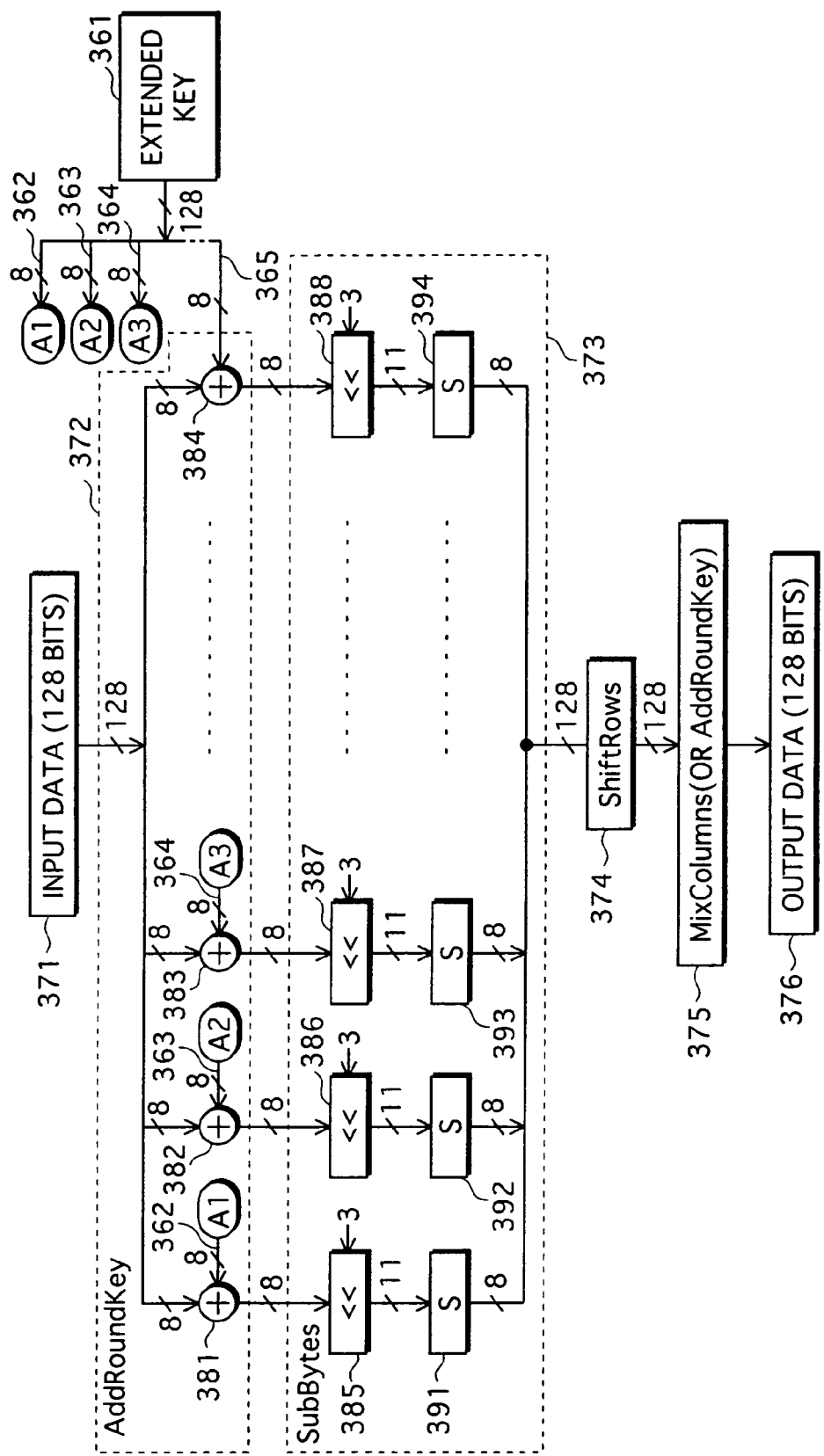
FIG. 15 is a data process chart showing detailed operations of an AddRoundKey process and a SubBytes process in each Round process or a FinalRound process.

Next are described the operations in each Round process or the FinalRound process—especially the detailed operations in the AddRoundKey process and SubBytes process—with the aid of a data process chart of FIG. 15. Here, 128-bit output data 376 shall be generated from 128-bit input data 371 using a 128-bit extended key 361, as shown in FIG. 15.

Each Round process or the FinalRound process includes an AddRoundKey process 372, a SubBytes process 373, a ShiftRows process 374 and a MixColumns process (or an AddRoundKey process) 375.

The AddRoundKey process 372 includes sixteen EXCLUSIVE-OR operations 381, 382, 383, ..., and 384. In addition, the SubBytes process 373 includes sixteen shifting processes 385, 386, 387, ..., and 388 and sixteen modified-S-box reference processes 391, 392, 393, ..., and 394.

The 128-bit extended key 361 is divided into sixteen partial keys of 8 bits, and the sixteen partial keys are output to the sixteen EXCLUSIVE-OR operations 381, 382, 383, ..., and 384 in the AddRoundKey process 372, respectively (Steps 362, 363, 364, ..., and 365).

The 128-bit input data 371 is divided into sixteen pieces of partial data of 8 bits, and the sixteen pieces of partial data are output to the sixteen EXCLUSIVE-OR operations 381, 382, 383, ..., and 384 in the AddRoundKey process, respectively.

The EXCLUSIVE-OR operation 381 receives 1st partial data (8 bits) and a 1st partial key (8 bits), performs an EXCLUSIVE-OR operation on the 1st partial data and 1st partial key to obtain 1st operation data of 8 bits, and outputs the obtained 1st operation data to the shifting process 385 of the SubBytes process 373.

The shifting process 385 obtains the 8-bit 1st operation data, and shifts the 1st operation data to the left by three bits to obtain 1st shifted data of 11 bits. Here, the high 8 bits of the 1st shifted data are the same as the operation data, and the low 3 bits of the 1st shifted data are "000" (represented in binary form). Subsequently, the 1st shifted data is output to the reference process 391 of the SubBytes process 373.

The reference process 391 receives the 1st shifted data, and obtains a 1st array element of 8 bits by referring to the modified S box 511 using the 1st shifted data as an address.

Similarly, the EXCLUSIVE-OR operation 382 performs an EXCLUSIVE-OR operation on 2nd partial data and a 2nd partial key to obtain 2nd operation data, and the shifting process 386 obtains 2nd shifted data by shifting the 2nd operation data to the left by three bits. The reference process 392 obtains a 2nd array element by referring to the modified S box 511 using the 2nd shifted data as an address.

Similarly, the EXCLUSIVE-OR operation 383 performs an EXCLUSIVE-OR operation on 3rd partial data and a 3rd partial key to obtain 3rd operation data, and the shifting process 387 obtains 3rd shifted data by shifting the 3rd operation data to the left by three bits. The reference process 393 obtains a 3rd array element by referring to the modified S box 511 using the 3rd shifted data as an address.

In a similar manner, 4th to 15th array elements are obtained.

Furthermore, the EXCLUSIVE-OR operation 384 similarly performs an EXCLUSIVE-OR operation on 16th partial data and a 16th partial key to obtain 16th operation data, and the shifting process 388 obtains 16th shifted data by shifting the 16th operation data to the left by three bits. The reference process 394 obtains a 16th array element by referring to the modified S box 511 using the 16th shifted data as an address.

Thus, the 1st to 16th array elements (sixteen array elements) are obtained.

Subsequently, the 1st to 16th array elements are joined in this order to generate data of 128 bits.

Next, the ShiftRows process 374 is performed on the generated data, and then the MixColumns process (or the AddRoundKey process) 375 is performed. Thus, the 128-bit output data 376 is generated and output.

1.4 Configuration of Personal Computer 200

Figure 16:
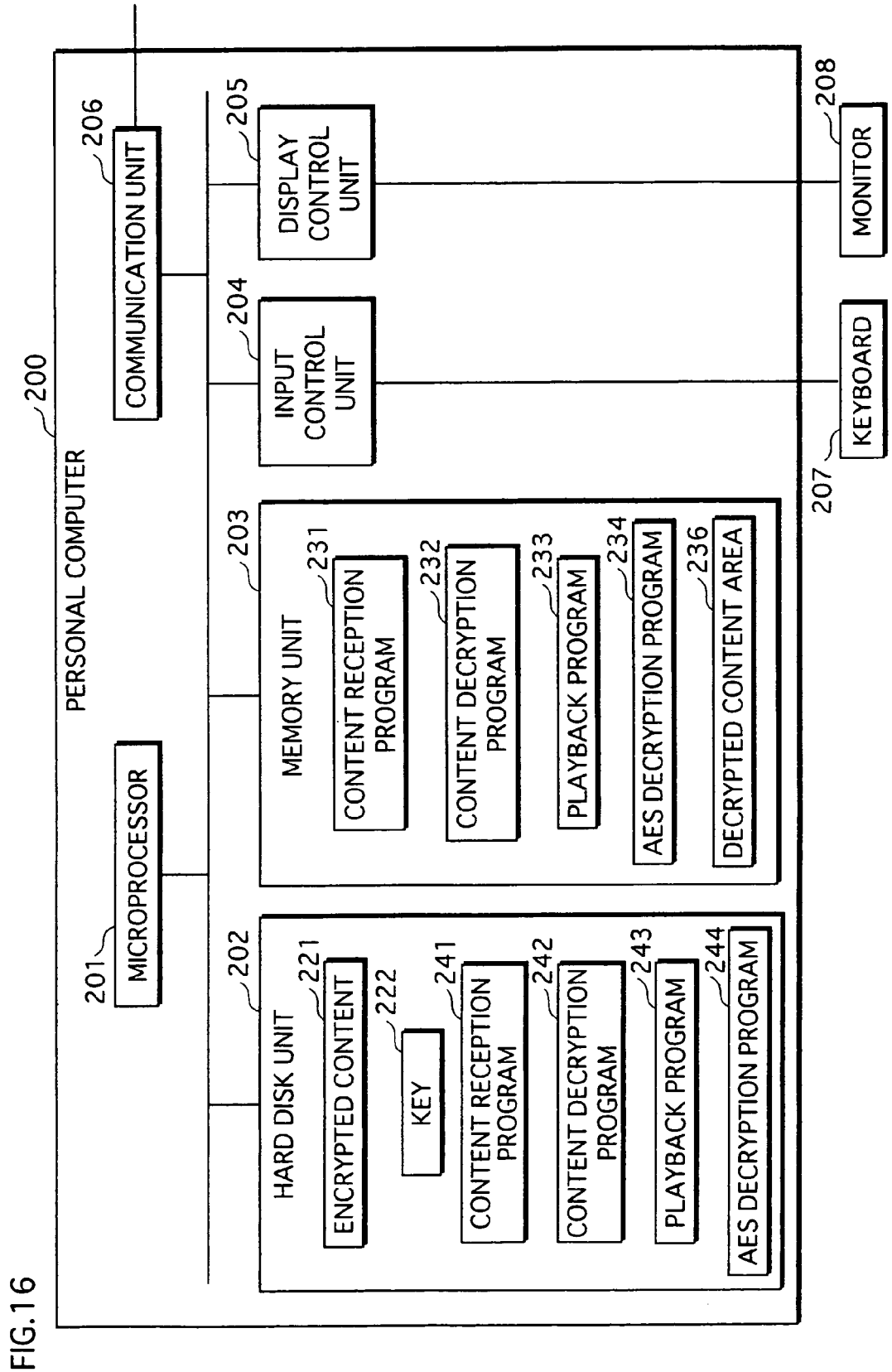
FIG. 16 is a block diagram showing a configuration of a personal computer 200.

The personal computer 200 is a computer system similar to the content server apparatus 100, and comprises a microprocessor 201, a hard disk unit 202, a memory unit 203, an input control unit 204, a display control unit 205, a communication unit 206 and the like, as shown in FIG. 16. The input control unit 204 and display control unit 205 are connected to a keyboard 207 and a monitor 208, respectively. In addition, the communication unit 206 is connected to the Internet 20.

Stored in the hard disk unit 102 and memory unit 103 are various computer programs, and the personal computer 200 realizes part of its functions when the microprocessor 201 operates according to each computer program.

Since the digital broadcast receiving apparatus 200a and BD playback apparatus 200b have a similar configuration to the personal computer 200, the descriptions of these apparatuses are left out.

(1) Hard Disk Unit 202

The hard disk unit 202 stores therein a key 222, a content reception program 241, a content decryption program 242, a playback program 243 and an AES decryption program 244, and also has an area for storing an encrypted content 221, as shown in FIG. 16. The encrypted content 221 correspond to the key 222.

The encrypted content 221 and key 222 are the same as the encrypted content 126 and key 123, respectively, stored in the hard disk unit 102 of the content server apparatus 100.

The content reception program 241, content decryption program 242, playback program 243 and AES decryption program 244 are respectively loaded on the memory unit 203 as a content reception program 231, a content decryption program 232, a playback program 233 and an AES decryption program 234, by the instruction of the microprocessor 201. These computer programs are described hereinafter.

(2) Memory Unit 203

As shown in FIG. 16, the memory unit 203 stores therein the content reception program 231, content decryption program 232, playback program 233 and AES decryption program 234. The memory unit 203 also includes a decrypted content area 236.

These programs are computer programs, each of which is composed by combining multiple instruction codes in a machine-language format. The machine-language format is a format decoded and executed by the microprocessor 201.

In the decrypted content area 236, a decrypted content generated by decrypting an encrypted content is temporarily written.

Contents of each computer program are explained next. Here, in order to facilitate understanding, the contents of the respective computer programs are expressed not using instruction codes in the machine-language format, but in usual colloquial and written languages and/or using flowcharts.

(a) Content Reception Program 231

The content distribution program 231 is formed with multiple instruction codes included therein.

These instruction code groups includes (1) multiple instruction codes which indicate to receive a specification of a content from the user of the personal computer 200, (2) multiple instruction codes which indicate to obtain a content identifier for identifying the contents indicated by the received specification and transmit the obtained content identifier to the distribution server apparatus 30a via the communication unit 206 and the Internet 20, (3) multiple instruction codes which indicate to receive an encrypted content identified by the content identifier from the distribution server apparatus 30a via the Internet 20 and communication unit 206, and (4) multiple instruction codes which indicate to write the received encrypted content to the hard disk unit 202 as, for example, the encrypted content 221.

(b) Content Decryption Program 232

The content decryption program 232 is, as shown in FIG. 17, formed with instruction code groups S211, S212, S213, S214, S215, S216, S217 and S218 included therein, and the instruction code groups are arranged in the stated order in the content decryption program 232. Each instruction code group includes one or more instruction codes.

The instruction code group S211 includes multiple instruction codes that indicate to receive a specification of one of encrypted contents stored in the hard disk unit 202 from the user of the personal computer 200.

The instruction code group S212 includes multiple instruction codes that indicate to call the playback program 233 stored in the memory unit 203. By executing the instruction code group S212, the content decryption program 232 and playback program 233 are executed in parallel.

The instruction code group S213 includes multiple instruction codes which indicate to assign a value of "−128" as an initial value to a readout point that shows a data position within the specified encrypted content in bit values and read out a key corresponding to the specified encrypted content from the hard disk unit 202.

The instruction code group S214 includes multiple instruction codes which indicate to add 128 bits to the readout point and then try to read out one block of data starting, within the encrypted content, from the position indicated by the added readout point, and multiple instruction codes which indicate to, (1) if the position indicated by the readout point is within the encrypted content, read out one block of data from this position, and (2) if the position indicated by the readout point is outside of the encrypted content, output an end code indicating that the readout of blocks is finished. Here, one block is data of 128 bits in length.

The instruction code group S215 includes multiple instruction codes which indicate to, when an end code is output from the instruction code group S214, end the processing of the content decryption program 232, and when the end code is not yet output, move the control to the next instruction code group S216.

The instruction code group S216 includes multiple instruction codes which indicate to call the AES decryption program 234 while holding the read key and one block of data.

The instruction code group S217 includes multiple instruction codes which indicate to write one decrypted block generated by the decryption program 234 to the decrypted content area 236 of the memory unit 203.

The instruction code group S218 includes instruction codes which indicate to move the control to the instruction code group S214.

(c) Playback Program 233

The playback program 122 is, as shown in FIG. 17, formed with instruction code groups S218, S219 and S220 included therein, and these instruction code groups are arranged in the stated order in the playback program 233. Each instruction code group includes one or more instruction codes.

The instruction code group S218 includes multiple instruction codes that indicate to read out one or more decrypted blocks from the decrypted content area 236 of the memory unit 203.

The instruction code group S219 generates video data and audio data from the read decrypted blocks, converts the generated video data and audio data into a video signal and an audio signal, and output the video and audio signals to the monitor 208 via the display control unit 205.

The instruction code group S220 includes instruction codes that indicate to move the control to the next instruction code group S218.

(d) AES Decryption Program 234

Figure 18:
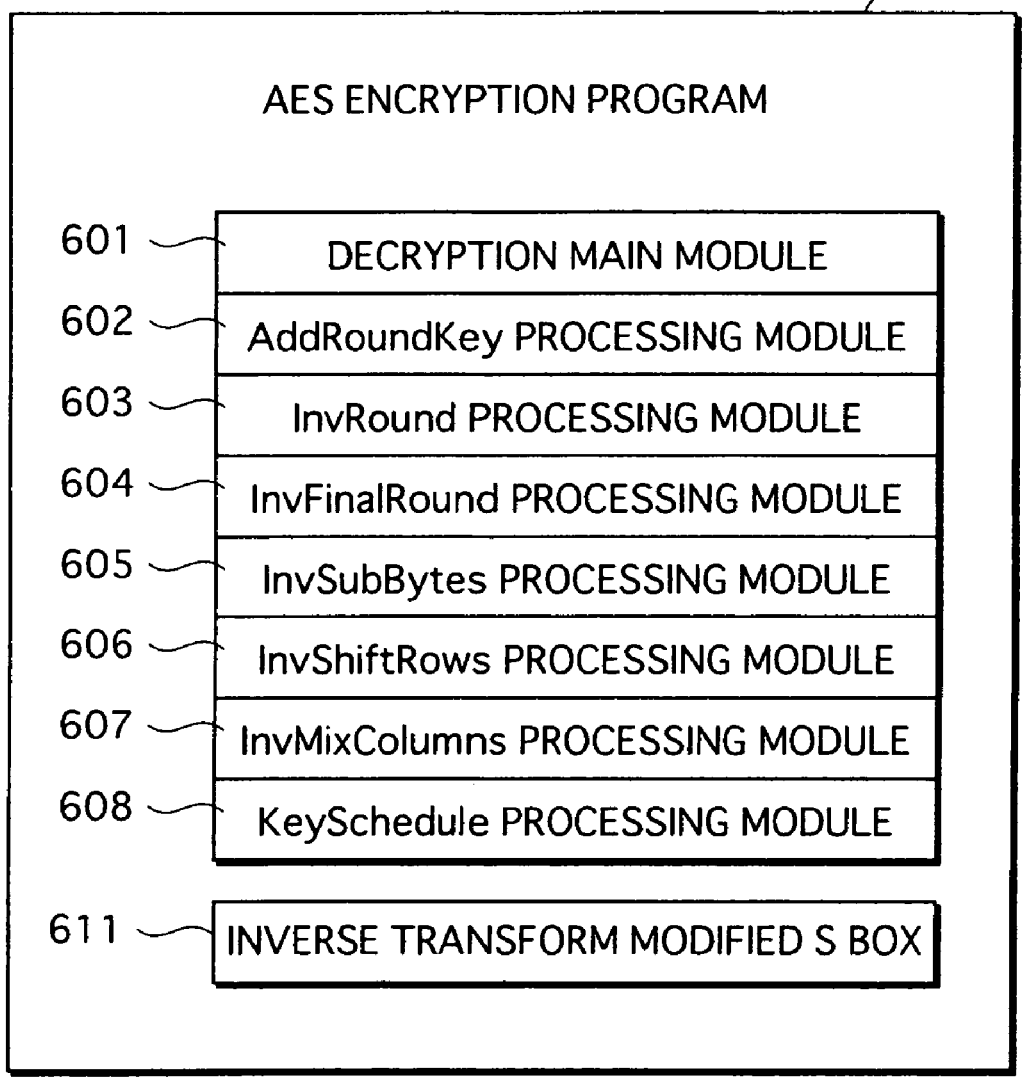
FIG. 18 is a flowchart illustrating details of an AES decryption program 234.

The AES decryption program 234, as shown in FIG. 18, comprises: a decryption main module 601; an AddRoundKey processing module 602; an InvRound processing module 603; an InvFinalRound processing module 604; an InvSubBytes processing module 605; an InvShiftRows processing module 606; an InvMixColumns processing module 607; a KeySchedule processing module 608; and an inverse transform modified S box 611 (e.g., a conversion table).

Each module is a computer program composed by combining multiple instruction codes in a machine-language format. The machine-language format is a format decoded and executed by the microprocessor 201.

(d-1) Standard Inverse Transform S Box 800

Figure 19:
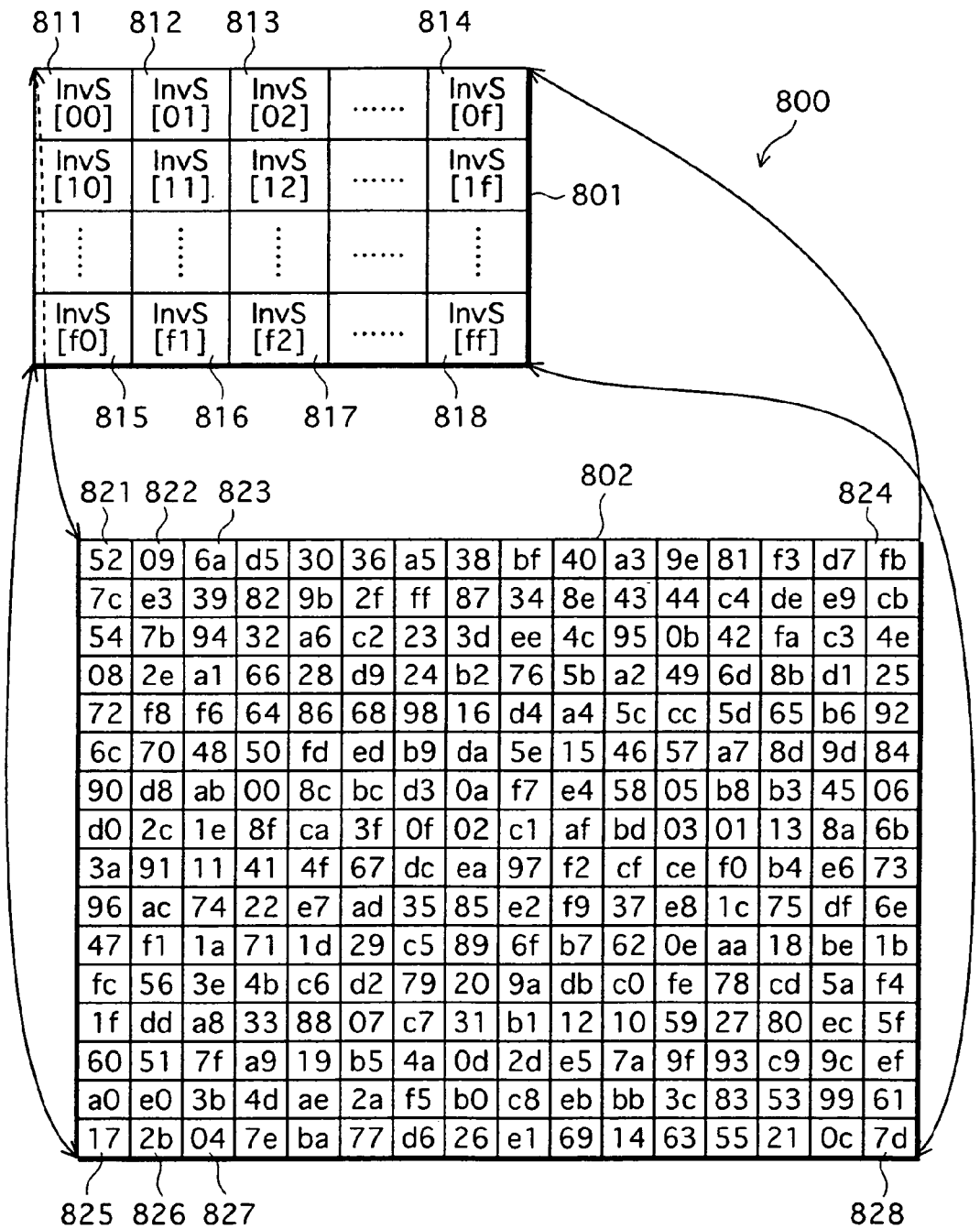
FIG. 19 shows a data structure of a standard inverse transform S box 800.

Here is explained a standard inverse transform S box 800 which is a table data array generally used in an inverse transform S box reference process that performs 8-bit input and output defined in the AES decryption, with the aid of array representations 801 and 802 shown in FIG. 19.

Note that, although the term "standard inverse transform S box" is not generally used in the AES, it is adopted here in order to distinguish it from the inverse transform modified S box 611 used in the present embodiment.

The array representations 801 and 802 shown in FIG. 19 represent the standard inverse transform S box 800. The array representation 801 shows multiple array elements included in the standard inverse transform S box 800 by distinguishing each element by an array number (suffix), and the array representation 802 shows specific values of the multiple array elements of the standard inverse transform S box 800.

For representation convenience, the array representation 801 here includes multiple array elements arranged in a matrix of 16 rows by 16 columns, and the array representation 802 includes specific values of the multiple array elements arranged in the matrix of 16 rows by 16 column. An array element positioned at one position in the matrix of the array representation 801 corresponds to a specific value positioned at the same position in the matrix of the array representation 802.

The standard inverse transform S box 800 includes 256 pieces of array elements 811, 812, 813, ..., 814, ..., 815, 816, 817, ..., and 818. Each array element is data of 8 bits, and represented as "InvS[xx]". Here, "InvS" is an array element name showing an array element, and a value "xx" following "InvS" and placed in the parentheses "[ ]" is an array number for identifying the array element. Each array number for the array elements of the array representation 801 of FIG. 19 is given in hexadecimal.

To be more specific, the 256 array elements 811 "InvS[00]", 812 "InvS[01]", 813 "InvS[02]", ..., 814 "InvS[0f]", ..., 815 "InvS[f0]", 816 "InvS[f1]", 817 "InvS[f2]", ..., and 818 "InvS[ff]" are specific values 821 "52", 822 "09", 823 "6a", ..., 824 "fb", ..., 825 "17", 826 "2b", 827 "04", ..., and 828 "7d", respectively. These specific values are represented in hexadecimal.

(d-2) Inverse Transform Modified S Box 611

The inverse transform modified S box 611 is described next.

As shown in FIG. 20, the inverse transform modified S box 611 comprises 2048 pieces of array elements 831, 841, 842, 843, 844, 845, 846, 847, 832, ..., 833, ..., 834, ..., 835, ..., 836, ..., 837, ..., 838, and ....

For representation convenience, the array elements making up the inverse transform modified S box 611 in FIG. 20 are arranged in a matrix of 256 rows by 8 columns.

The 256 array elements 831, 832, 833, 834, ..., 835, 836, 837, and 838 in the first column have values InvS[00], InvS[01], InvS[02], InvS[03], ..., InvS[fc], InvS[fd], InvS[fe], and InvS[ff], respectively. Here, the values InvS[00], InvS[01], ..., InvS[fe] and InvS[ff] are the same as those in the standard inverse transform S box 800 above.

Each of the 256 array elements in the second column has a value of "0xff". Here, "0x" indicates that the subsequent numeric value is represented in hexadecimal.

Each array element included in the third to eighth columns has a value of "0xff".

Hence, when focused on eight array elements continuously positioned in one row of the inverse transform modified S box 611, the start array element has the same value as an array element included in the standard inverse transform S box 800, and the rest of the array elements each have a meaningless value "0xff".

(d-3) Decryption Main Module 601

Figure 21:
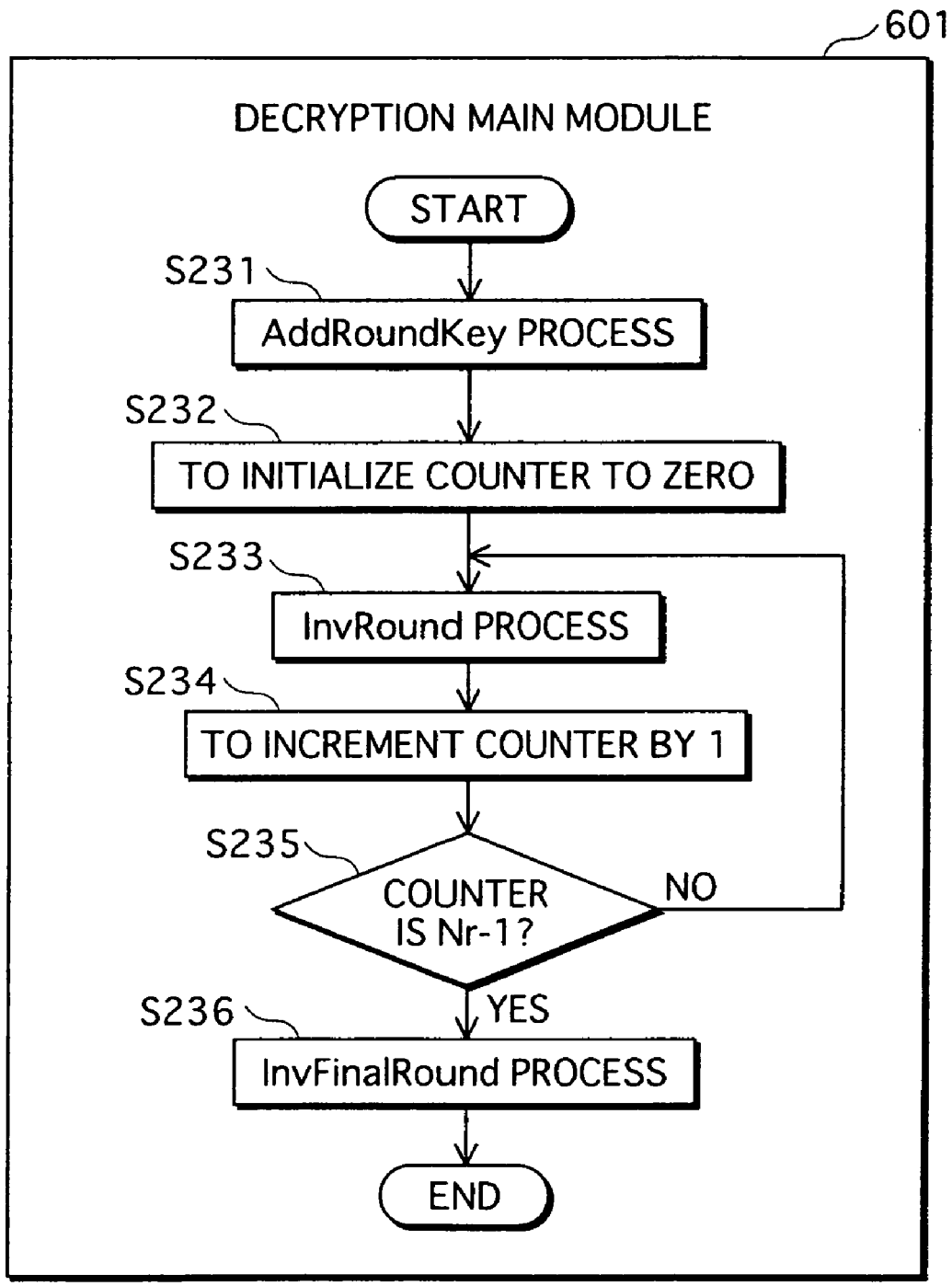
FIG. 21 is a flowchart illustrating details of a decryption main module 601.

The decryption main module 601 is formed with instruction code groups S231, S232, S233, S234, S235 and S236, as shown in FIG. 21. These instruction code groups are arranged in the decryption main module 601 in the stated order. Each instruction code group includes one or more instruction codes.

The instruction code group S231 includes multiple instruction codes that indicate to call an AddRoundKey processing module 602 for performing an AddRoundKey process which is an operation using an input ciphertext block and an extended key generated from an encryption key.

The instruction code group S232 includes multiple instruction codes that indicate to initialize a counter to zero. The counter is used for controlling repetition in the decryption main module 601.

The instruction code group S233 includes multiple instruction codes that indicate to call the InvRound processing module 603 for performing an InvRound process to be hereinafter described.

The instruction code group S234 includes multiple instruction codes that indicate to add "1" to the counter.

The instruction code group S235 includes multiple instruction codes that indicate to judge whether the counter is a predetermined number of repetition "Nr−1", move to the instruction code group S233 when it is not the number of repetition "Nr−1", and move to the next instruction code group S236 when it is the number of repetition "Nr−1".

Here, a number of repetitions "Nr" depends on bit lengths of the encryption key and decryption key. In the case where the encryption and decryption keys each have 128 bits in length, Nr=10. Nr=12 when the length is 192 bits, and Nr=14 when the length is 256 bits.

The instruction code group S236 includes multiple instruction codes that indicate to call the InvFinalRound processing module 604 for performing an InvFinalRound process to be hereinafter described.

(d-4) InvRound Processing Module 603

Figure 22:
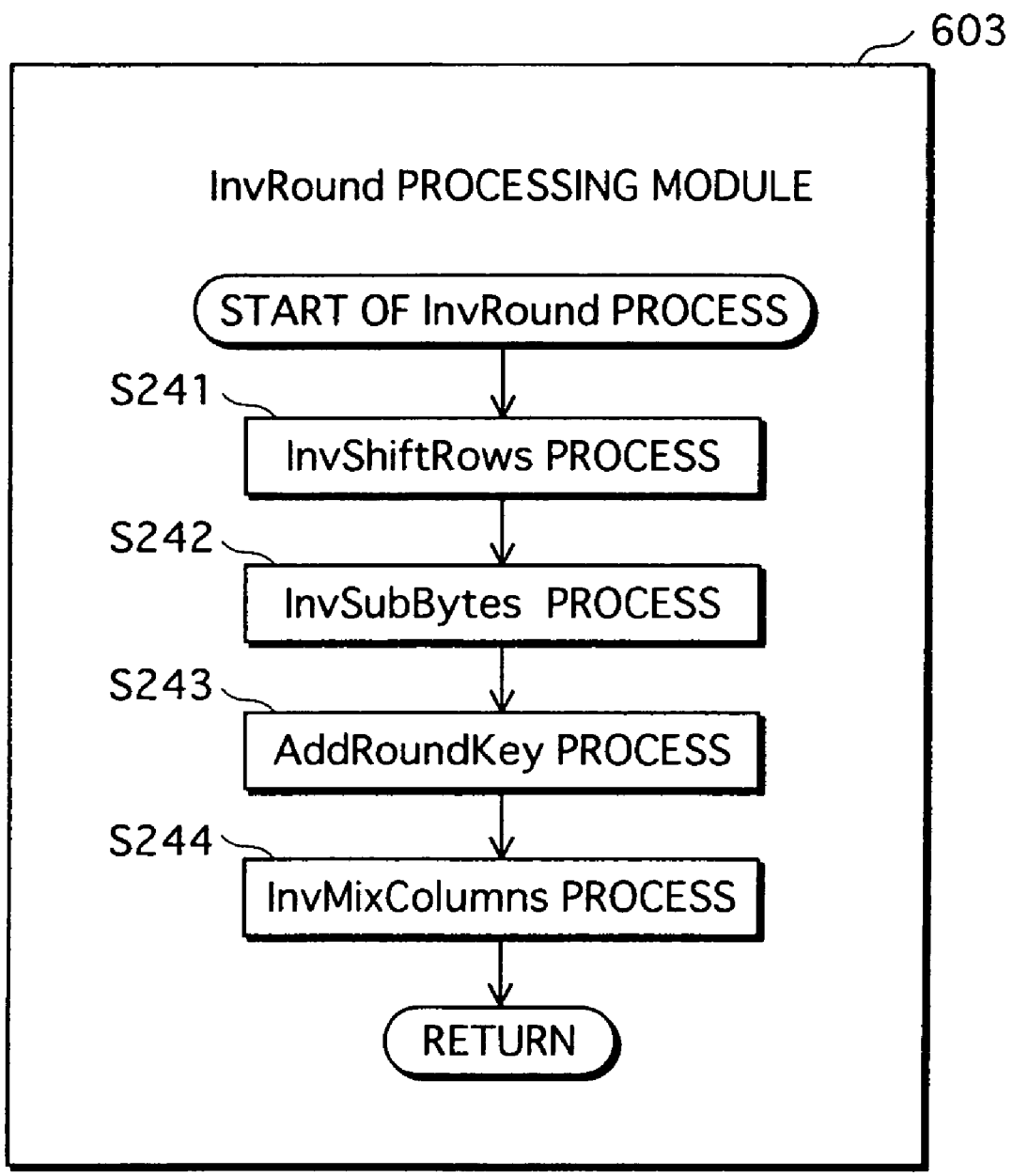
FIG. 22 is a flowchart illustrating details of an InvRound processing module 603.

The InvRound processing module 603 is, as shown in FIG. 22, formed with instruction codes groups S241, S242, S243 and S244 included therein. These instruction code groups are arranged in the InvRound processing module 603 in the stated order. Each instruction code group includes one or more instruction codes.

The instruction code group S241 includes multiple instruction codes that indicate to call the InvShiftRows processing module 606 for performing an InvShiftRows process.

The instruction code group S242 includes multiple instruction codes that indicate to call the InvSubBytes processing module 605 for performing an InvSubBytes process composed of sixteen table reference operations.

The instruction code group S243 includes multiple instruction codes that indicate to call the AddRoundKey processing module 602 for performing the above-mentioned AddRoundKey process.

The instruction code group S244 includes multiple instruction codes that indicate to call the InvMixColumns processing module 607 for performing an InvMixColumns process.

(d-5) InvSubBytes Processing Module 605

In the InvSubBytes process of the present embodiment, block data of 128 bits is received, the received 128-bit block data is divided into 16 pieces of partial block data of 8 bits (8 bits×16=128 bits), and each partial block data is shifted to the left by three bits. Thus, data of 11 bits is generated for each of the sixteen pieces of partial block data. Then, a process of referring to the inverse transform modified S box 611 is carried out on each data of 11 bits to output 8-bit data.

Thus, with respect to sixteen pieces of partial block data, the left shifting and the process of referring to the inverse transform modified S box 611 are performed. As a result, sixteen pieces of 8-bit data are generated. The generated sixteen pieces of 8-bit data are joined to form block data of 128 bits, which is then output.

The reason why each partial block data is shifted to the left by three bits is as described above.

The InvSubBytes processing module 605 is different from the SubBytes processing module 505, where the modified S box 511 is referred to, in that the inverse transform modified S box 611 is referred to.

Figure 23:
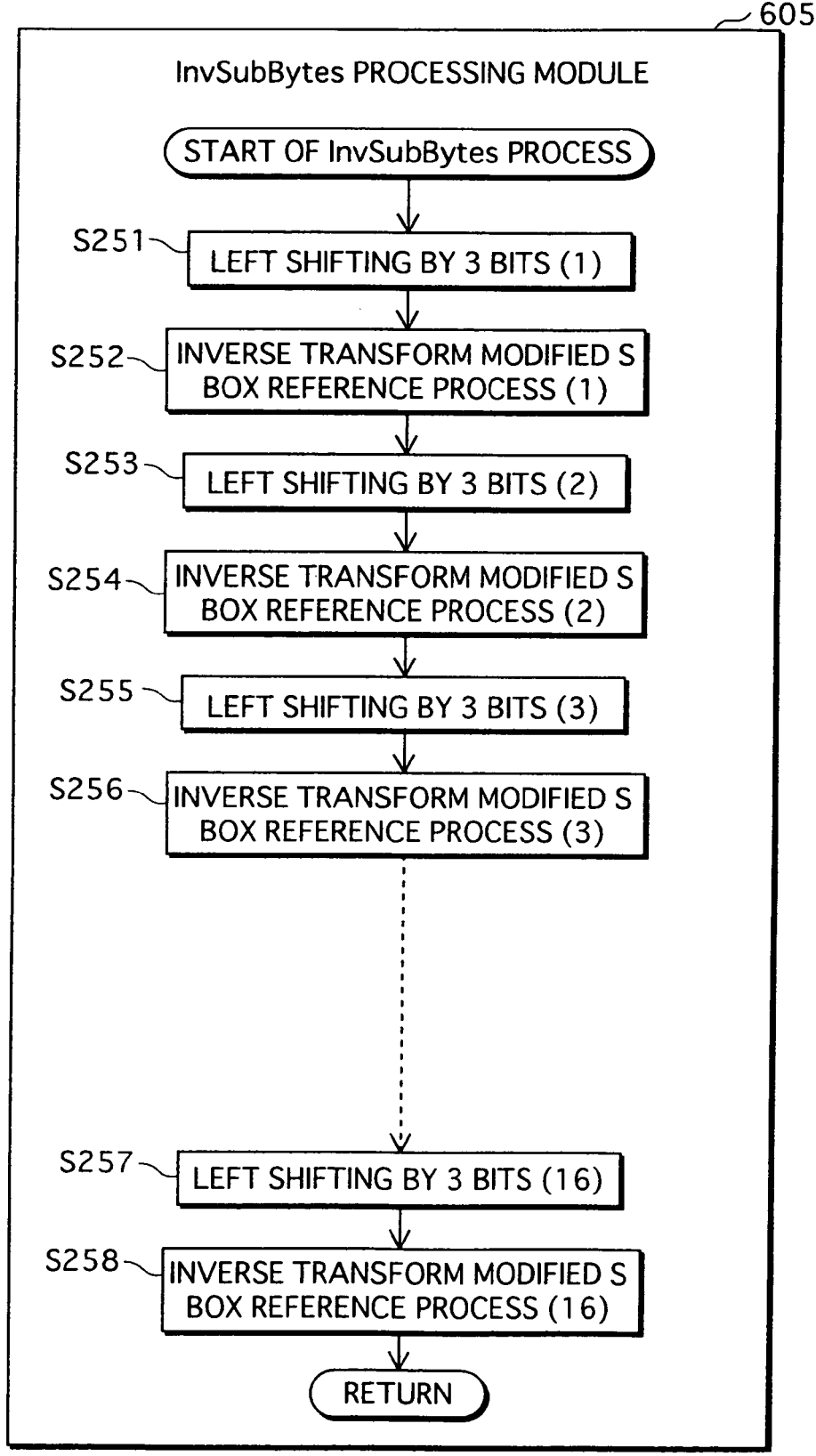
FIG. 23 is a flowchart illustrating details of an InvSubBytes processing module 605.

The InvSubBytes processing module 605 is, as shown in FIG. 23, formed with instruction code groups S251, S252, S253, S254, S255, S256, . . . , S257 and S258. These instruction code groups are arranged in the InvSubBytes processing module 605 in the stated order. Each instruction code group includes one or more instruction codes.

The instruction code group S251 includes multiple instruction codes that indicate to shift, among the 16 pieces of partial block data, the first partial block data to the left by three bits to thereby generate 11-bit data.

The instruction code group S252 includes multiple instruction codes that indicate to refer to the inverse transform modified S box 611 using the 11-bit data generated by the instruction code group S251 as an address, read, from the inverse transform modified S box 611, 8-bit data stored in a position having the address of the 11-bit data, and output the read 8-bit data.

The instruction code groups S253, S255, . . . , S257 each include multiple instruction codes similar to those of the instruction code group S251. The instruction code groups S253, S255, . . . , S257 differ from the instruction code group S251 in using, among the sixteen pieces of partial block data, the second, the third, . . . , and the sixteenth partial block data, respectively, as a shifting target.

The instruction code groups S254, S256, . . . , and S258 each include multiple instruction codes similar to those of the instruction code group S252. The instruction code group S254, S256, . . . , and S258 differ from the instruction code group S252 in using a result output from the instruction code groups S253, S255, . . . , and S257, respectively.

(d-6) InvFinalRound Processing Module 604

Figure 24:
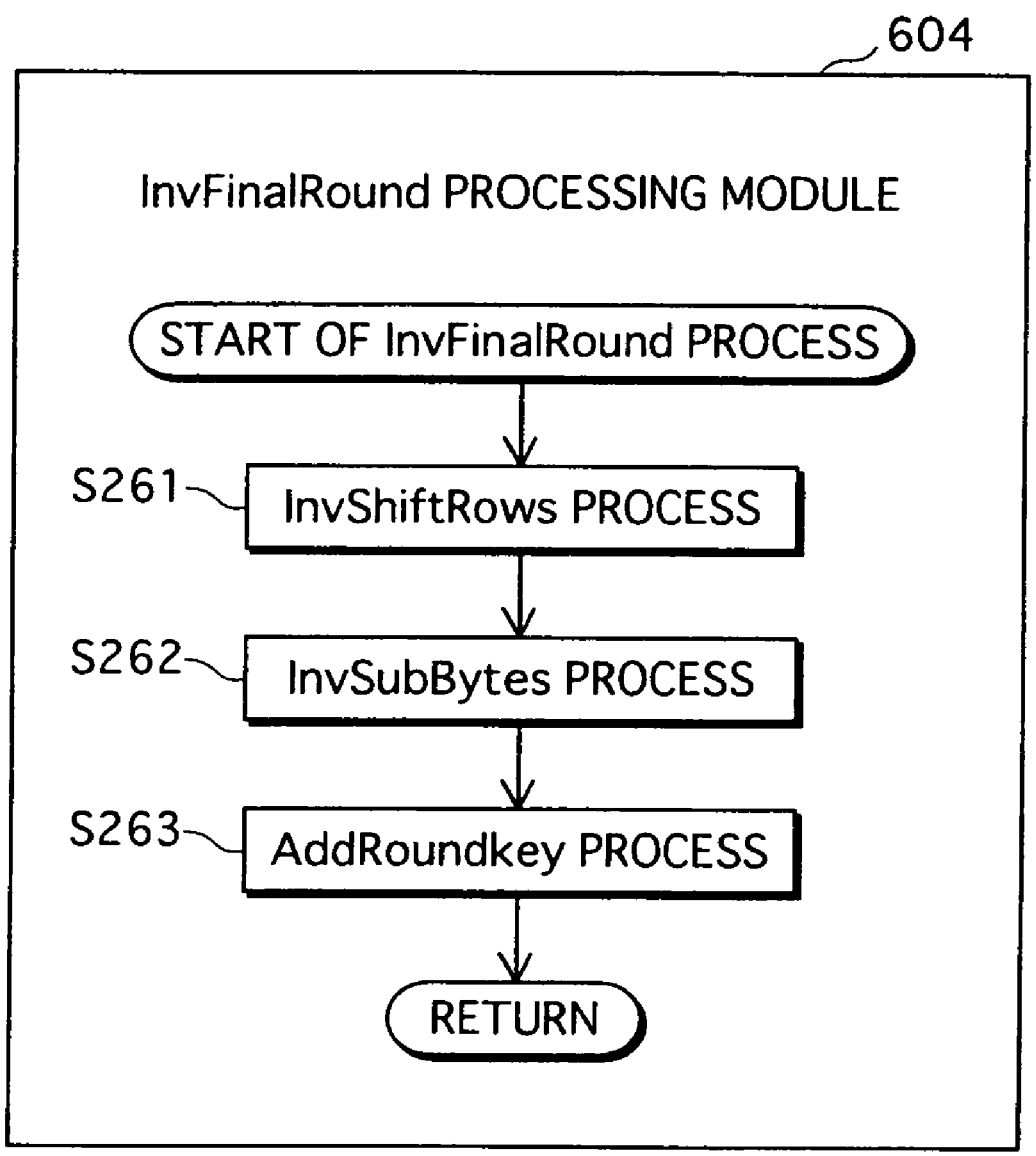
FIG. 24 is a flowchart illustrating details of an InvFinalRound processing module 604.

The InvFinalRound processing module 604 is, as shown in FIG. 24, formed with instruction code groups S261, S262 and S263 included therein. These instruction code groups are arranged in the InvFinalRound processing module 604 in the stated order. Each instruction code group includes one or more instruction codes.

The instruction code group S261 includes multiple instruction codes that indicate to call the InvShiftRows processing module 606 for performing an InvShiftRows process.

The instruction code group S262 includes multiple instruction codes that indicate to call the InvSubBytes processing module 605 for performing an InvSubBytes process.

The instruction code group S263 includes multiple instruction codes that indicate to call the AddRoundKey processing module 602 for performing an AddRoundKey process.

(d-7) Others

The AddRoundKey processing module 602, InvShiftRows processing module 606, InvMixColumns processing module 607, and KeySchedule processing module 608 perform an AddRoundKey process, an InvShiftRows process, an InvMixColumns process and a Keyschedule process, respectively, which are specified in the AES. The explanation of these processes is left out since they are as specified in the AES.

(3) Microprocessor 201

Similar to the microprocessor 101, the microprocessor 201 comprises an operation unit, a cache unit and other units. The cache unit is composed of the data unit 175 and other units. The data unit is composed of 256 cache line units, each of which includes a memory area of 64 bits.

The microprocessor 201 has a similar configuration to the microprocessor 101, and the operation unit, cache unit and other units are as described above.

One example in which the contents of the inverse transform modified S box 611 are stored in the cache line units of the data unit by the above-mentioned InvSubBytes process is shown in FIG. 25 as a data unit 175b.

In cache line units 181b, 182b, 183b, 184b, . . . , 186b and 187b of the data unit 175b, the contents of the inverse transform modified S box 611 are stored without change.

That is, stored in the cache line unit 181b are array elements 851 "InvS[00]", 861 "0xff", 862 "0xff", 863 "0xff", 864 "0xff", 865 "0xff", 866 "0xff" and 867 "0xff". Also in each of the other cache line units, the start array element stores therein the same value as an array element of the inverse transform standard S box 800, and the remaining array elements each have "0xff".

For example, start array elements of the cache line units 182b, 183b, 184b, . . . , 186b and 187b store therein the same values as array elements 852 "InvS[01]", 853 "InvS[02]", 854 "InvS[03]", . . . , 855 "InvS[fc]", 856 "InvS[fd]", 857 "InvS[fe]" and 858 "InvS[ff]" of the inverse transform standard S box 800, respectively.

1.5 Operations of Personal Computer 200

The operations of the personal computer 200 are explained next. Note that, since the operations of the microprocessor 201 are the same as those of the microprocessor 101, the explanation is omitted.

(1) Decryption Operations by AES Decryption Program 234

Figure 26:
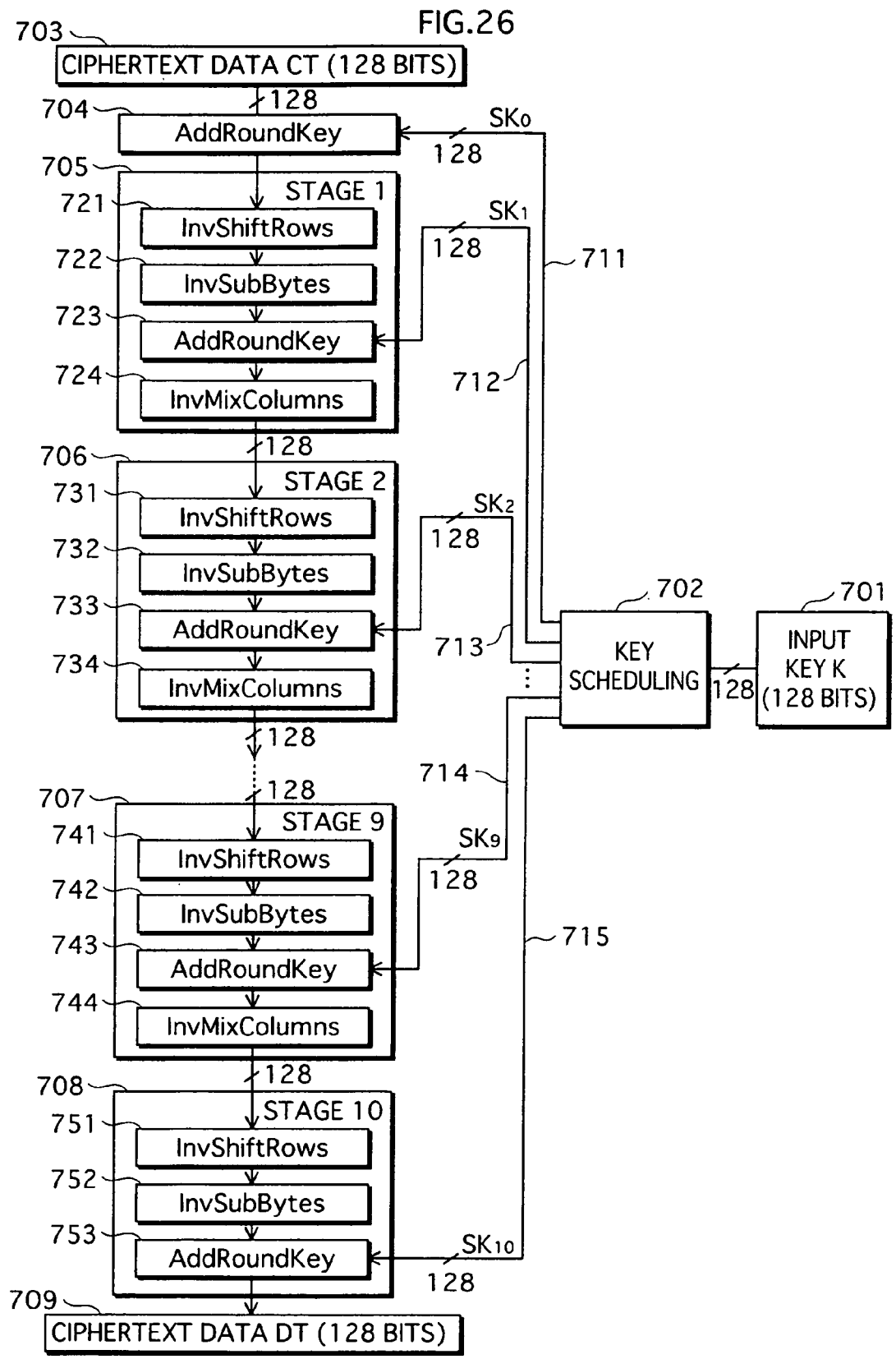
FIG. 26 is a data process chart showing decryption operations performed by the AES decryption program 234.

Decryption Operations by the AES decryption program 234 are described next with the aid of the data process chart of FIG. 26. Here, 128-bit ciphertext data CT 703 shall be generated from 128-bit decrypted (ciphertext) text data DT 790 using a 128-bit input key KT 301, as shown in the figure.

The decryption operations by the AES decryption program 234 comprises a step 702 of key scheduling and ten stages of processes 705, 706, . . . , 707 and 708, as shown in the figure.

Based on an input key K701, eleven extended keys $SK_0$, $SK_1$, . . . , $SK_8$, $SK_9$, and $SK_{10}$ are generated by the KeySchedule processing module 608 (Step S702), and the generated extended keys $SK_0$, $SK_1$, ..., $SK_8$, $SK_9$, and $SK_{10}$ each are distributed to the AddRoundKey process of each stage (Steps 711, 712, 713, ..., 714 and 715).

Next, the AddRoundKey process is performed by the AddRoundKey processing module 602 using the extended key $SK_0$ (Step S704).

Next, in Process 705 of the stage 1, the InvShiftRows process is performed by the InvShiftRows processing module 606 (Step 721), the InvSubBytes process is performed by the InvSubBytes processing module 605 (Step 722), the AddRoundKey process is performed by the AddRoundKey processing module 602 using the extended key $SK_1$ (Step 723), and then the InvMixColumns process is performed by the MixColumns processing module 607 (Step 724).

Next, in Process 706 of the stage 2, the InvShiftRows process is performed by the InvShiftRows processing module 606 (Step 731), the InvSubBytes process is performed by the InvSubBytes processing module 605 (Step 732), the AddRoundKey process is performed by the AddRoundKey processing module 602 using the extended key $SK_2$ (Step 733), and then the InvMixColumns process is performed by the InvMixColumns processing module 607 (Step 734).

In a similar manner, the InvShiftRows process, InvSubBytes process, AddRoundKey process, and InvMixColumns process are performed in each stage from the stages 3 to 8.

Next, in Process 707 of the stage 9, the InvShiftRows process is performed by the InvShiftRows processing module 606 (Step 741), the InvSubBytes process is performed by the InvSubBytes processing module 605 (Step 742), the AddRoundKey process is performed by the AddRoundKey processing module 602 using the extended key $SK_9$ (Step 743), and then the InvMixColumns process is performed by the InvMixColumns processing module 607 (Step 744).

Finally, in Process 708 of the stage 10, the InvShiftRows process is performed by the InvShiftRows processing module 606 (Step 751), the InvSubBytes process is performed by the InvSubBytes processing module 605 (Step 752), and the AddRoundKey process is performed by the AddRoundKey processing module 602 using the extended key $SK_{10}$ (Step 753).

Thus, the 128-bit decrypted data DT 709 is generated.

Figure 27:
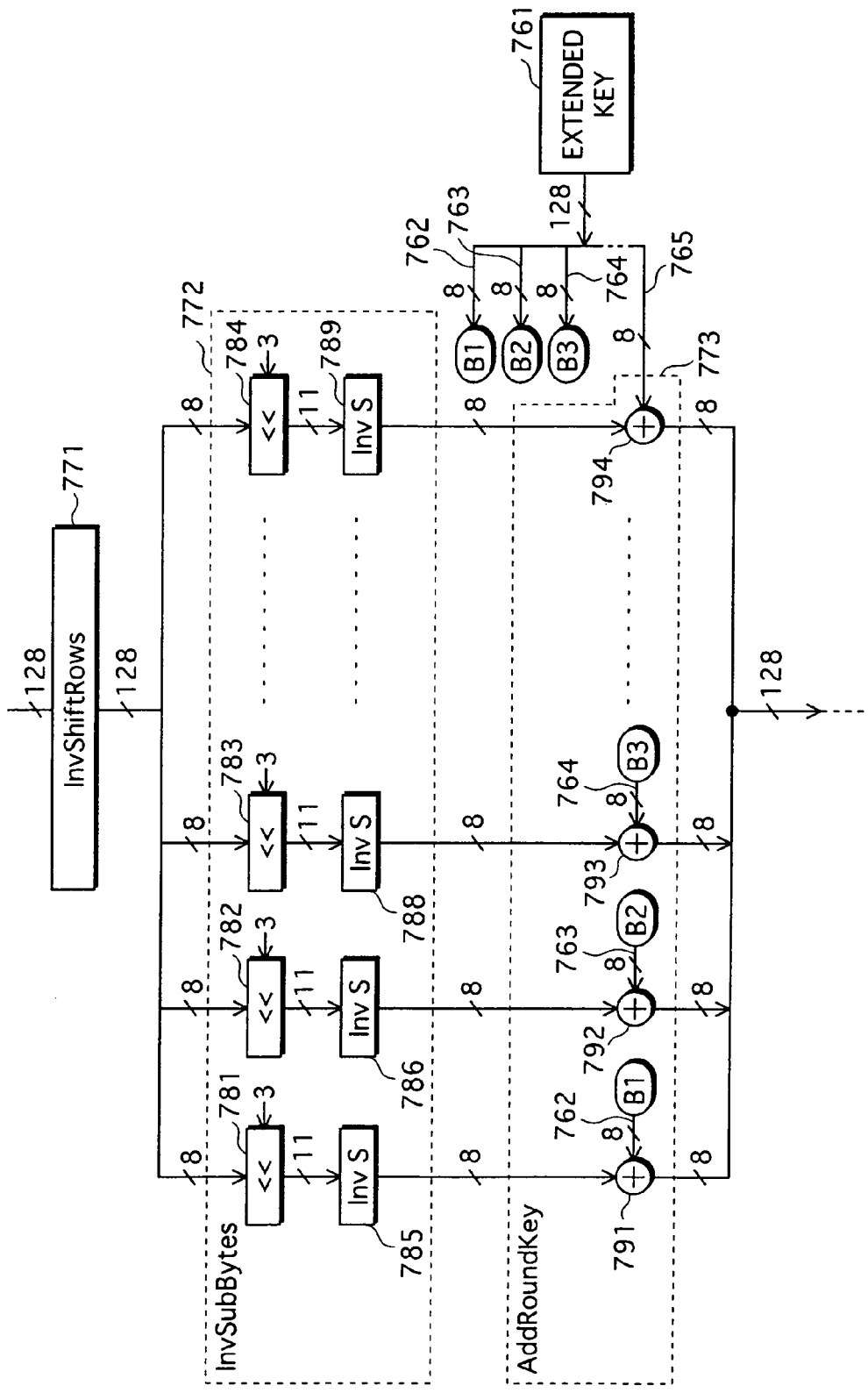
FIG. 27 is a data process chart showing detailed operations of the InvSubBytes process and AddRoundKey process.

(2) Detailed Operations of InvSubBytes Process in Each InvRound Process or InvFinalRound Process, and Detailed Operations of AddRoundKey Process Next are described detailed operations of the InvSubBytes process in each InvRound process or the InvFinalRound process and the AddRoundKey process with the aid of a data process chart of FIG. 27.

Each InvRound process or the InvFinalRound process includes at least an InvShiftRows process 771, an InvSubBytes process 772 and an AddRoundKey process 722, as shown in FIG. 27.

The InvSubBytes process 772 includes sixteen shifting processes 781, 782, 783, ..., and 784 and sixteen reference processes 785, 786, 788, ..., and 789, where the inverse transform modified S box 611 is referred to.

The AddRoundKey process 773 includes sixteen EXCLUSIVE-OR operations 791, 792, 383, ..., and 384.

The 128-bit extended key 761 is divided into sixteen partial keys of 8 bits, and the sixteen partial keys are output to the sixteen EXCLUSIVE-OR operations 791, 792, 793, ..., and 794 in the AddRoundKey process 372, respectively (Steps 762, 763, 764, ..., and 765).

In each InvRound process or the InvFinalRound process, 128-bit block data is output from the InvShiftRows process 771 after the InvShiftRows process is finished, and the block data is then divided into sixteen pieces of 8-bit partial data, which are then respectively output to the sixteen shifting processes 781, 782, 783, ..., and 784 of the InvSubBytes process 772.

The shifting process 781 receives 1st partial data (8 bits), and shifts the received 1st partial data to the left by three bits to thereby obtain 1st shifted data of 11 bits. Here, the high 8 bits of the 1st shifted data are the same as the 1st partial data, and the low 3 bits of the 1st shifted data are "000" (represented in binary form). Subsequently, the 1st shifted data is output to the reference process 785.

The reference process 785 receives the 1st shifted data, obtains a 1st array element of 8 bits by referring to the inverse transform modified S box 611 using the 1st shifted data as an address, and outputs the 1st array element to the EXCLUSIVE-OR operation 791 of the AddRoundKey process 773.

The EXCLUSIVE-OR operation 791 receives the 1st array element (8 bits) and a 1st partial key (8 bits), and performs an EXCLUSIVE-OR operation on the 1st array element and 1st partial key to obtain 1st operation data of 8 bits.

Similarly, the shifting process 782 shifts the 2nd partial data to the left by three bits to thereby obtain 2nd shifted data of 11 bits. The reference process 786 obtains a 2nd array element of 8 bits by referring to the inverse transform modified S box 611 using the $2^{nd}$ shifted data as an address. Then, the EXCLUSIVE-OR operation 792 performs an EXCLUSIVE-OR operation on the 2nd array element and a 2nd partial key to obtain 2nd operation data of 8 bits.

Similarly, the shifting process 783 shifts the 3rd partial data to the left by three bits to thereby obtain 3rd shifted data of 11 bits. The reference process 788 obtains a 3rd array element of 8 bits by referring to the inverse transform modified S box 611 using the 3rd shifted data as an address. Then, the EXCLUSIVE-OR operation 793 performs an EXCLUSIVE-OR operation on the 3rd array element and a 3rd partial key to obtain 3rd operation data of 8 bits.

In a similar manner, 4th to 15th operation data are obtained.

Furthermore, the shifting process 784 similarly shifts 16th partial data (8 bits) to the left by three bits to obtain 16th shift data of 11 bits, the reference process 789 obtains a 16th array element of 8 bits by referring to the inverse transform modified S box 611 using the 16th shifted data as an address, and the EXCLUSIVE-OR operation 794 performs an EXCLUSIVE-OR operation on the 16th array element and a 16th partial key to thereby obtain 16th operation data of 8 bits.

Thus, the 1st to 16th operation data (sixteen pieces of operation data) are obtained.

Subsequently, the 1st to 16th operation data are joined in this order to generate data of 128 bits.

2. Modification (1)

Next is explained a modification of the AES encryption program 133 that the memory unit 103 of the content server apparatus 100 stores.

The AES encryption program 133 may include a modified S box 911 shown in FIG. 28 in place of the modified S box 511. At this time, the AES encryption program 133 also includes a SubBytes processing module 505a (not shown) in place of the SubBytes processing module 505. The SubBytes processing module 505a includes a 2-bit left shifting process instead of the 3-bit left shifting process.

(Modified S Box 911)

As shown in FIG. 28, the modified S box 911 comprises 1024 pieces of array elements 921, 931, 932, 933, 922, 934, 935, 936, 923, ..., 924, ..., 925, ..., 926, ..., 927, ..., 928, and ....

For representation convenience, the array elements making up the modified S box 911 in FIG. 28 are arranged in a matrix of 128 rows by 8 columns.

The 128 array elements 921, 923, . . . , 925, and 927 in the first column have values S[00], S[02], S[04], S[06], . . . , S[f8], S[fa], S[fc], and S[fe], respectively. Here, the values S[00], S[02], S[04], S[06], . . . , S[f8], S[fa], S[fc], and S[fe] are the same as those in the standard S box 380 above.

Each of the 128 array elements in the second column has a value of "0xff". Here, "0x" indicates that the subsequent numeric value is represented in hexadecimal.

Each array element included in the third and fourth columns has a value of "0xff".

The 128 array elements 922, 924, . . . , 926, and 928 in the fifth column have values S[01], S[03], S[05], S[07], . . . , S[f9], S[fb], S[fd], and S[ff], respectively. Here, the values S[01], S[03], S[05], S[07], . . . , S[f9], S[fb], S[fd], and S[ff] are the same as those in the standard S box 380 above.

Each of the 128 array elements included in the sixth column has a value of "0xff".

Each array element included in the seventh and eighth columns has a value of "0xff".

Thus, when the multiple array elements included in the modified S box 911 are assumed to be arranged in a matrix of 128 rows by 8 columns, array elements of the standard S box 380, whose array numbers are even numbers, are placed in the 128 array elements of the first column in the modified S box 911. On the other hand, array elements of the standard S box 380, whose array numbers are odd numbers, are placed in the 128 array elements of the fifth column in the modified S box 911, and a value of "0xff" is placed in each array element of the second to fourth columns and sixth to eighth columns.

Hence, when focused on four array elements continuously positioned in one row of the modified S box 511, the start array element has the same value as an array element included in the standard S box 380, and the remaining array elements each have a meaningless value "0xff".

(SubBytes Processing Module 505*a*)

Figure 29:
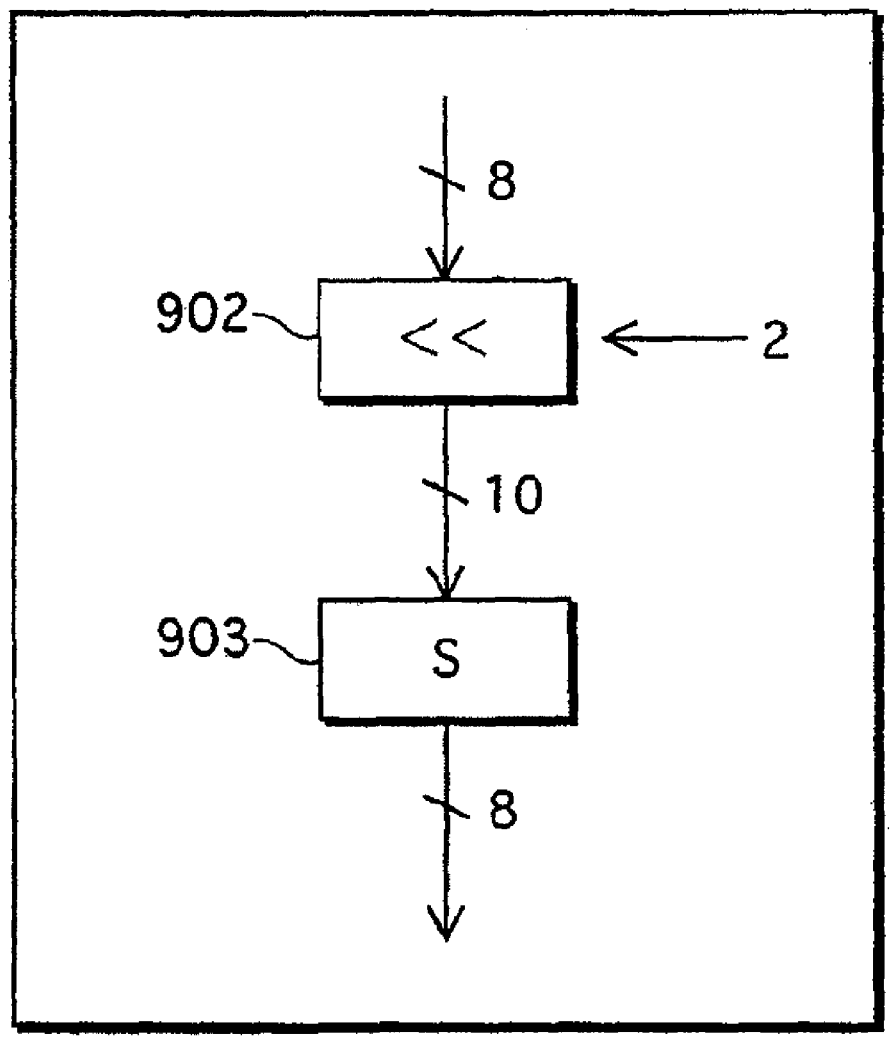

In the SubBytes process performed by the SubBytes processing module 505*a*, block data of 128 bits is received, the received 128-bit block data is divided into 16 pieces of partial block data of 8 bits (8 bits×16=128 bits), and each partial block data is shifted to the left by two bits (Step 902), as shown in FIG. 29. Thus, data of 10 bits is generated for each of the sixteen pieces of partial block data. Then, a process of referring to the modified S box 911 is carried out for each data of 10 bits to output 8-bit data (Step 903).

Although, as described above, sixteen 2-bit left shifting processes and sixteen reference processes where the modified S box 911 is referred to are carried out in the SubBytes process of the SubBytes processing module 505*a*, FIG. 29 shows only one left shifting process 902 and one reference process 903 for purpose of simple illustration.

Thus, with respect to sixteen pieces of partial block data, the 2-bit left shifting and the process of referring to the modified S box 911 are performed. As a result, sixteen pieces of 8-bit data are generated. The generated sixteen pieces of 8-bit data are joined to form block data of 128 bits, which is then output.

The following is the reason why each partial block data is shifted to the left by two bits as described above.

By shifting to the left by two bits, each partial block becomes four times larger. Among four array elements continuously positioned in one row of the modified S box 911, the one array element at the start has a valid value S[xx]. Accordingly, by referring to the modified S box 911 using, as an address, the data obtained by multiplying each partial block data by four, only the valid value S[xx] is attained.

Note that the SubBytes processing module 505*a* may include a multiplication process which performs multiplication by four, in place of the process of 2-bit left shifting, on the account described above.

(Example of Data Unit)

One example in which the contents of the modified S box 911 are stored in the cache line units 181, 182, and . . . of the data unit 175 by the above-mentioned SubBytes process is shown in FIG. 30 as a data unit 175*c*.

As shown in FIG. 30, in 128 cache line units 181*c*, 182*c*, 183*c*, 184*c*, and . . . starting from the first one in the data unit 175*c*, the contents of the modified S box 911 are stored without change.

That is, stored in the cache line unit 181*c* are array elements 941 "S[00]", 951 "0xff", 952 "0xff", 953 "0xff", 942 "S[01]", 954 "0xff", 955 "0xff" and 956 "0xff". Also in each of the other cache line units, the first and fifth array elements store therein the same values as array elements of the standard S box 380, and the remaining array elements each have "0xff".

Similarly, stored in the start array elements of 127 cache line units 182*c*, 183*c*, 184*c*, and . . . are the same values as array elements 943 "S[02]", . . . , 945 "S[fc]" and 947 "S[fe]" of the standard S box 380.

Similarly, stored in the fifth array elements of the cache line units 182*c*, 183*c*, 184*c*, and . . . are the same values as array elements 944 "S[03]", . . . , 946 "S[fd]" and 948 "S[ff]" of the standard S box 380.

Thus, only two array elements of the standard S box 380 are stored in each cache line unit of the data unit 175*c*.

(Applications in AES Decryption Program 234)

Some modification may be made to the AES decryption program 234 stored in the memory unit 203 of the personal computer 200 in a similar manner described above.

That is, the AES decryption program 234 may include, in place of the inverse transform modified S box 611, an inverse transform modified S box configured in the same manner as the modified S box 911 of FIG. 28. At this time, the InvSubBytes processing module 605 of the AES decryption program 234 includes, as the SubBytes processing module 505*a*, a 2-bit left shifting process instead of the 3-bit left shifting process.

3. Modification (2)

Next is explained another modification of the AES encryption program 133 that the memory unit 103 of the content server apparatus 100 stores.

The AES encryption program 133 may include a modified S box 1011 shown in FIG. 31 in place of the modified S box 511. At this time, the AES encryption program 133 also includes a SubBytes processing module 505*b* (not shown) in place of the SubBytes processing module 505. The SubBytes processing module 505*b* includes a 1-bit left shifting process, instead of the 3-bit left shifting process, and an adding process of a plus 1 mod 512.

(Modified S Box 1011)

As shown in FIG. 31, the modified S box 1011 comprises 512 pieces of array elements 1041, 1031, 1042, 1032, 1043, 1033, 1044, 1034, . . . , 1035, . . . , 1036, . . . , 1037, . . . , 1038, and . . . .

For representation convenience, the array elements making up the modified S box 1011 in FIG. 31 are arranged in a matrix of 64 rows by 8 columns.

The 64 array elements 1031, . . . , and 1035 in the second column have values S[00], S[04], S[f8], S[f12], . . . , S[f0], S[f4], S[f8] and S[fc], respectively. Here, the values S[00], S[04], S[f8], S[f12], S[f0], S[f4], S[f8] and S[fc] are the same as those in the standard S box 380 above.

In addition, the 64 array elements 1032, . . . , and 1036 in the fourth column have values S[01], S[05], S[09], S[13], . . . , S[f1], S[f5], S[f9] and S[fd], respectively. Here, the values S[01], S[05], S[09], S[13], . . . , S[f1], S[f5], S[f9] and S[fd] are the same as those in the standard S box 380.

In addition, the 64 array elements 1033, . . . , and 1037 in the sixth column have values S[02], S[06], S[10], S[14], . . . , S[f2], S[f6], S[fa] and S[fe], respectively. Here, the values S[02], S[06], S[10], S[14], . . . , S[f2], S[f6], S[fa] and S[fe] are the same as those in the standard S box 380.

In addition, the 64 array elements 1034, . . . , and 1038 in the eighth column have values S[03], S[07], S[11], S[15], . . . , S[f3], S[f7], S[fb] and S[ff], respectively. Here, the values S[03], S[07], S[11], S[15], . . . , S[f3], S[f7], S[fb] and S[ff] are the same as those in the standard S box 380.

Each of the 64 array elements in the first column has a value of "0xff". Here, "0x" indicates that the subsequent numeric value is represented in hexadecimal.

Each array element in the third, fifth and seventh columns also have a value of "0xff".

Thus, when focused on two array elements continuously positioned in one row of the modified S box 1011, the start array element has a meaningless value "0xff", and the other array element has the same value as an array element included in the standard S box 380.

(SubBytes Processing Module 505*b*)

Figure 32:
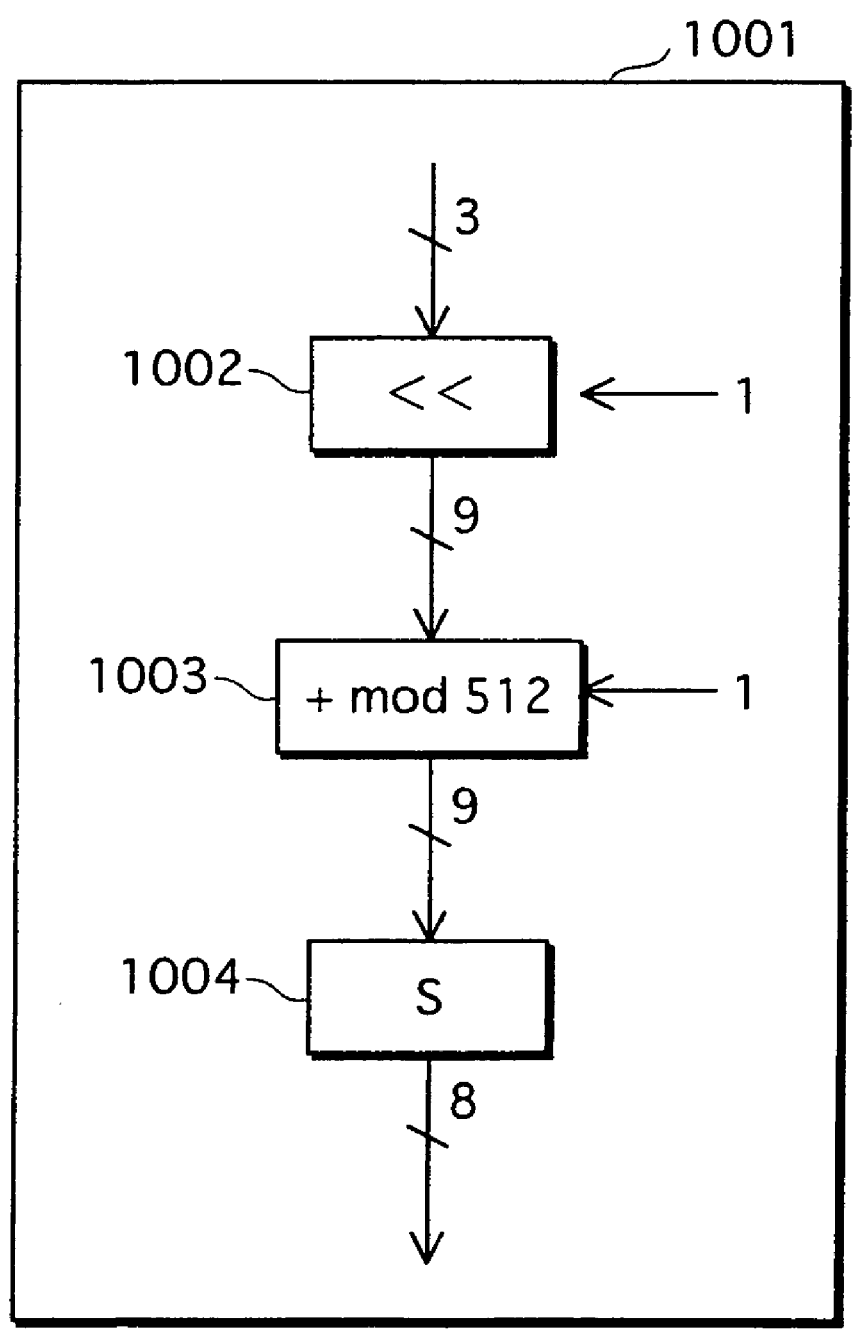
FIG. 32 is a data process chart showing operations of one left-shifting process 1002, one addition process 1003 and one reference process 1004 in the SubBytes process of a SubBytes processing module 505b.

In the SubBytes process performed by the SubBytes processing module 505*b*, block data of 128 bits is received, the received 128-bit block data is divided into 16 pieces of partial block data of 8 bits (8 bits×16=128 bits), and each partial block data is shifted to the left by one bit (Step 1002), as shown in FIG. 32. Thus, data of 9 bits is generated for each of the sixteen pieces of partial block data. Then, an operation of addition mod 512 is performed on the result obtained by adding a value of "1" to each of the 9-bit data, to thereby yield added data of 9 bits (Step 1003).

That is, (added data)=(9-bit data)+1 mod 512.

Next, a process of referring to the modified S box 1011 is carried out on each of the generated data of 9 bits to output 8-bit data (Step 1004).

Although, as described above, sixteen 1-bit left shifting processes, sixteen plus 1 mod 512 processes, and sixteen reference processes where the modified S box 1011 is referred to are carried out in the SubBytes process of the SubBytes processing module 505*b*, FIG. 32 shows only a group 1001 which comprises one left shifting process 1002, one adding process 1003 and one reference process 1004 for purpose of simple illustration.

Thus, with respect to sixteen pieces of partial block data, the 1-bit left shifting, the addition mod 512, and the reference to the modified S box 911 are performed. As a result, sixteen pieces of 8-bit data are generated. The generated sixteen pieces of 8-bit data are joined to form block data of 128 bits, which is then output.

The following is the reason why each partial block data is shifted to the left by one bit and the operation of plus 1 mod 512 is performed as described above.

By shifting to the left by one bit and further performing the plus 1 mod 512, each partial block becomes two times larger and "1" is added thereto. Between two array elements continuously positioned in one row of the modified S box 1011, the latter array element has a valid value S[xx]. Accordingly, by referring to the modified S box 1011 using, as an address, the data obtained by multiplying each partial block data by two and then adding "1" thereto, only the valid value S[xx] is attained.

Note that the SubBytes processing module 505*b* may include a multiplication process which performs multiplication by two, in place of the process of 1-bit left shifting, on the account described above.

Thus, in a modified S box, if a valid value S[xx] is placed in the latter array element of two continuously positioned array elements, the valid value S[xx] only can be attained by, in the same manner described above, referring to this modified S box using data obtained by doubling each partial block data and then adding "1" thereto as an address.

In addition, in a different modified S box, if a valid S[xx] is placed in the third array element of eight continuously positioned array elements, the valid value S[xx] only can be attained by, in the same manner described above, referring to this modified S box using data obtained by multiplying each partial block data by eight and then adding "2" thereto as an address.

In addition, in a different modified S box, if a valid S[xx] is placed in the fourth array element of eight continuously positioned array elements, the valid value S[xx] only can be attained by, in the same manner described above, referring to this modified S box using data obtained by multiplying each partial block data by eight and then adding "3" thereto as an address.

(Example of Data Unit)

One example in which the contents of the modified S box 1011 are stored in the cache line units 181, 182, and . . . of the data unit 175 by the above-mentioned SubBytes process is shown in FIG. 33 as a data unit 175*d*.

In 64 cache line units 181*d*, 182*d*, 183*d*, 184*d*, and . . . starting from the first one in the data unit 175*d*, the contents of the modified S box 1011 are stored without change.

That is, stored in the cache line unit 181*d* are array elements 1061 "0xff", 1051 "S[00]", 1062 "0xff", 1052 "S[01]", 1063 "0xff", 1053 "S[02]", 1064 "0xff" and 1054 "S[03]". Also in each of the other cache line units, the second, fourth, sixth and eighth array elements store therein the same values as array elements of the standard S box 380, and the remaining array elements each have "0xff".

Similarly, stored in the second array elements of 63 cache line units 182*d*, 183*d*, 184*d*, and . . . are the same values as array elements "S[04]", "S[08]", "S[12]", . . . , "S[f0]", "S[f4]", "S[f8]" and "S[fc]" of the standard S box 380.

Similarly, stored in the fourth array elements of 63 cache line units 182*d*, 183*d*, 184*d*, and . . . are the same values as array elements "S[05]", "S[09]", "S[13]", . . . , "S[f1]", "S[f5]", "S[f9]" and "S[fd]" of the standard S box 380.

Similarly, stored in the sixth array elements of 63 cache line units 182*d*, 183*d*, 184*d*, and . . . are the same values as array elements "S[06]", "S[10]", "S[14]", . . . , "S[f2]", "S[f6]", "S[fa]" and "S[fe]" of the standard S box 380.

Similarly, stored in the eighth array elements of 63 cache line units 182*d*, 183*d*, 184*d*, and . . . are the same values as array elements "S[07]", "S[11]", "S[15]", . . . , "S[f3]", "S[f7]", "S[fb]" and "S[ff]" of the standard S box 380.

Thus, only four array elements of the standard S box 380 are stored in each cache line unit of the data unit 175*d*.

(Applications in AES Decryption Program 234)

Some modification may be made to the AES decryption program 234 stored in the memory unit 203 of the personal computer 200 in a similar manner described above.

That is, the AES decryption program 234 may include, in place of the inverse transform modified S box 611, an inverse transform modified S box configured as the modified S box

1011 of FIG. 31. At this time, the InvSubBytes processing module 605 of the AES decryption program 234 includes, as the SubBytes processing module 505$b$, a 1-bit left shifting process, instead of the 3-bit left shifting process, and a plus 1 mod 512 process.

4. Modification (3)

Next is explained another modification of the AES encryption program 133 that the memory unit 103 of the content server apparatus 100 stores.

The AES encryption program 133 may include a modified S box 1121 shown in FIG. 34 in place of the modified S box 511. At this time, the AES encryption program 133 also includes a SubBytes processing module 505$c$ (not shown) in place of the SubBytes processing module 505. The SubBytes processing module 505$c$ includes a process of multiplication mod 256 instead of the 3-bit left shifting process.

(Modified S Box 1121)

As shown in FIG. 34, the modified S box 1121 comprises 256 pieces of array elements 1131, 1132, 1133, 1134, 1135, 1136, 1137, 1138, 1139, 1140, 1141, 1142, 1143, 1144, 1145, 1146, and . . . . These array elements are identified by array numbers "0", "1", "2", "3", . . . , and "255".

For representation convenience, the array elements making up the modified S box 1121 in FIG. 34 are arranged in a matrix of 32 rows by 8 columns.

The 8 array elements 1131, . . . , and 1138 in the first row have values S[0], S[81], S[162], S[243], S[68], S[149], S[230] and S[55], respectively. Here, the values S[0], S[81], S[162], S[243], S[68], S[149], S[230] and S[55] are the same as those in the standard S box 380 above. Here, "xx" in S[xx] is represented in decimal.

In addition, the 8 array elements 1139, . . . , and 1146 in the second row have values S[136], S[217], S[42], S[123], S[204], S[29], S[110] and S[191], respectively. Here, the values S[136], S[217], S[42], S[123], S[204], S[29], S[110] and S[191] are the same as those in the standard S box 380 above. Here also "xx" in S[xx] is represented in decimal.

Array elements in the third to thirty second rows have the same values as those of the array elements in the standard S box 380 above. Note however that FIG. 34 omits the illustration of each array element of the third to thirty second rows in the modified S box 1121.

(Arrangement Rule for Modified S Box 1121)

In the modified S box 1121, each array element of the above-mentioned standard S box 380 is stored according to a rule described below.

A calculation of A×177 mod 256 is performed on each of 256 input values A (0, 1, 2, . . . , and 255) which are integer numbers. Each input value A and its corresponding result are shown in a correspondence table 1122 of FIG. 35.

Figure 35:
FIG. 35 is a correspondence table showing a correspondence between 256 input values A, which are integers (0, 1, 2, ..., and 255), and results obtained from the calculation of A×177 mod 256.

The correspondence table 1122 shows a correspondence between the 256 input values A and the results obtained from the calculation of A×177 mod 256. Note however that the correspondence table 1122 of FIG. 35 shows, not the calculation results of all values of A, but those of only a part of the values due to limitations of space.

Here, for example, the calculation results of the A×177 mod 256 operation for the input values A=0, 81, 162, 243, and 68 are "0", "1", "2", "3", and "4", respectively.

For example, an array element in the standard S box 380 to be stored in the array element 1131, which is indicated by an array number "0" of the modified S box 1121, is decided in the following manner. A calculation result "0" having the same value as the array number "0" is found in the correspondence table 1122, and the input value A "0" corresponding to the calculation result is obtained. Next, the array element S[0] having the obtained input value A "0" as its array number is set as a value of the array element 1131 indicated by the array number "0" of the modified S box 1121.

For another example, an array element in the standard S box 380 to be stored in the array element 1132, which is indicated by an array number "1" of the modified S box 1121, is decided in the following manner. A calculation result "1" having the same value as the array number "1" is found in the correspondence table 1122, and the input value A "81" corresponding to the calculation result is obtained. Next, the array element S[81] having the obtained input value A "81" as its array number is set as a value of the array element 1132 indicated by the array number "1" of the modified S box 1121.

Furthermore, for another example, an array element in the standard S box 380 to be stored in the array element 1133, which is indicated by an array number "2" of the modified S box 1121, is decided in the following manner. A calculation result "2" having the same value as the array number "2" is found in the correspondence table 1122, and the input value A "162" corresponding to the calculation result is obtained. Next, the array element S[162] having the obtained input value A "162" as its array number is set as a value of the array element 1133 indicated by the array number "2" of the modified S box 1121.

Values for the remaining array elements in the modified S box 1121 are decided in the same way.

Thus, in the modified S box 1121, the array elements included in the standard S box 380 are arranged according to the above-mentioned rule.

Note that, although the above describes that the A×177 mod 256 operation is used for the input values A and each of the input values A is multiplied by "177", the multiplication value is not limited to "177". Instead, a different odd number may be used as the multiplication value.

In addition, although the above describes the operation of multiplication mod 256, the value "256" here depends on the longest possible length of data subjected to conversion (for example, bit length)—in other words, it depends on the largest count of different values that the data can possibly take. In the above embodiment and modifications, the data for conversion is 8 bits, and therefore the largest count of different values that the data can possibly take is 256. As has been mentioned, by performing the operation of multiplication mode 256, the largest count of different resulting values obtained by the multiplication is the same as that of different values that the data for conversion can possibly take, i.e. 256.

(SubBytes Processing Module 505$c$)

Figure 36:
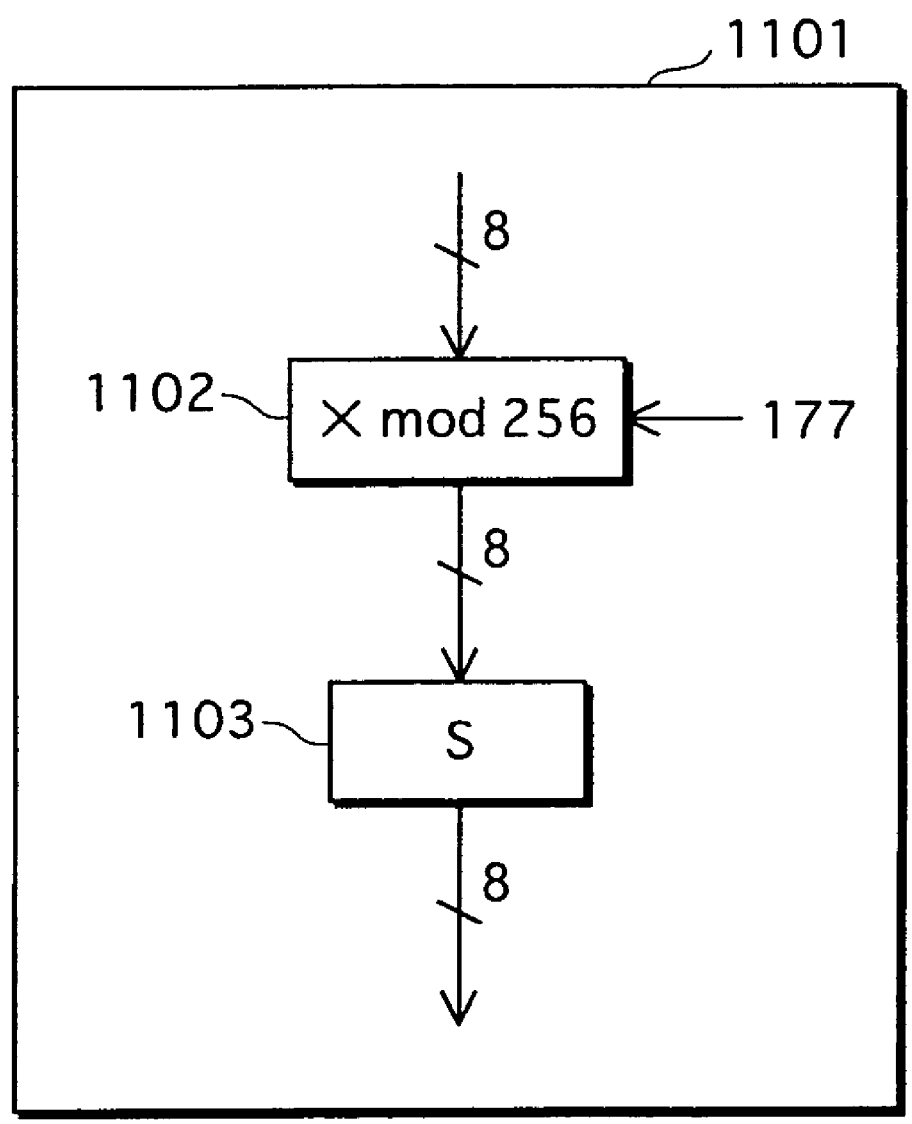
FIG. 36 is a data process chart showing operations of one multiplication process 1102 and one reference process 1103 in the SubBytes process of a SubBytes processing module 505c.

In the SubBytes process performed by the SubBytes processing module 505$c$, block data of 128 bits is received, the received 128-bit block data is divided into 16 pieces of partial block data of 8 bits (8 bits×16=128 bits), and each partial block data is multiplied by a value of "177" under mod 256 (Step 1102), as shown in FIG. 36. Thus, a resulting value of 8 bits is generated by the multiplication for each of the sixteen pieces of partial block data. Then, a process of referring to the modified S box 1121 is carried out for each 8-bit resulting value to output data of 8 bits (Step 1103).

Although, as described above, sixteen mod 256 multiplication processes and sixteen reference processes where the modified S box 1121 is referred to are carried out in the SubBytes process of the SubBytes processing module 505$c$, FIG. 36 shows only a group 1101 which comprises one multiplication process 1102 and one reference process 1003 for purpose of simple illustration.

Thus, with respect to sixteen pieces of partial block data, the multiplication mod 256 and the reference to the modified S box 1121 are performed. As a result, sixteen pieces of 8-bit data are generated. The generated sixteen pieces of 8-bit data are joined to form block data of 128 bits, which is then output.

The following is the reason why each partial block data is multiplied by a value of "177" under mod 256 as described above.

As an example, assume here that partial block data is "81". In this case, the following is obtained according to the above multiplication process:

$$81 \times 177 \bmod 256 = 1.$$

Next the modified S box 1121 is referred to using the obtained value "1" as an array number, and then the array element S[81] is obtained.

As another example, assume that partial block data is "162". In this case, the following is obtained according to the above multiplication process:

$$162 \times 177 \bmod 256 = 2.$$

Next the modified S box 1121 is referred to using the obtained value "2" as an array number, and then the array element S[162] is obtained.

Thus, a valid array element S[xx] that appropriately corresponds to each partial block data is attained by multiplying the partial block data by a value of "177" under mod 256 and referring to the modified S box 1121 using the resulting value as an address.

(Example of Data Unit)

Figure 37:
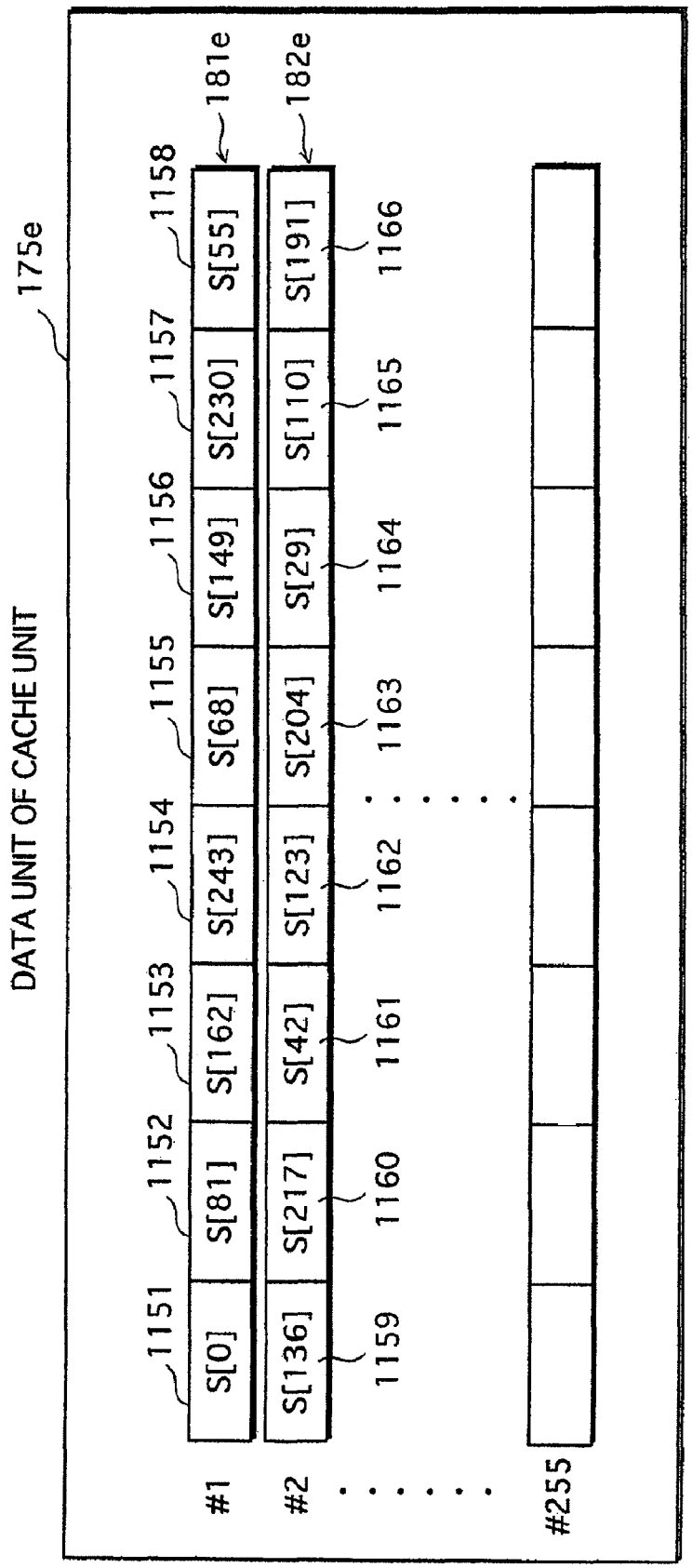
FIG. 37 shows an example where contents of a modified S box 1121 are stored in the cache line units 181, 182, and ... of the data unit 175.

One example in which the contents of the modified S box 1121 are stored in the cache line units 181, 182, and . . . of the data unit 175 by the above-mentioned SubBytes process is shown in FIG. 37 as a data unit 175*e*.

In 128 cache line units 181*e*, 182*e*, and . . . starting from the first one in the data unit 175*e*, the contents of the modified S box 1121 are stored without change.

That is, stored in the cache line unit 181*e* are array elements 1151 "S[0]", 1152 "S[81]", 1153 "S[162]", 1154 "S[243]", 1155 "S[68]", 1156 "S[149]", 1157 "S[230]" and 1158 "S[55]".

Also in the cache line unit 182*e*, array elements 1159 "S[136]", 1160 "S[217]", 1161 "S[42]", 1162 "S[123]", 1163 "S[204]", 1164 "S[29]", 1165 "S[110]" and 1166 "S[191]" are stored.

Also in each of the other cache line units, eight array elements of one row in the modified S box 1121 are stored in a similar manner above.

(Applications in AES Decryption Program 234)

Some modification may be made to the AES decryption program 234 stored in the memory unit 203 of the personal computer 200 in a similar manner described above.

That is, the AES decryption program 234 may include, in place of the inverse transform modified S box 611, an inverse transform modified S box configured in the same manner as the modified S box 1121 of FIG. 34. At this time, the InvSubBytes processing module 605 of the AES decryption program 234 includes, as the SubBytes processing module 505*c*, a process of multiplication by a value of "177" under mod 512 instead of the 3-bit left shifting process.

5. Modification (4)

Next is explained another modification of the AES encryption program 133 that the memory unit 103 of the content server apparatus 100 stores.

The AES encryption program 133 may include a modified S box 1221 shown in FIG. 38 in place of the modified S box 511. At this time, the AES encryption program 133 also includes a SubBytes processing module 505*d* (not shown) in place of the SubBytes processing module 505. The SubBytes processing module 505*d* includes a process of multiplication mod 256 and a 1-bit left shifting process, instead of the 3-bit left shifting process.

(Modified S Box 1221)

As shown in FIG. 38, the modified S box 1221 comprises 512 pieces of array elements 1231, 1241, 1232, 1242, 1233, 1243, 1234, 1244, 1235, . . . , 1236, . . . , 1237, . . . , 1238, and . . . .

For representation convenience, the array elements making up the modified S box 1221 in FIG. 38 are arranged in a matrix of 64 rows by 8 columns.

In the modified S box 1221, values of array elements S[xx] stored in the modified S box 1121 of FIG. 34 are stored in every other array elements thereof, maintaining the array sequence. In each array element between every two values of these array elements S[xx], "0xff" is stored.

For example, eight array elements 1231, 1241, 1232, 1242, 1233, 1243, 1234, and 1244 of the first row in the modified S box 1221 have a value of S[0], "0xff", a value of S[81], "0xff", a value of S[162], "0xff", a value of S[243], and "0xff", respectively. Here, the values S[0], S[81], S[162] and S[243] are the same as those of first four array elements in the first row of the modified S box 1121 shown in FIG. 34.

In addition, the 8 array elements 1235, . . . , 1236, . . . , 1237, . . . , 1238, and . . . in the second row of the modified box 1221 have a value of S[68], "0xff", a value of S[149], "0xff", a value of S[230], "0xff", a value of S[55], and "0xff", respectively. Here, the values S[68], S[149], S[230] and S[55] are the same as those of four array elements of the second half in the first row of the modified S box 1121 shown in FIG. 34.

Note here that "xx" in S[xx] is represented in decimal.

(SubBytes Processing Module 505*d*)

Figure 39:
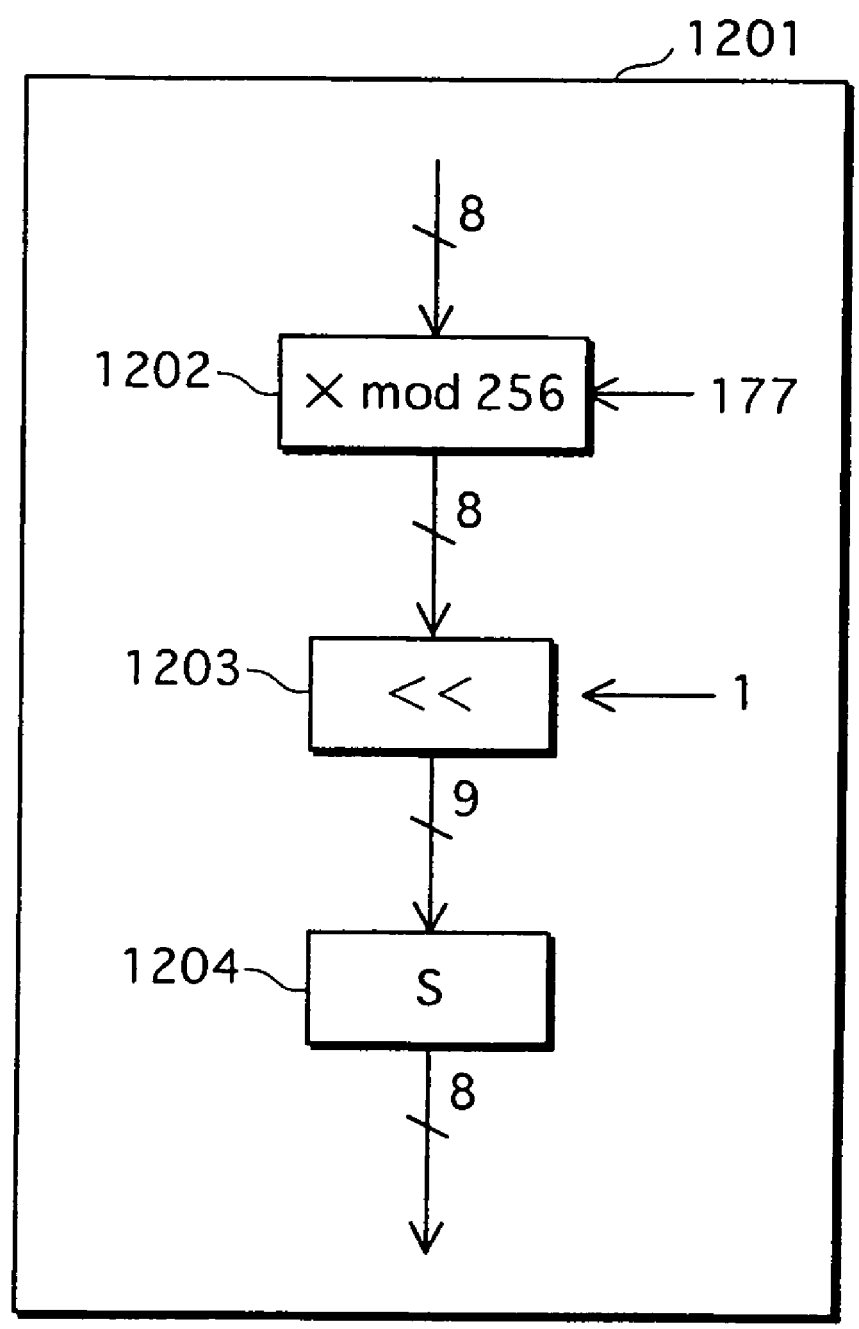
FIG. 39 is a data process chart showing operations of one multiplication process 1202, one shifting process 1203, and one reference process 1204 in the SubBytes process of a SubBytes processing module 505d.

In the SubBytes process performed by the SubBytes processing module 505*d*, block data of 128 bits is received, the received 128-bit block data is divided into 16 pieces of partial block data of 8 bits (8 bits×16=128 bits), and each partial block data is multiplied by a value of "177" under mod 256 (Step 1202), as shown in FIG. 39. Thus, a resulting value of 8 bits is generated by the multiplication for each of the sixteen pieces of partial block data. The resulting value is then shifted to the left by one bit to generate shifted data of 9 bits (Step 1203). Herewith, 9-bit shifted data is generated for each of the sixteen resulting values. Next, a process of referring to the modified S box 1221 is carried out for each 9-bit shifted data to output data of 8 bits (Step 1204).

Although, as described above, sixteen mod 256 multiplication processes, sixteen left shifting processes and sixteen reference processes where the modified S box 1221 is referred to are carried out in the SubBytes process of the SubBytes processing module 505*d*, FIG. 39 shows only a group 1201 which comprises one multiplication process 1202, one shifting process 1203 and one reference process 1204 for purpose of simple illustration.

Thus, with respect to sixteen pieces of partial block data, the multiplication mod 256, the 1-bit left shifting process and the reference to the modified S box 1221 are performed. As a result, sixteen pieces of 8-bit data are generated. The generated sixteen pieces of 8-bit data are joined to form block data of 128 bits, which is then output.

The reason why each partial block data is multiplied by a value of "177" under mod 256 is as described in Modification (4). In addition, the reason why the 1-bit left shifting process is performed is as described in Modification (2).

Thus, a valid array element S[xx] that appropriately corresponds to each partial block data is attained by multiplying the partial block data by a value of "177" under mod 256, then shifting the resulting value to the left by one bit to obtain shifted data, and referring to the modified S box 1221 using the shifted data as an address.

Note that the SubBytes processing module 505*d* may include a multiplication process for performing multiplication by 2, instead of the 1-bit left shifting.

(Example of Data Unit)

Figure 40:
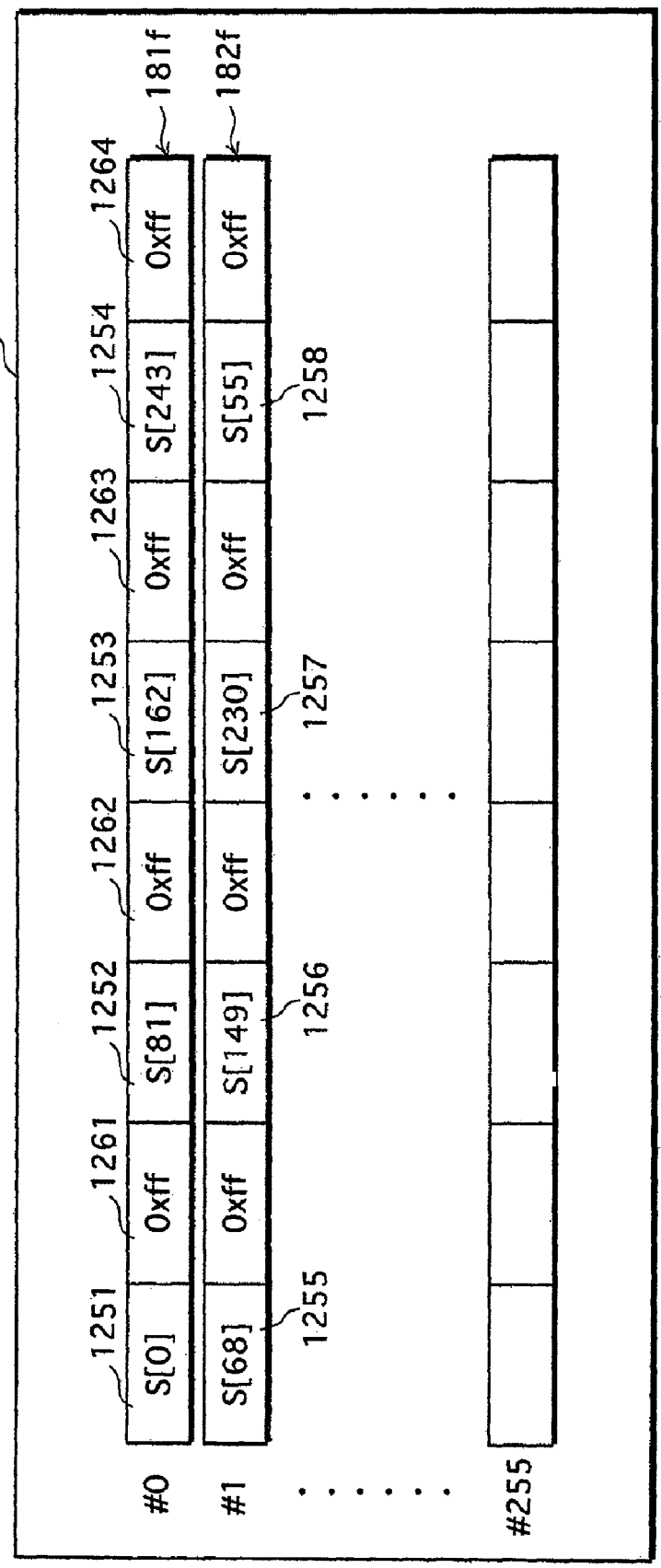
FIG. 40 shows an example where contents of the modified S box 1221 are stored in the cache line units 181, 182, and ... of the data unit 175.

One example in which the contents of the modified S box 1221 are stored in the cache line units 181, 182, and . . . of the data unit 175 by the above-mentioned SubBytes process is shown in FIG. 40 as a data unit 175*f*.

In 64 cache line units 181*f*, 182*f*, and . . . starting from the first one in the data unit 175*f*, the contents of the modified S box 1221 are stored without change.

That is, stored in the cache line unit 181*f* are array elements 1251 "S[0]", 1261 "0xff", 1252 "S[81]", 1262 "0xff", 1253 "S[162]", 1263 "0xff", 1254 "S[243]", and 1264 "0xff".

Also, stored in the cache line unit 182*f* are an array element 1255 "S[68]", "0xff", an array element 1256 "S[149]", "0xff", an array element 1257 "S[230]", "0xff", an array element 1258 "S[55]", and "0xff".

Thus, eight array elements in one row of the modified S box 1221 are stored in each cache line unit of the data unit 175*f*.

(Applications in AES Decryption Program 234)

Some modification may be made to the AES decryption program 234 stored in the memory unit 203 of the personal computer 200 in a similar manner described above.

That is, the AES decryption program 234 may include, in place of the inverse transform modified S box 611, an inverse transform modified S box configured in the same manner as the modified S box 1221 of FIG. 38. At this time, the InvSubBytes processing module 605 of the AES decryption program 234 includes, as the SubBytes processing module 505*d*, a process of multiplication by a value of "177" under mod 256 and a 1-bit left shifting process instead of the 3-bit left shifting process.

6. Modification (5)

Next is explained another modification of the AES encryption program 133 that the memory unit 103 of the content server apparatus 100 stores.

The AES encryption program 133 may include a modified S box 1311 shown in FIG. 41 in place of the modified S box 511. At this time, the AES encryption program 133 also includes a SubBytes processing module 505*e* (not shown) in place of the SubBytes processing module 505. The SubBytes processing module 505*e* includes a process of multiplication mod 256, a 1-bit left shifting process, and a process of addition mod 512, instead of the 3-bit left shifting process.

(Modified S Box 1311)

As shown in FIG. 41, the modified S box 1311 comprises 512 pieces of array elements 1331, 1321, 1332, 1322, 1333, 1323, 1334, 1324, . . . , 1325, . . . , 1326, . . . , 1327, . . . , 1328 and . . . .

For representation convenience, the array elements making up the modified S box 1311 in FIG. 41 are arranged in a matrix of 64 rows by 8 columns.

In the modified S box 1311, "0xff" is stored in the first array element, and values of array elements S[xx] stored in the modified S box 1121 of FIG. 34 are stored in every other array elements thereof, maintaining the array sequence. In each array element between every two values of these array elements S[xx], "0xff" is stored.

For example, eight array elements 1331, 1321, 1332, 1322, 1333, 1323, 1334, and 1324 of the first row in the modified S box 1311 have "0xff", a value of S[0], "0xff", a value of S[81], "0xff", a value of S[162], "0xff", and a value of S[243], respectively. Here, the values S[0], S[81], S[162] and S[243] are the same as those of first four array elements in the first row of the modified S box 1121 shown in FIG. 34.

In addition, the 8 array elements . . . , 1325, . . . , 1326, . . . , 1327, . . . , and 1328 in the second row of the modified box 1311 have "0xff", a value of S[68], "0xff", a value of S[149], "0xff", a value of S[230], "0xff", and a value of S[55], respectively. Here, the values S[68], S[149], S[230] and S[55] are the same as those of four array elements of the second half in the first row of the modified S box 1121 shown in FIG. 34.

Note here that "xx" in S[xx] is represented in decimal.

(SubBytes Processing Module 505*e*)

Figure 42:
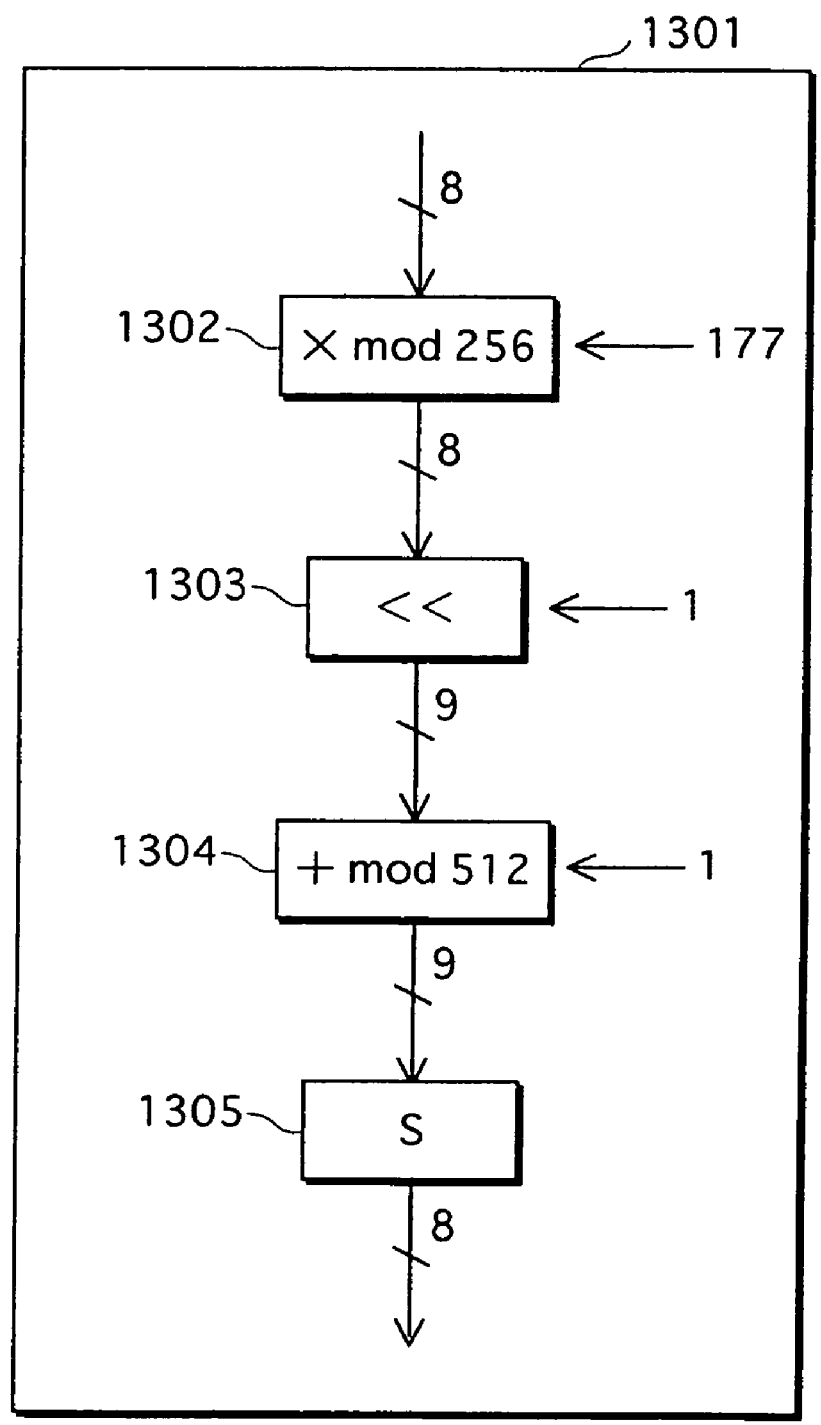
FIG. 42 is a data process chart showing operations of one multiplication process 1302, one shifting process 1303, one addition process 1304, and one reference process 1305 in the SubBytes process of a SubBytes processing module 505e.

In the SubBytes process performed by the SubBytes processing module 505*e*, block data of 128 bits is received, the received 128-bit block data is divided into 16 pieces of partial block data of 8 bits (8 bits×16=128 bits), and each partial block data is multiplied by a value of "177" under mod 256 (Step 1302), as shown in FIG. 42. Thus, a resulting value of 8 bits is generated by the multiplication for each of the sixteen pieces of partial block data. The resulting value is then shifted to the left by one bit to generate shifted data of 9 bits (Step 1303). Next, a value "1" is added to each of the 9-bit shifted data under mod 512 to thereby yield an added value of 9 bits (Step 1304). A process of referring to the modified S box 1311 is carried out for each 9-bit added value to output data of 8 bits (Step S1305).

Although, as described above, sixteen multiplication mod 256 processes, sixteen left shifting processes, sixteen addition mod 512 processes, and sixteen reference processes where the modified S box 1311 is referred to are carried out in the SubBytes process of the SubBytes processing module 505*e*, FIG. 42 shows only a group 1301 which comprises one multiplication process 1302, one shifting process 1303, one adding process 1304 and one reference process 1305 for purpose of simple illustration.

Thus, with respect to sixteen pieces of partial block data, the multiplication mod 256, the 1-bit left shifting, the addition mod 512, and the reference to the modified S box 1311 are performed. As a result, sixteen pieces of 8-bit data are generated. The generated sixteen pieces of 8-bit data are joined to form block data of 128 bits, which is then output.

The reason why each partial block data is multiplied by a value of "177" under mod 256 is as described in Modification (4). In addition, the reason why the 1-bit left shifting process is performed and the reason why the addition mod 512 is performed is as described in Modification (2).

Thus, a valid array element S[xx] that appropriately corresponds to each partial block data is attained by multiplying the partial block data by a value of "177" under mod 256, shifting the resulting value to the left by one bit to obtain shifted data, adding a value of "1" to the shifted data under mod 256 to thereby obtain an added value, and referring to the modified S box 1311 using the added value as an address.

Note that the SubBytes processing module 505*e* may include a multiplication process for performing multiplication by 2, instead of the 1-bit left shifting.

(Example of Data Unit)

Figure 43:
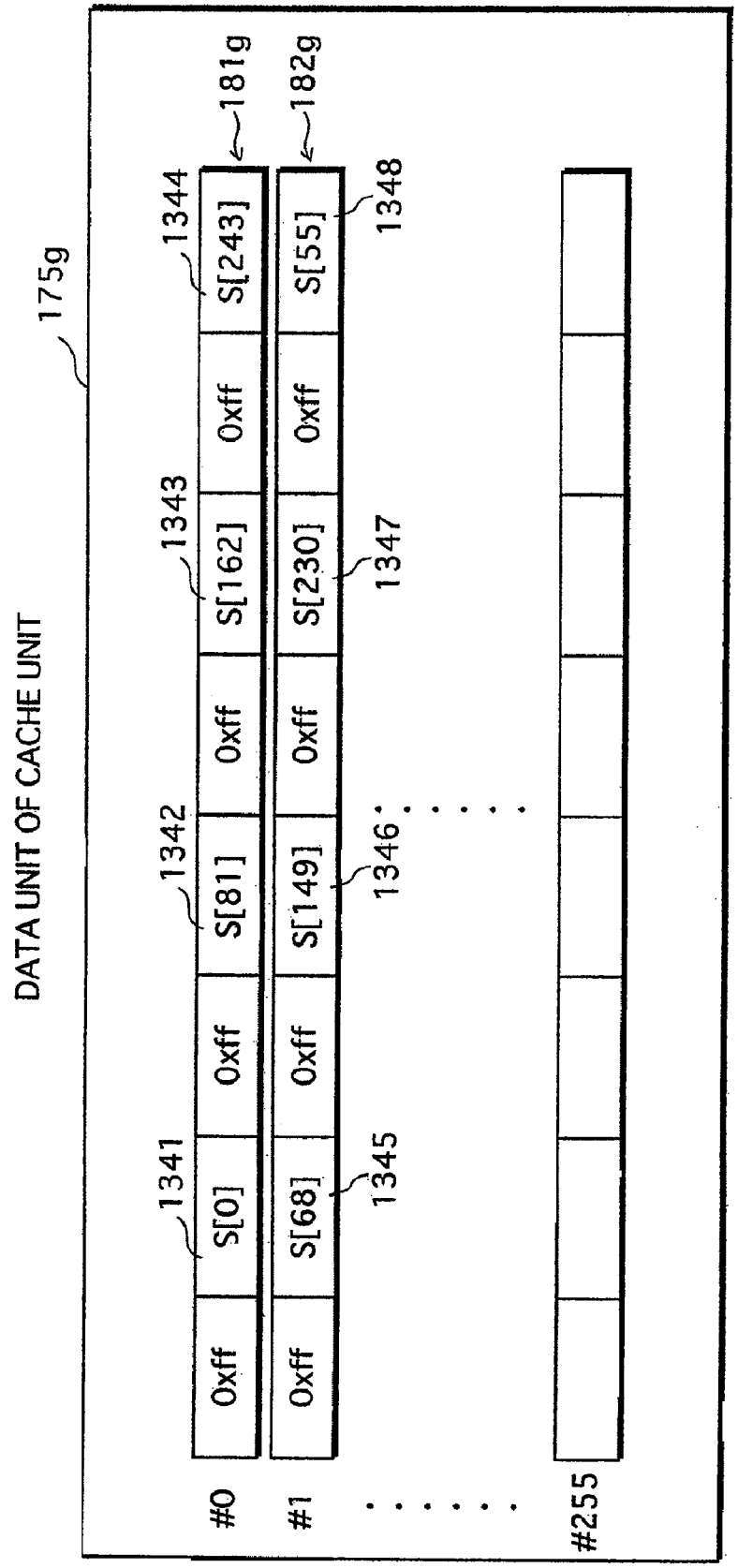
FIG. 43 shows an example where contents of the modified S box 1221 are stored in the cache line units 181, 182, and ... of the data unit 175.

One example in which the contents of the modified S box 1221 are stored in the cache line units 181, 182, and . . . of the data unit 175 by the above-mentioned SubBytes process is shown in FIG. 43 as a data unit 175*g*.

In 64 cache line units 181*g*, 182*g*, and . . . starting from the first one in the data unit 175*g*, the contents of the modified S box 1311 are stored without change.

That is, stored in the cache line unit 181*g* are array elements "0xff", 1341 "S[0]", "0xff", 1342 "S[81]", "0xff", 1343 "S[162]", "0xff", and 1344 "S[243]".

Also, stored in the cache line unit 182g are "0xff", an array element 1345 "S[68]", "0xff", an array element 1346 "S[149]", "0xff", an array element 1347 "S[230]", "0xff", and an array element 1348 "S[55]".

Thus, eight array elements in one row of the modified S box 1311 are stored in each cache line unit of the data unit 175g.

(Applications in AES Decryption Program 234)

Some modification may be made to the AES decryption program 234 stored in the memory unit 203 of the personal computer 200 in a similar manner described above.

That is, the AES decryption program 234 may include, in place of the inverse transform modified S box 611, an inverse transform modified S box configured in the same manner as the modified S box 1311 of FIG. 41. At this time, the InvSubBytes processing module 605 of the AES decryption program 234 includes, as the SubBytes processing module 505e, a process of multiplication by a value of "177" under mod 256, a 1-bit left shifting process, and a process of addition of a value of "1" under mod 512, instead of the 3-bit left shifting process.

7. Modification (6)

Next is explained another modification of the AES encryption program 133 that the memory unit 103 of the content server apparatus 100 stores.

The AES encryption program 133 may include a modified S box 1421 of FIG. 44 and a modified S box 1441 of FIG. 45 in place of the modified S box 511. At this time, the AES encryption program 133 also includes a SubBytes processing module 505f (not shown) in place of the SubBytes processing module 505. The SubBytes processing module 505f is hereinafter described.

(Modified S Box 1421)

As shown in FIG. 44, the modified S box 1421 comprises 256 pieces of array elements 1431, 1432, 1433, 1434, 1435, 1436, 1437, 1438, and . . . . The modified S box 1421 is the same as the modified S box 1121 of FIG. 34. Here, the explanation of the modified S box 1421 is omitted.

(Modified S Box 1441)

The modified S box 1441 is generated based on the concept similar to that of the modified S box 1121 of FIG. 34, and comprises 256 pieces of array elements 1451, 1452, 1453, 1454, 1455, 1456, 1457, 1458 and . . . . These array elements are identified by array numbers "0", "1", "2", "3", . . . , and "255".

For representation convenience, the array elements making up the modified S box 1441 in FIG. 45 are arranged in a matrix of 32 rows by 8 columns.

The eight array elements 1451, . . . , and 1458 of the first row have values S[0], S[133], S[10], S[143], S[20], S[153], S[30], and S[163], respectively. Here, the values S[0], S[133], S[10], S[143], S[20], S[153], S[30], and S[163] are the same as those in the standard S box 380 above. Here, "xx" in S[xx] is represented in decimal.

In addition, the eight array elements of the second row have values S[40], S[173], S[50], S[183], S[60], S[193], S[70], and S[203], respectively. Here, the values S[40], S[173], S[50], S[183], S[60], S[193], S[70], and S[203] are the same as those in the standard S box 380 above. Here, "xx" in S[xx] is represented in decimal.

Array elements in the third to thirty second rows have the same values as those of the array elements in the standard S box 380 above. Note however that FIG. 45 omits the illustration of each array element of the third to thirty second rows in the modified S box 1441.

(Arrangement Rule for Modified S Box 1441)

In the modified S box 1441, each array element of the above-mentioned standard S box 380 is stored according to a rule described below. This arrangement rule is a similar to that of the modified S box 1121 of FIG. 34.

Here, a calculation of B×77 mod 256 is performed on each of 256 input values B (0, 1, 2, . . . , and 255) which are integer numbers. Each input value B and its corresponding result are shown in a correspondence table 1442 of FIG. 46.

Figure 46:
FIG. 46 is a correspondence table showing a correspondence between 256 input values B, which are integers (0, 1, 2, ..., and 255), and results obtained from the calculation of B×77 mod 256.

The correspondence table 1442 shows a correspondence between the 256 input values B and the results obtained from the calculation of B×77 mod 256. Note however that the correspondence table 1442 of FIG. 46 shows, not the calculation results of all values of B, but those of only a part of the values due to limitations of space.

Here, for example, the calculation results of the B×77 mod 256 operation for the input values B=0, 133, 10, 143, and 20 are "0", "1", "2", "3", and "4", respectively.

For example, an array element in the standard S box 380 to be stored in the array element 1451, which is indicated by an array number "0" of the modified S box 1441, is decided in the following manner. A calculation result "0" having the same value as the array number "0" is found in the correspondence table 1442, and the input value B "0" corresponding to the calculation result is obtained. Next, the array element S[0] having the obtained input value B "0" as its array number is set as a value of the array element 1451 indicated by the array number "0" of the modified S box 1441.

For another example, an array element in the standard S box 380 to be stored in the array element 1452, which is indicated by an array number "1" of the modified S box 1441, is decided in the following manner. A calculation result "1" having the same value as the array number "1" is found in the correspondence table 1442, and the input value B "133" corresponding to the calculation result is obtained. Next, the array element S[133] having the obtained input value A "133" as its array number is set as a value of the array element 1452 indicated by the array number "1" of the modified S box 1441.

Furthermore, for another example, an array element in the standard S box 380 to be stored in the array element 1453, which is indicated by an array number "2" of the modified S box 1441, is decided in the following manner. A calculation result "2" having the same value as the array number "2" is found in the correspondence table 1442, and the input value B "10" corresponding to the calculation result is obtained. Next, the array element S[10] having the obtained input value B "10" as its array number is set as a value of the array element 1453 indicated by the array number "2" of the modified S box 1441.

Values for the remaining array elements in the modified S box 1441 are decided in the same way.

Thus, in the modified S box 1441, the array elements included in the standard S box 380 are arranged according to the above-mentioned rule.

(SubBytes Processing Module 505f)

In the SubBytes process performed by the SubBytes processing module 505f, block data of 128 bits is received, and the received 128-bit block data is divided into 16 pieces of partial block data of 8 bits (8 bits×16=128 bits).

Figure 47:
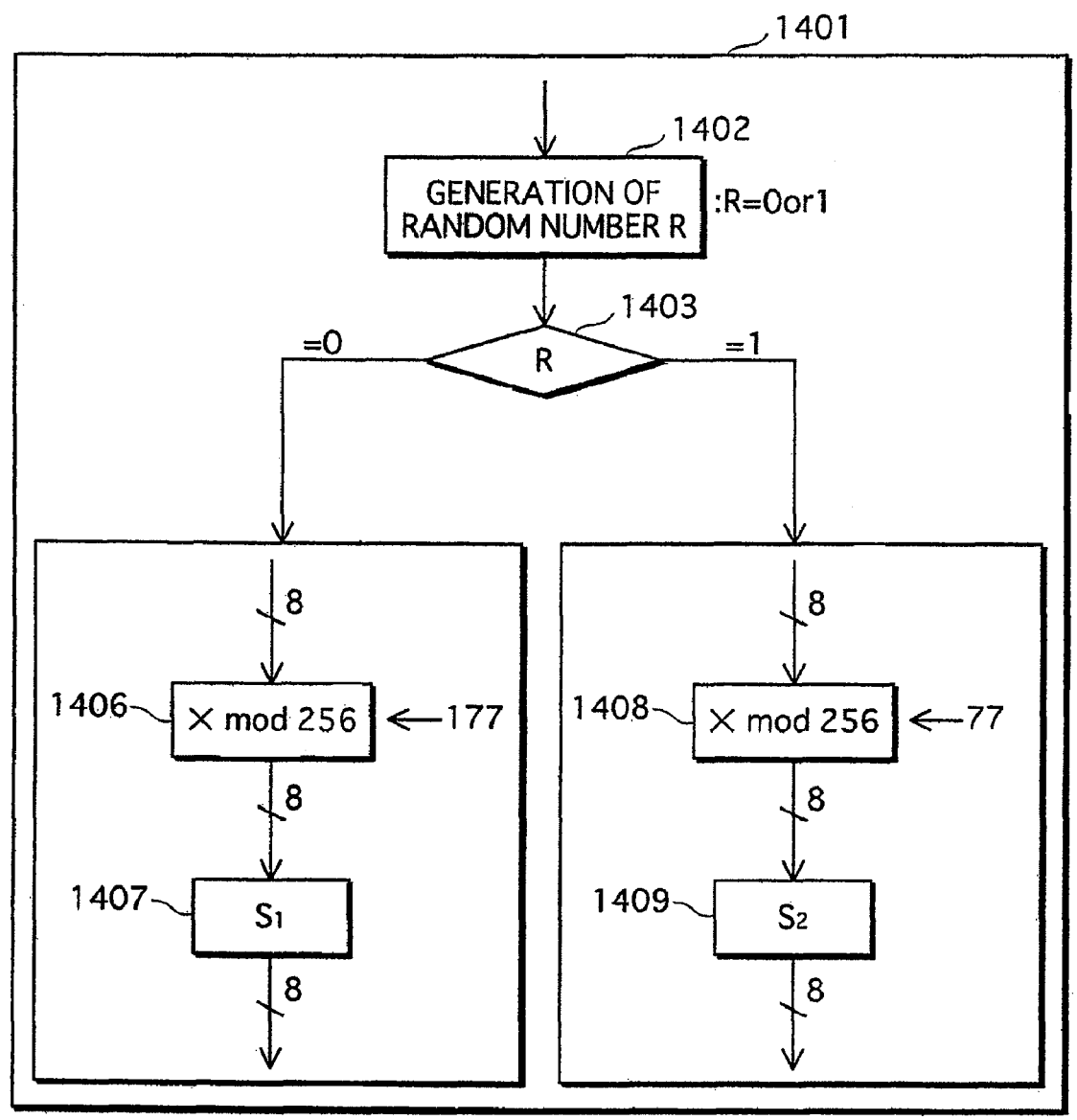
FIG. 47 is a data process chart showing operations of a group of 1401 which comprises one random number generation process 1402, one random number judging process 1403, "one process 1406 of multiplication by 177 under mod 256 and one reference process 1407 in which the modified S box 1421 is referred to" and "one process 1408 of multiplication by 77 under mod 256 and one reference process 1409 in which the modified S box 1441 is referred to", in the SubBytes process of a SubBytes processing module 505f.

Next, the following processing, as shown in FIG. 47, is performed on each partial block data.

(a) A random number R is generated. The random number R is either a value "0" or "1" (Step 1402).

(b) It is judged whether the generated random number R is "0" or "1" (Step 1403).

(c) When the random number R is "0", the partial block data is multiplied by a value "177" under mod 256 (Step 1406). Herewith, a multiplied value of 8 bit is generated.

Next, a process of referring to the modified S box 1421 is performed for the 8-bit multiplied value to thereby output 8-bit data (Step 1407).

(d) When the random number R is "1", the partial block data is multiplied by a value of "77" under mod 256 (Step 1408). Herewith, a multiplied value of 8 bit is generated. Next, a process of referring to the modified S box 1441 is performed for the 8-bit multiplied value to thereby output 8-bit data (Step 1409).

Although, as described above, sixteen random number generation processes, sixteen random number judging processes, sixteen processes of "multiplication by either 177 or 77 under mod 256", and sixteen reference processes where either the modified S box 1421 or the modified S box 1441 is referred to are carried out in the SubBytes process of the SubBytes processing module 505f, FIG. 47 shows only a group of 1401 which comprises one random number generation process 1402, one random number judging process 1403, "one process 1406 of multiplication by 177 under mod 256 and one reference process 1407 in which the modified S box 1421 is referred to" and "one process 1408 of multiplication by 77 under mod 256 and one reference process 1409 in which the modified S box 1441 is referred to".

Thus, with respect to sixteen pieces of partial block data, the multiplication process for performing multiplication by 177 or 77 under mod 256 and the reference process for referring to either the modified S box 1421 or 1441. As a result, sixteen pieces of 8-bit data are generated. The generated sixteen pieces of 8-bit data are joined to form block data of 128 bits, which is then output.

Thus, a valid array element S[xx] that appropriately corresponds to each partial block data is attained by multiplying the partial block data by a value of "177" or "77", depending on a generated random number, under mod 256, and then referring to the modified S box 1421 when the multiplication by "177" is performed and referring to the modified S box 1441 when the multiplication by "77" is performed.

(Example of Data Unit)

Figure 48:
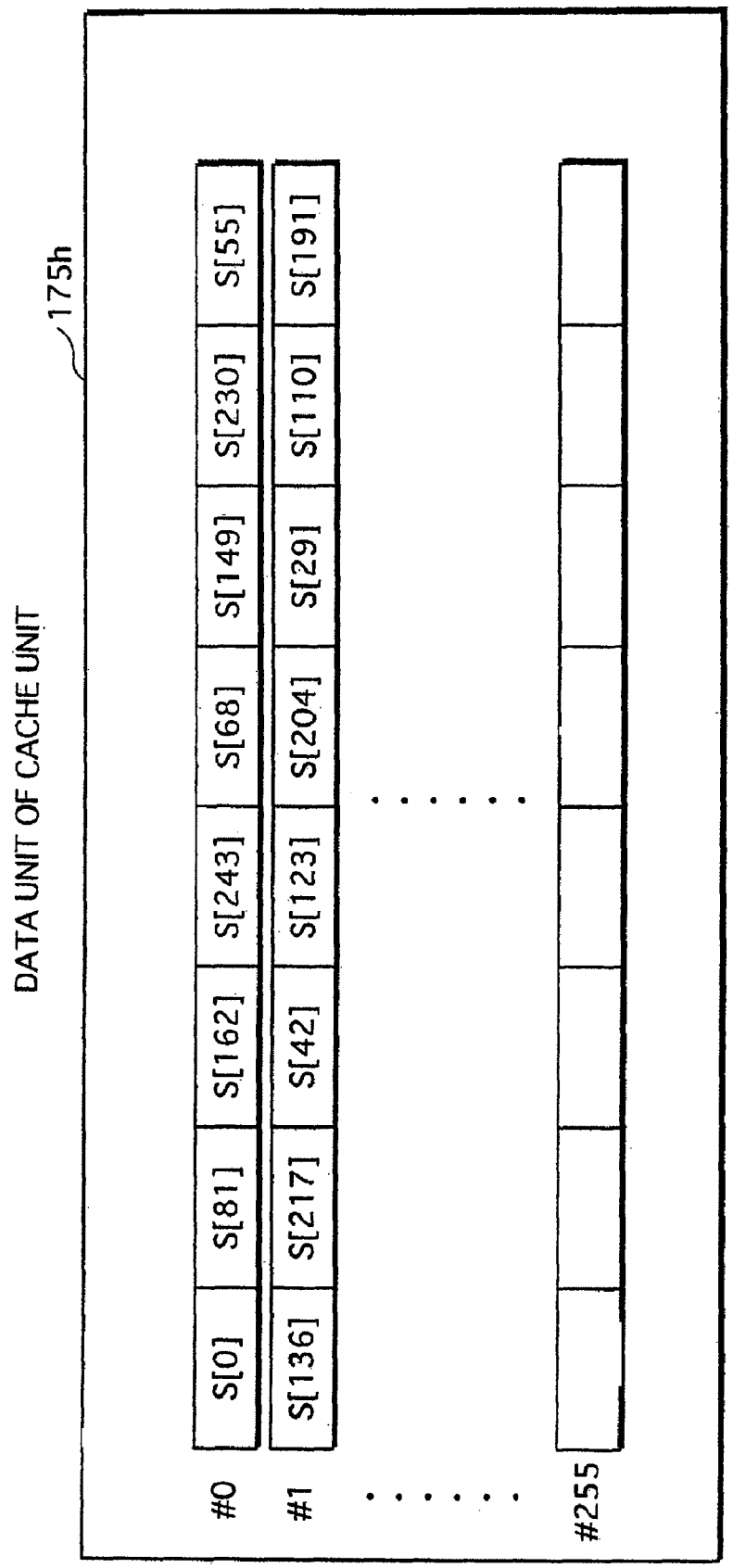
FIG. 48 shows an example where contents of a modified S box 1421 are stored in the cache line units 181, 182, and ... of the data unit 175.

One example in which the contents of the modified S box 1421 are stored in the cache line units 181, 182, and . . . of the data unit 175 by the above-mentioned SubBytes process is shown in FIG. 48 as a data unit 175h. In addition, an example in which the contents of the modified S box 1441 are stored is shown in FIG. 49 as a data unit 175i.

(Applications in AES Decryption Program 234)

Some modification may be made to the AES decryption program 234 stored in the memory unit 203 of the personal computer 200 in a similar manner described above.

That is, the AES decryption program 234 may include, in place of the inverse transform modified S box 611, an inverse transform modified S box configured in the same manner as the modified S box 1421 of FIG. 44 and an inverse transform modified S box configured in the same manner as the modified S box 1441 of FIG. 45. At this time, the InvSubBytes processing module 605 of the AES decryption program 234 includes, as the SubBytes processing module 505f, the process shown in FIG. 47 instead of the 3-bit left shifting process.

5. Modification (4)

Next is explained another modification of the AES encryption program 133 that the memory unit 103 of the content server apparatus 100 stores.

Figure 50:
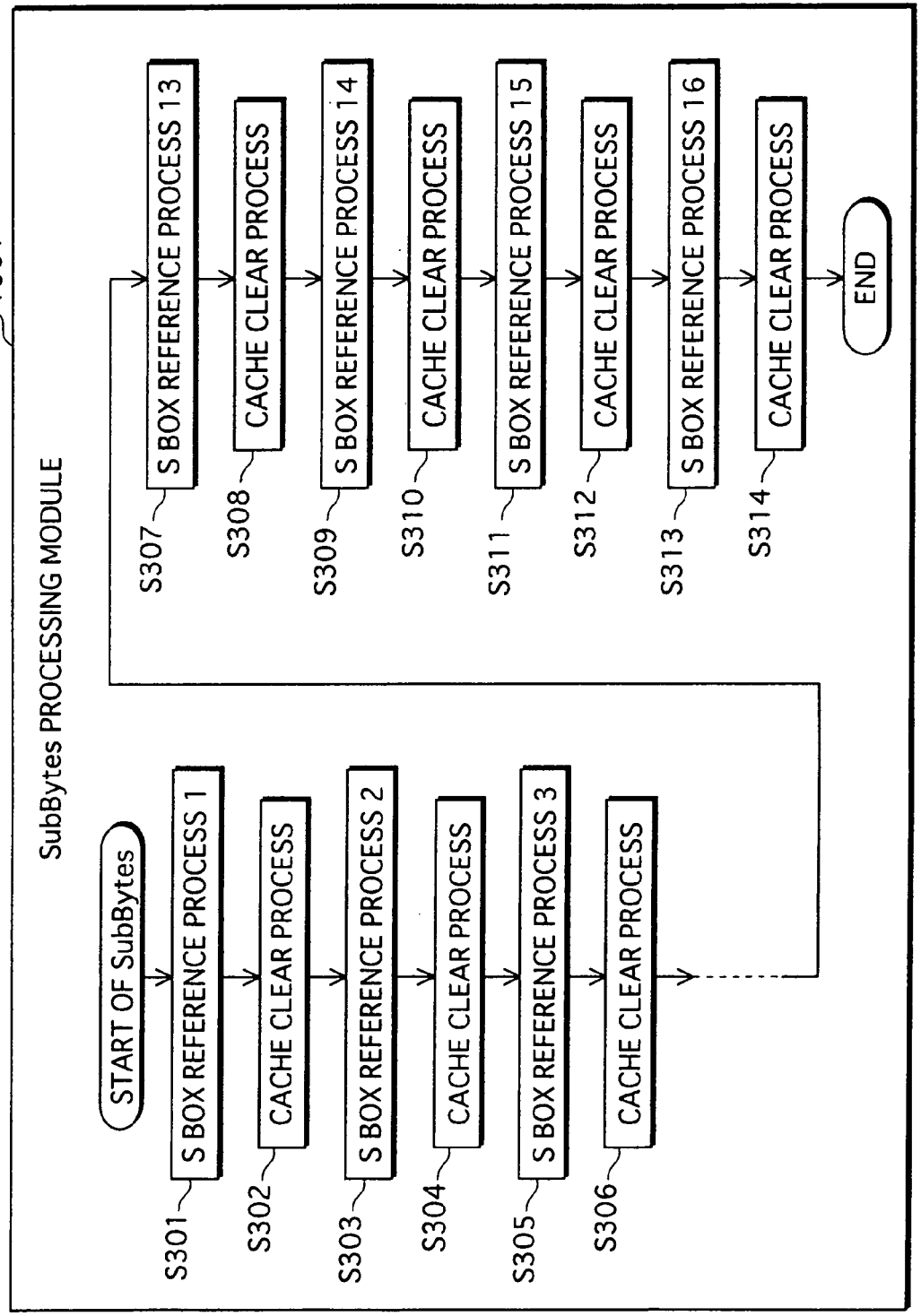
FIG. 50 is a flowchart illustrating details of a SubBytes processing module 1501.

The AES encryption program 133 may include a SubBytes processing module 1501 of FIG. 50 in place of the SubBytes processing module 505.

In the SubBytes processing module 1501, an S-box reference operation is performed sixteen times as in the case of the normal SubBytes process. In addition, a process where all array elements stored in the data unit 175 of the cache unit 162 are deleted therefrom is performed either before or after the S-box reference operation (FIG. 50 shows the case where the process is performed after the reference operation).

Ways to delete data stored in the cache unit 162 include a method using a special instruction (in the case of Pentium (registered trademark), "INVD" or "WBINVD" for example) and a method accessing data in the memory unit 103 which is irrelevant to the encryption process to thereby copy the data to the cache unit 162 and clean out array elements present in the cache unit 162.

In the SubBytes processing module 1501, an S-box reference process is performed (Step S301), and a process for deleting the array elements stored in the cache unit 162 is then performed by the above described method (Step S302), as shown in FIG. 50.

Subsequently, in Step S303 to S314, an S-box reference process i (i is a natural number from 2 to 16) and a subsequent deletion process of array elements stored in the cache unit 162 are repeated, as in Step S301 and S302.

Although, in the above modification, the cache clear process is called after (or before) the access to array elements in the S box, the present invention is not confined to this.

For example, the cache clear process is provided after each of the sixteen table reference operations only when the counter is 0 and Nr−1, and when the counter indicates a counter value other than these (1 to Nr−2), the cache clear process does not have to be carried out. Since timing attacks take advantage of the fact that the calculation amounts required for inferring a key in SubBytes processes close to a plain text and ciphertext (e.g. the first and Nr−1 stages) are greater than the calculation amounts required for inferring a key in SubBytes processes far from the plain text and ciphertext (e.g. Nr−1 and the second stage).

Thus, by performing the modified SubBytes process only on certain parts susceptible to attack (which are determined based on, for example, counter values), the processing speed increases due to a reduction in the number of cache clear processes although the resistance against timing attacks is less than that in the case of the above modification.

9. Other Modifications

Although the present invention has been explained based on the above embodiment, it is a matter of course that the present invention is not limited to the embodiment. The following is also within the scope of the present invention.

(1) The configuration of the processor included in the device that processes computer programs is not limited to that shown in FIG. 11. For example, the microprocessor 101 may have, in place of the cache unit 162, a high-speed primary cache unit 162a having a smaller capacity and a lower-speed secondary cache unit 162b having a larger capacity.

In this case, the operation unit 161 first accesses the primary cache unit 162a to read data therefrom, then accesses the secondary cache unit 162b if appropriate data is not present in the primary cache unit 162a. Here, there are three cases of obtaining table elements: from the primary cache unit 162a; from the secondary cache unit 162b; and from the memory unit 103, and timing attacks use that total processing times change in a similar fashion depending on input messages.

Note that the microprocessor 101 may further have a tertiary cache unit.

(2) Although the microprocessor includes the cache unit in the above embodiment and modifications, the present invention is not limited to this. The cache unit may not be provided inside the microprocessor, but the computer system may include a microprocessor, a cache unit and a memory unit.

(3) Although the modified S box 511 is included in the AES encryption program 133 in the above embodiment and modifications, the present invention is not limited to this.

Each module (computer program) included in the AES encryption program 133 and the modified S box 511 may configure separate data sets (files). The same applies to the AES decryption program 134.

(4) Although, in the above embodiment and modifications, each modified S box includes "0xff" as dummy data, which does not exist in the standard S box, the present invention is not limited to "0xff". Instead of "0xff", another data may be included. For example, each modified S box may include, instead of "0xff", random numbers generated by a random generator or data present in the standard S box.

(5) In the above embodiment, the Round processing module 503 is formed with the instruction code groups S131, S132, S133 and S134 included therein, as shown in FIG. 8, and these instruction code groups are arranged in the processing module 503 in the stated order and executed in this order. However, the present invention is not limited to this.

For example, a modified Round processing module, which is in place of the Round processing module 503, may be formed with the instruction code groups S132, S133, S134 and S131 included therein, and these instruction code groups may be arranged in the modified Round processing module in the stated order and executed in this order. Here, the encryption main module calls the instruction code group S131, and subsequently calls the modified Round processing module a predetermined number of times.

(6) In the above embodiment, the cache unit of the microprocessor 101 has the cache line units, each of which is 64 bits in length. However, the bit length of the cache line units is not limited to this, and they may have a different bit length. In this case also, the above described functions can be realized.

(7) In the above embodiment, the present invention is applied to the AES. However, the present invention is not limited to this. For example, it may be applied to the DES (Data Encryption Standard) and other encryption algorithms.

In addition, the present invention can be applied not only for encryption and decryption but also, specifically speaking, for check of information falsification and digital signature.

(8) Each apparatus above is, to be more specific, a computer system comprising a microprocessor, a ROM, a RAM, a hard disk unit, a display unit, a keyboard, a mouse and the like. A computer program is stored in the RAM or the hard disk unit. Here, the computer program is configured by combining multiple instruction codes that indicate instructions for the computer. The microprocessor operates according to the computer program, and thereby each apparatus fulfills its function. That is, the microprocessor fetches instructions included in the computer program one by one, decodes the fetched instruction, and operates according to the decoding result.

(9) Part or all of the components making up the above individual devices may be assembled as a single system LSI (Large Scale Integration). The system LSI is an ultra-multifunctional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function.

(10) Part or all of the components making up the above individual devices may be assembled as an IC card or a stand-alone module which is detachable from each device. The IC card or module is a computer system comprising a microprocessor, a ROM, a RAM and the like. The IC card or module may include the ultra-multifunctional LSI described above. The microprocessor operates according to the computer program, and thereby the IC card or module fulfills its function. The IC card or module may have tamper resistance.

(11) The present invention may be a method of accomplishing the above described unauthorized contents detection system. The present invention may be a computer program that achieves the method by a computer, or may be a digital signal representing the computer program.

The present invention may also be achieved by a computer-readable recording medium, such as a flexible disk, a hard disk, a CD-ROM, MO disk, a DVD, a DVD-ROM, a DVD-RAM, a BD (Blu-ray Disk), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(12) The present invention includes a structure in which two or more of the above embodiment and modifications are combined.

Since being capable of increasing resistance against timing attacks that monitor processing times, the computer system of the present invention can be used operationally, continuously and repeatedly in various industries that need to handle information in a confidential manner. In addition, each apparatus making up the present invention can be manufactured and sold operationally, continuously and repeatedly in electric equipment manufacturing industries.

The invention claimed is:

1. A computer system for encrypting a plain text and decrypting a ciphertext by performing a conversion process for converting partial data related to at least one of the plain text and the ciphertext into converted data which corresponds to the partial data, the computer system comprising:
   a main memory unit storing a conversion table and a computer program, the conversion table including at least one piece of inclusion data of a predetermined length and including a single piece of valid converted data at a predetermined position in the inclusion data, such that all other positions in the inclusion data store data irrelevant to the conversion process, and the computer program including a plurality of instructions for obtaining the converted data in the conversion process by using the conversion table;
   a cache memory unit including a cache line unit of the predetermined length; and
   an execution unit operable to fetch each instruction of the plurality of instructions from the computer program, decode each fetched instruction, and operate according to a result of the decoding of each fetched instruction,
   wherein, in order to obtain the converted data included in the conversion table, the execution unit (i) first attempts to obtain the converted data from the cache line unit, (ii)

obtains the converted data from the conversion table stored in the main memory unit when the converted data is not present in the cache line unit, and (iii) writes the inclusion data including the obtained converted data to the cache line unit, and wherein the computer program includes:
an obtaining instruction for obtaining the partial data;
an operation instruction for calculating the predetermined position of the obtained converted data using the obtained partial data; and
a reading instruction for reading the converted data located at the calculated predetermined position.

2. The computer system of claim 1,
wherein the predetermined position of the converted data included in the conversion table is dependent upon a value of the partial data, and
wherein the operation instruction performs an operation on the obtained partial data to calculate the predetermined position.

3. The computer system of claim 2,
wherein the predetermined length is w times a length of the converted data, w being an integer,
wherein the inclusion data includes data irrelevant to the conversion process at all remaining positions therein, and
wherein the operation instruction uses multiplication by the integer w to calculate the predetermined position.

4. The computer system of claim 3,
wherein the predetermined position is a start of the inclusion data, and
wherein the operation instruction multiplies the obtained partial data by the integer w to calculate the predetermined position.

5. The computer system of claim 2, wherein the inclusion data further includes (i) different converted data corresponding to different partial data, the different converted data being located at a different predetermined position and (ii) the irrelevant data located at all remaining positions.

6. The computer system of claim 5,
wherein the predetermined length is w times a length of the converted data, w being an integer,
wherein the predetermined position is a start of the inclusion data,
wherein the different predetermined position is a start of a second half of the inclusion data, and
wherein the operation instruction multiplies the obtained partial data by the integer w divided by 2, to calculate the predetermined position.

7. The computer system of claim 5,
wherein the predetermined length is w times a length of the converted data, w being an integer,
wherein the predetermined position is an $x^{th}$ position from a start of the inclusion data, x being an integer,
wherein the different predetermined position is an $x^{th}$ position from a start of a second half of the inclusion data, and
wherein the operation instruction multiplies the obtained partial data by the integer w divided by 2 and then adds the integer x, to calculate the predetermined position.

8. The computer system of claim 1,
wherein the plain text is divided into a plurality of pieces of partial data, each of the plurality of pieces of partial data divided from the plain text being a same size as a piece of converted data included in the conversion table, and encryption processing is performed on each of the plurality of pieces of partial data divided from the plain text by performing the conversion process, and wherein the ciphertext is divided into a plurality of pieces of partial data, each of the plurality of pieces of partial data divided from the ciphertext being a same size as a piece of converted data included in the conversion table, and decryption processing is performed on each of the plurality of pieces of partial data divided from the ciphertext by performing the conversion process.

9. A non-transitory computer-readable recording medium having a computer program recorded thereon, the computer program for being used in a computer system for encrypting a plain text and decrypting a ciphertext by performing a conversion process for converting partial data related to at least one of the plain text and the ciphertext into converted data which corresponds to the partial data, wherein the computer system comprises:
a main memory unit storing a conversion table and a computer program, the conversion table including at least one piece of inclusion data of a predetermined length and including a single piece of valid converted data at a predetermined position in the inclusion data, such that all other positions in the inclusion data store data irrelevant to the conversion process, and the computer program including a plurality of instructions for obtaining the converted data in the conversion process by using the conversion table;
a cache memory unit including a cache line unit of the predetermined length; and
an execution unit operable to fetch each instruction of the plurality of instructions from the computer program, decode each fetched instruction, and operate according to a result of the decoding of each fetched instruction, wherein, in order to obtain the converted data included in the conversion table, the execution unit (i) first attempts to obtain the converted data from the cache line unit, (ii) obtains the converted data from the conversion table stored in the main memory unit when the converted data is not present in the cache line unit, and (iii) writes the inclusion data including the obtained converted data to the cache line unit, and wherein the computer program causes the computer system to execute a method comprising:
an obtaining instruction step of obtaining the partial data;
an operation instruction step of calculating the predetermined position of the obtained converted data using the obtained partial data; and
a reading instruction step of reading the converted data located at the calculated predetermined position.

10. A method used in a computer system for encrypting a plain text and decrypting a ciphertext by performing a conversion process for converting partial data related to at least one of the plain text and the ciphertext into converted data which corresponds to the partial data, wherein the computer system comprises:
a main memory unit storing a conversion table and a computer program, the conversion table including at least one piece of inclusion data of a predetermined length and including a single piece of valid converted data at a predetermined position in the conclusion data, such that all other positions in the inclusion data store data irrelevant to the conversion process, and the computer program including a plurality of instructions for obtaining the converted data in the conversion process by using the conversion table;

a cache memory unit including a cache line unit of the predetermined length; and an execution unit operable to fetch each instruction of the plurality of instructions from the computer program, decode each fetched instruction, and operate according to a result of the decoding of each fetched instruction, wherein, in order to obtain the converted data included in the conversion table, the execution unit (i) first attempts to obtain the converted data from the cache line unit, (ii) obtains the converted data from the conversion table stored in the main memory unit when the converted data is not present in the cache line unit, and (iii) writes the inclusion data including the obtained converted data to the cache line unit, and wherein the method comprises:
an obtaining instruction step of obtaining the partial data;

an operation instruction step of calculating the predetermined position of the obtained converted data using the obtained partial data; and a reading instruction step of reading the converted data located at the calculated predetermined position.

* * * * *